(12) United States Patent
Raleigh et al.

(10) Patent No.: US 11,570,309 B2
(45) Date of Patent: *Jan. 31, 2023

(54) SERVICE DESIGN CENTER FOR DEVICE ASSISTED SERVICES

(71) Applicant: Headwater Research LLC, Tyler, TX (US)

(72) Inventors: Gregory G. Raleigh, Woodside, CA (US); James Lavine, Corte Madera, CA (US); Alireza Raissinia, Monte Sereno, CA (US); Justin James, Poway, CA (US); Jeffrey Green, Sunnyvale, CA (US)

(73) Assignee: HEADWATER RESEARCH LLC, Tyler, TX (US)

( * ) Notice: Subject to any disclaimer, the term of this patent is extended or adjusted under 35 U.S.C. 154(b) by 117 days.

This patent is subject to a terminal disclaimer.

(21) Appl. No.: 17/063,336

(22) Filed: Oct. 5, 2020

(65) Prior Publication Data

US 2021/0120130 A1    Apr. 22, 2021

Related U.S. Application Data

(63) Continuation of application No. 16/216,479, filed on Dec. 11, 2018, now Pat. No. 10,798,254, which is a
(Continued)

(51) Int. Cl.
| | | |
|---|---|---|
| *H04M 15/00* | (2006.01) | |
| *H04W 4/24* | (2018.01) | |
| *G06Q 30/06* | (2012.01) | |

(52) U.S. Cl.
CPC .......... *H04M 15/723* (2013.01); *G06Q 30/06* (2013.01); *H04M 15/70* (2013.01);
(Continued)

(58) Field of Classification Search
CPC ....... H04W 8/18; H04W 12/08; H04W 24/10; H04W 12/06; H04W 4/24; H04L 41/5025;
(Continued)

(56) References Cited

U.S. PATENT DOCUMENTS

| | | |
|---|---|---|
| 5,131,020 A | 7/1992 | Liebesny et al. |
| 5,283,904 A | 2/1994 | Carson et al. |

(Continued)

FOREIGN PATENT DOCUMENTS

| | | |
|---|---|---|
| CA | 2688553 A1 | 12/2008 |
| CN | 1310401 A | 8/2001 |

(Continued)

OTHER PUBLICATIONS

"Ads and movies on the run," the Gold Coast Bulletin, Southport, Qld, Jan. 29, 2008.
(Continued)

*Primary Examiner* — Andrew Joseph Rudy
(74) *Attorney, Agent, or Firm* — Farjami & Farjami LLP

(57) ABSTRACT

A technique involves modular storage of network service plan components and provisioning of same. A subset of the capabilities of a service design system can be granted to a sandbox system to enable customization of service plan offerings or other controls.

20 Claims, 38 Drawing Sheets

Related U.S. Application Data continuation of application No. 15/446,291, filed on Mar. 1, 2017, now Pat. No. 10,171,681, which is a continuation of application No. 14/541,628, filed on Nov. 14, 2014, now Pat. No. 9,706,061, which is a continuation of application No. 13/248,025, filed on Sep. 28, 2011, now Pat. No. 8,924,543, which is a continuation-in-part of application No. 13/134,028, filed on May 25, 2011, now Pat. No. 8,589,541, which is a continuation-in-part of application No. 13/134,005, filed on May 25, 2011, now Pat. No. 8,635,335, and a continuation-in-part of application No. 12/695,021, filed on Jan. 27, 2010, now Pat. No. 8,346,225, which is a continuation-in-part of application No. 12/380,780, filed on Mar. 2, 2009, now Pat. No. 8,839,388, said application No. 13/134,005 is a continuation-in-part of application No. 12/380,780, filed on Mar. 2, 2009, now Pat. No. 8,839,388, and a continuation-in-part of application No. 12/380,778, filed on Mar. 2, 2009, now Pat. No. 8,321,526.

(60) Provisional application No. 61/389,547, filed on Oct. 4, 2010, provisional application No. 61/387,243, filed on Sep. 28, 2010, provisional application No. 61/387,247, filed on Sep. 28, 2010, provisional application No. 61/407,358, filed on Oct. 27, 2010, provisional application No. 61/418,507, filed on Dec. 1, 2010, provisional application No. 61/418,509, filed on Dec. 1, 2010, provisional application No. 61/420,727, filed on Dec. 7, 2010, provisional application No. 61/422,565, filed on Dec. 13, 2010, provisional application No. 61/422,572, filed on Dec. 13, 2010, provisional application No. 61/422,574, filed on Dec. 13, 2010, provisional application No. 61/435,564, filed on Jan. 24, 2011, provisional application No. 61/472,606, filed on Apr. 6, 2011, provisional application No. 61/348,022, filed on May 25, 2010, provisional application No. 61/381,159, filed on Sep. 9, 2010, provisional application No. 61/381,162, filed on Sep. 9, 2010, provisional application No. 61/384,456, filed on Sep. 20, 2010, provisional application No. 61/385,020, filed on Sep. 21, 2010, provisional application No. 61/252,151, filed on Oct. 15, 2009, provisional application No. 61/252,153, filed on Oct. 15, 2009, provisional application No. 61/206,354, filed on Jan. 28, 2009, provisional application No. 61/206,944, filed on Feb. 4, 2009, provisional application No. 61/207,393, filed on Feb. 10, 2009, provisional application No. 61/207,739, filed on Feb. 13, 2009.

(52) U.S. Cl.
CPC ............ *H04M 15/72* (2013.01); *H04M 15/80* (2013.01); *H04W 4/24* (2013.01); *H04M 15/46* (2013.01); *H04M 15/58* (2013.01); *H04M 15/66* (2013.01)

(58) Field of Classification Search
CPC .............. H04L 41/0816; H04L 12/14; H04L 41/5003; H04L 12/1403; H04L 41/0893; H04L 12/24; H04L 12/1407; H04M 15/58; H04M 2215/0188; H04M 15/00; H04M 15/61; H04M 15/66; H04M 15/8214; H04M 15/846; H04M 15/83; H04M 15/852; H04M 15/46; H04M 15/70; H04M 15/80; H04M 15/72; H04M 15/723; G06Q 30/06
USPC .............. 455/405, 406, 414.1, 432.1, 456.1; 705/16, 26.1, 28, 30, 34; 709/217–223
See application file for complete search history.

(56) References Cited

U.S. PATENT DOCUMENTS

| | | |
|---|---|---|
| 5,325,532 A | 6/1994 | Crosswy et al. |
| 5,572,528 A | 11/1996 | Shuen |
| 5,577,100 A | 11/1996 | McGregor et al. |
| 5,594,777 A | 1/1997 | Makkonen et al. |
| 5,617,539 A | 4/1997 | Ludwig et al. |
| 5,630,159 A | 5/1997 | Zancho |
| 5,633,484 A | 5/1997 | Zancho et al. |
| 5,633,868 A | 5/1997 | Baldwin et al. |
| 5,751,719 A | 5/1998 | Chen et al. |
| 5,754,953 A | 5/1998 | Briancon et al. |
| 5,774,532 A | 6/1998 | Gottlieb et al. |
| 5,794,142 A | 8/1998 | Vanttila et al. |
| 5,814,798 A | 9/1998 | Zancho |
| 5,889,477 A | 3/1999 | Fastenrath |
| 5,892,900 A | 4/1999 | Ginter et al. |
| 5,903,845 A | 5/1999 | Buhrmann et al. |
| 5,915,008 A | 6/1999 | Dulman |
| 5,915,226 A | 6/1999 | Martineau |
| 5,933,778 A | 8/1999 | Buhrmann et al. |
| 5,940,472 A | 8/1999 | Newman et al. |
| 5,974,439 A | 10/1999 | Bollella |
| 5,983,270 A | 11/1999 | Abraham et al. |
| 6,035,281 A | 3/2000 | Crosskey et al. |
| 6,038,452 A | 3/2000 | Strawczynski et al. |
| 6,038,540 A | 3/2000 | Krist et al. |
| 6,047,268 A | 4/2000 | Bartoli et al. |
| 6,047,270 A | 4/2000 | Joao et al. |
| 6,058,434 A | 5/2000 | Wilt et al. |
| 6,061,571 A | 5/2000 | Tamura |
| 6,064,878 A | 5/2000 | Denker et al. |
| 6,078,953 A | 6/2000 | Vaid et al. |
| 6,081,591 A | 6/2000 | Skoog |
| 6,098,878 A | 8/2000 | Dent et al. |
| 6,104,700 A | 8/2000 | Haddock et al. |
| 6,115,823 A | 9/2000 | Velasco et al. |
| 6,119,933 A | 9/2000 | Wong et al. |
| 6,125,391 A | 9/2000 | Meltzer et al. |
| 6,141,565 A | 10/2000 | Feuerstein et al. |
| 6,141,686 A | 10/2000 | Jackowski et al. |
| 6,148,336 A | 11/2000 | Thomas et al. |
| 6,154,738 A | 11/2000 | Call |
| 6,157,636 A | 12/2000 | Voit et al. |
| 6,185,576 B1 | 2/2001 | Mcintosh |
| 6,198,915 B1 | 3/2001 | McGregor et al. |
| 6,219,786 B1 | 4/2001 | Cunningham et al. |
| 6,226,277 B1 | 5/2001 | Chuah |
| 6,246,870 B1 | 6/2001 | Dent et al. |
| 6,263,055 B1 | 7/2001 | Garland et al. |
| 6,292,828 B1 | 9/2001 | Williams |
| 6,317,584 B1 | 11/2001 | Abu-Amara et al. |
| 6,370,139 B2 | 4/2002 | Redmond |
| 6,381,316 B2 | 4/2002 | Joyce et al. |
| 6,393,014 B1 | 5/2002 | Daly et al. |
| 6,397,259 B1 | 5/2002 | Lincke et al. |
| 6,401,113 B2 | 6/2002 | Lazaridis et al. |
| 6,418,147 B1 | 7/2002 | Wiedeman |
| 6,438,575 B1 | 8/2002 | Khan et al. |
| 6,445,777 B1 | 9/2002 | Clark |
| 6,449,479 B1 | 9/2002 | Sanchez |
| 6,466,984 B1 | 10/2002 | Naveh et al. |
| 6,477,670 B1 | 11/2002 | Ahmadvand |
| 6,502,131 B1 | 12/2002 | Vaid et al. |
| 6,505,114 B2 | 1/2003 | Luciani |
| 6,510,152 B1 | 1/2003 | Gerszberg et al. |
| 6,522,629 B1 | 2/2003 | Anderson, Sr. |
| 6,526,066 B1 | 2/2003 | Weaver |

(56) References Cited

U.S. PATENT DOCUMENTS

| | | |
|---|---|---|
| 6,532,235 B1 | 3/2003 | Benson et al. |
| 6,532,579 B2 | 3/2003 | Sato et al. |
| 6,535,855 B1 | 3/2003 | Cahill et al. |
| 6,535,949 B1 | 3/2003 | Parker |
| 6,539,082 B1 | 3/2003 | Lowe et al. |
| 6,542,465 B1 | 4/2003 | Wang |
| 6,542,500 B1 | 4/2003 | Gerszberg et al. |
| 6,542,992 B1 | 4/2003 | Peirce et al. |
| 6,546,016 B1 | 4/2003 | Gerszberg et al. |
| 6,563,806 B1 | 5/2003 | Yano et al. |
| 6,570,974 B1 | 5/2003 | Gerszberg et al. |
| 6,574,321 B1 | 6/2003 | Cox et al. |
| 6,574,465 B2 | 6/2003 | Marsh et al. |
| 6,578,076 B1 | 6/2003 | Putzolu |
| 6,581,092 B1 | 6/2003 | Motoyama |
| 6,591,098 B1 | 7/2003 | Shieh et al. |
| 6,598,034 B1 | 7/2003 | Kloth |
| 6,601,040 B1 | 7/2003 | Kolls |
| 6,603,969 B1 | 8/2003 | Vuoristo et al. |
| 6,603,975 B1 | 8/2003 | Inouchi et al. |
| 6,606,744 B1 | 8/2003 | Mikurak |
| 6,628,934 B2 | 9/2003 | Rosenberg et al. |
| 6,631,122 B1 | 10/2003 | Arunachalam et al. |
| 6,636,721 B2 | 10/2003 | Threadgill et al. |
| 6,639,975 B1 | 10/2003 | O'Neal et al. |
| 6,640,097 B2 | 10/2003 | Corrigan et al. |
| 6,640,334 B1 | 10/2003 | Rasmussen |
| 6,650,887 B2 | 11/2003 | McGregor et al. |
| 6,651,101 B1 | 11/2003 | Gai et al. |
| 6,654,786 B1 | 11/2003 | Fox et al. |
| 6,654,814 B1 | 11/2003 | Britton et al. |
| 6,658,254 B1 | 12/2003 | Purdy et al. |
| 6,662,014 B1 | 12/2003 | Walsh |
| 6,678,516 B2 | 1/2004 | Nordman et al. |
| 6,683,853 B1 | 1/2004 | Kannas et al. |
| 6,684,244 B1 | 1/2004 | Goldman et al. |
| 6,690,918 B2 | 2/2004 | Evans et al. |
| 6,694,362 B1 | 2/2004 | Secor et al. |
| 6,697,821 B2 | 2/2004 | Ziff et al. |
| 6,725,031 B2 | 4/2004 | Watler et al. |
| 6,725,256 B1 | 4/2004 | Albal et al. |
| 6,732,176 B1 | 5/2004 | Stewart et al. |
| 6,735,206 B1 | 5/2004 | Oki et al. |
| 6,748,195 B1 | 6/2004 | Phillips |
| 6,748,437 B1 | 6/2004 | Mankude et al. |
| 6,751,296 B1 | 6/2004 | Albal et al. |
| 6,754,470 B2 | 6/2004 | Hendrickson et al. |
| 6,757,717 B1 | 6/2004 | Goldstein |
| 6,760,417 B1 | 7/2004 | Wallenius |
| 6,763,000 B1 | 7/2004 | Walsh |
| 6,763,226 B1 | 7/2004 | McZeal, Jr. |
| 6,765,864 B1 | 7/2004 | Natarajan et al. |
| 6,765,925 B1 | 7/2004 | Sawyer et al. |
| 6,782,412 B2 | 8/2004 | Brophy et al. |
| 6,785,889 B1 | 8/2004 | Williams |
| 6,792,461 B1 | 9/2004 | Hericourt |
| 6,829,596 B1 | 12/2004 | Frazee |
| 6,829,696 B1 | 12/2004 | Balmer et al. |
| 6,839,340 B1 | 1/2005 | Voit et al. |
| 6,842,628 B1 | 1/2005 | Arnold et al. |
| 6,873,988 B2 | 3/2005 | Herrmann et al. |
| 6,876,653 B2 | 4/2005 | Ambe et al. |
| 6,879,825 B1 | 4/2005 | Daly |
| 6,882,718 B1 | 4/2005 | Smith |
| 6,885,997 B1 | 4/2005 | Roberts |
| 6,901,440 B1 | 5/2005 | Bimm et al. |
| 6,920,455 B1 | 7/2005 | Weschler |
| 6,922,562 B2 | 7/2005 | Ward et al. |
| 6,928,280 B1 | 8/2005 | Xanthos et al. |
| 6,934,249 B1 | 8/2005 | Bertin et al. |
| 6,934,751 B2 | 8/2005 | Jayapalan et al. |
| 6,947,723 B1 | 9/2005 | Gumani et al. |
| 6,947,985 B2 | 9/2005 | Hegli et al. |
| 6,952,428 B1 | 10/2005 | Necka et al. |
| 6,957,067 B1 | 10/2005 | Iyer et al. |
| 6,959,202 B2 | 10/2005 | Heinonen et al. |
| 6,959,393 B2 | 10/2005 | Hollis et al. |
| 6,965,667 B2 | 11/2005 | Trabandt et al. |
| 6,965,872 B1 | 11/2005 | Grdina |
| 6,967,958 B2 | 11/2005 | Ono et al. |
| 6,970,692 B2 | 11/2005 | Tysor |
| 6,970,927 B1 | 11/2005 | Stewart et al. |
| 6,982,733 B1 | 1/2006 | McNally et al. |
| 6,983,370 B2 | 1/2006 | Eaton et al. |
| 6,996,062 B1 | 2/2006 | Freed et al. |
| 6,996,076 B1 | 2/2006 | Forbes et al. |
| 6,996,393 B2 | 2/2006 | Pyhalammi et al. |
| 6,998,985 B2 | 2/2006 | Reisman et al. |
| 7,000,001 B2 | 2/2006 | Lazaridis |
| 7,002,920 B1 | 2/2006 | Ayyagari et al. |
| 7,007,295 B1 | 2/2006 | Rose et al. |
| 7,013,469 B2 | 3/2006 | Smith et al. |
| 7,017,189 B1 | 3/2006 | DeMello et al. |
| 7,020,781 B1 | 3/2006 | Saw et al. |
| 7,024,200 B2 | 4/2006 | McKenna et al. |
| 7,024,460 B2 | 4/2006 | Koopmas et al. |
| 7,027,055 B2 | 4/2006 | Anderson et al. |
| 7,027,408 B2 | 4/2006 | Nabkel et al. |
| 7,031,733 B2 | 4/2006 | Alminana et al. |
| 7,032,072 B1 | 4/2006 | Quinn et al. |
| 7,039,027 B2 | 5/2006 | Bridgelall |
| 7,039,037 B2 | 5/2006 | Wang et al. |
| 7,039,403 B2 | 5/2006 | Wong |
| 7,039,713 B1 | 5/2006 | Van Gunter et al. |
| 7,042,988 B2 | 5/2006 | Juitt et al. |
| 7,043,225 B1 | 5/2006 | Patel et al. |
| 7,043,226 B2 | 5/2006 | Yamauchi |
| 7,043,268 B2 | 5/2006 | Yukie et al. |
| 7,047,276 B2 | 5/2006 | Liu et al. |
| 7,058,022 B1 | 6/2006 | Carolan et al. |
| 7,058,968 B2 | 6/2006 | Rowland et al. |
| 7,068,600 B2 | 6/2006 | Cain |
| 7,069,248 B2 | 6/2006 | Huber |
| 7,082,422 B1 | 7/2006 | Zirngibl et al. |
| 7,084,775 B1 | 8/2006 | Smith |
| 7,092,696 B1 | 8/2006 | Hosain et al. |
| 7,095,754 B2 | 8/2006 | Benveniste |
| 7,102,620 B2 | 9/2006 | Harries et al. |
| 7,110,753 B2 | 9/2006 | Campen |
| 7,113,780 B2 | 9/2006 | McKenna et al. |
| 7,113,997 B2 | 9/2006 | Jayapalan et al. |
| 7,120,133 B1 | 10/2006 | Joo et al. |
| 7,131,578 B2 | 11/2006 | Paschini et al. |
| 7,133,386 B2 | 11/2006 | Holur et al. |
| 7,133,695 B2 | 11/2006 | Beyda |
| 7,136,361 B2 | 11/2006 | Benveniste |
| 7,139,569 B2 | 11/2006 | Kato |
| 7,142,876 B2 | 11/2006 | Trossen et al. |
| 7,149,229 B1 | 12/2006 | Leung |
| 7,149,521 B2 | 12/2006 | Sundar et al. |
| 7,151,764 B1 | 12/2006 | Heinonen et al. |
| 7,158,792 B1 | 1/2007 | Cook et al. |
| 7,162,237 B1 | 1/2007 | Silver et al. |
| 7,165,040 B2 | 1/2007 | Ehrman et al. |
| 7,167,078 B2 | 1/2007 | Pourchot |
| 7,174,156 B1 | 2/2007 | Mangal |
| 7,174,174 B2 | 2/2007 | Boris et al. |
| 7,177,919 B1 | 2/2007 | Truong et al. |
| 7,180,855 B1 | 2/2007 | Lin |
| 7,181,017 B1 | 2/2007 | Nagel et al. |
| 7,191,248 B2 | 3/2007 | Chattopadhyay et al. |
| 7,197,321 B2 | 3/2007 | Erskine et al. |
| 7,200,112 B2 | 4/2007 | Sundar et al. |
| 7,200,551 B1 | 4/2007 | Senez |
| 7,203,169 B1 | 4/2007 | Okholm et al. |
| 7,203,721 B1 | 4/2007 | Ben-Efraim et al. |
| 7,203,752 B2 | 4/2007 | Rice et al. |
| 7,209,664 B1 | 4/2007 | McNicol et al. |
| 7,212,491 B2 | 5/2007 | Koga |
| 7,219,123 B1 | 5/2007 | Fiechter et al. |
| 7,222,190 B2 | 5/2007 | Klinker et al. |
| 7,222,304 B2 | 5/2007 | Beaton et al. |
| 7,224,968 B2 | 5/2007 | Dobson et al. |
| 7,228,354 B2 | 6/2007 | Chambliss et al. |

(56) References Cited

U.S. PATENT DOCUMENTS

| | | |
|---|---|---|
| 7,236,780 B2 | 6/2007 | Benco |
| 7,242,668 B2 | 7/2007 | Kan et al. |
| 7,242,920 B2 | 7/2007 | Morris |
| 7,245,901 B2 | 7/2007 | McGregor et al. |
| 7,248,570 B2 | 7/2007 | Bahl et al. |
| 7,251,218 B2 | 7/2007 | Jorgensen |
| 7,260,382 B1 | 8/2007 | Lamb et al. |
| 7,266,371 B1 | 9/2007 | Amin et al. |
| 7,269,157 B2 | 9/2007 | Klinker et al. |
| 7,271,765 B2 | 9/2007 | Stilp et al. |
| 7,272,660 B1 | 9/2007 | Powers et al. |
| 7,280,816 B2 | 10/2007 | Fratti et al. |
| 7,280,818 B2 | 10/2007 | Clayton |
| 7,283,561 B1 | 10/2007 | Picher-Dempsey |
| 7,283,963 B1 | 10/2007 | Fitzpatrick et al. |
| 7,286,834 B2 | 10/2007 | Walter |
| 7,286,848 B2 | 10/2007 | Vireday et al. |
| 7,289,489 B1 | 10/2007 | Kung et al. |
| 7,290,283 B2 | 10/2007 | Copeland, III |
| 7,310,424 B2 | 12/2007 | Gehring et al. |
| 7,313,237 B2 | 12/2007 | Bahl et al. |
| 7,315,892 B2 | 1/2008 | Freimuth et al. |
| 7,317,699 B2 | 1/2008 | Godfrey et al. |
| 7,318,111 B2 | 1/2008 | Zhao |
| 7,320,029 B2 | 1/2008 | Rinne et al. |
| 7,320,781 B2 | 1/2008 | Lambert et al. |
| 7,322,044 B2 | 1/2008 | Hrastar |
| 7,324,447 B1 | 1/2008 | Morford |
| 7,325,037 B2 | 1/2008 | Lawson |
| 7,336,960 B2 | 2/2008 | Zavalkovsky et al. |
| 7,340,244 B1 | 3/2008 | Osborne et al. |
| 7,340,772 B2 | 3/2008 | Panasyuk et al. |
| 7,346,410 B2 | 3/2008 | Uchiyama |
| 7,349,695 B2 | 3/2008 | Oommen et al. |
| 7,349,698 B2 | 3/2008 | Gallagher et al. |
| 7,353,533 B2 | 4/2008 | Wright et al. |
| 7,356,011 B1 | 4/2008 | Waters et al. |
| 7,356,337 B2 | 4/2008 | Florence |
| 7,366,497 B2 | 4/2008 | Nagata |
| 7,366,654 B2 | 4/2008 | Moore |
| 7,366,934 B1 | 4/2008 | Narayan et al. |
| 7,369,848 B2 | 5/2008 | Jiang |
| 7,369,856 B2 | 5/2008 | Ovadia |
| 7,373,136 B2 | 5/2008 | Watler et al. |
| 7,373,179 B2 | 5/2008 | Stine et al. |
| 7,379,731 B2 | 5/2008 | Natsuno et al. |
| 7,388,950 B2 | 6/2008 | Elsey et al. |
| 7,389,412 B2 | 6/2008 | Sharma et al. |
| 7,391,724 B2 | 6/2008 | Alakoski et al. |
| 7,395,056 B2 | 7/2008 | Petermann |
| 7,395,244 B1 | 7/2008 | Kingsford |
| 7,401,338 B1 | 7/2008 | Bowen et al. |
| 7,403,763 B2 | 7/2008 | Maes |
| 7,409,447 B1 | 8/2008 | Assadzadeh |
| 7,409,569 B2 | 8/2008 | Illowsky et al. |
| 7,411,930 B2 | 8/2008 | Montojo et al. |
| 7,418,253 B2 | 8/2008 | Kavanah |
| 7,418,257 B2 | 8/2008 | Kim |
| 7,421,004 B2 | 9/2008 | Feher |
| 7,423,971 B1 | 9/2008 | Mohaban et al. |
| 7,428,750 B1 | 9/2008 | Dunn et al. |
| 7,433,362 B2 | 10/2008 | Mallya et al. |
| 7,436,816 B2 | 10/2008 | Mehta et al. |
| 7,440,433 B2 | 10/2008 | Rink et al. |
| 7,444,669 B1 | 10/2008 | Bahl et al. |
| 7,450,591 B2 | 11/2008 | Korling et al. |
| 7,450,927 B1 | 11/2008 | Creswell et al. |
| 7,454,191 B2 | 11/2008 | Dawson et al. |
| 7,457,265 B2 | 11/2008 | Julka et al. |
| 7,457,870 B1 | 11/2008 | Lownsbrough et al. |
| 7,460,837 B2 | 12/2008 | Diener |
| 7,466,652 B2 | 12/2008 | Lau et al. |
| 7,467,160 B2 | 12/2008 | McIntyre |
| 7,472,189 B2 | 12/2008 | Mallya et al. |
| 7,478,420 B2 | 1/2009 | Wright et al. |
| 7,486,185 B2 | 2/2009 | Culpepper et al. |
| 7,486,658 B2 | 2/2009 | Kumar |
| 7,489,918 B2 | 2/2009 | Zhou et al. |
| 7,493,659 B1 | 2/2009 | Wu et al. |
| 7,496,652 B2 | 2/2009 | Pezzutti |
| 7,499,438 B2 | 3/2009 | Hinman et al. |
| 7,499,537 B2 | 3/2009 | Elsey et al. |
| 7,502,672 B1 | 3/2009 | Kolls |
| 7,505,756 B2 | 3/2009 | Bahl |
| 7,505,795 B1 | 3/2009 | Lim et al. |
| 7,508,794 B2 | 3/2009 | Feather et al. |
| 7,508,799 B2 | 3/2009 | Sumner et al. |
| 7,512,128 B2 | 3/2009 | DiMambro et al. |
| 7,512,131 B2 | 3/2009 | Svensson et al. |
| 7,515,608 B2 | 4/2009 | Yuan et al. |
| 7,515,926 B2 | 4/2009 | Bu et al. |
| 7,516,219 B2 | 4/2009 | Moghaddam et al. |
| 7,522,549 B2 | 4/2009 | Karaoguz et al. |
| 7,522,576 B2 | 4/2009 | Du et al. |
| 7,526,541 B2 | 4/2009 | Roese et al. |
| 7,529,204 B2 | 5/2009 | Bourlas et al. |
| 7,533,158 B2 | 5/2009 | Grannan et al. |
| 7,535,880 B1 | 5/2009 | Hinman et al. |
| 7,536,695 B2 | 5/2009 | Alam et al. |
| 7,539,132 B2 | 5/2009 | Werner et al. |
| 7,539,862 B2 | 5/2009 | Edgett et al. |
| 7,540,408 B2 | 6/2009 | Levine et al. |
| 7,545,782 B2 | 6/2009 | Rayment et al. |
| 7,546,460 B2 | 6/2009 | Maes |
| 7,546,629 B2 | 6/2009 | Albert et al. |
| 7,548,875 B2 | 6/2009 | Mikkelsen et al. |
| 7,548,976 B2 | 6/2009 | Bahl et al. |
| 7,551,921 B2 | 6/2009 | Petermann |
| 7,551,922 B2 | 6/2009 | Roskowski et al. |
| 7,554,983 B1 | 6/2009 | Muppala |
| 7,555,757 B2 | 6/2009 | Smith et al. |
| 7,561,899 B2 | 7/2009 | Lee |
| 7,562,213 B1 | 7/2009 | Timms |
| 7,564,799 B2 | 7/2009 | Holland et al. |
| 7,565,141 B2 | 7/2009 | Macaluso |
| 7,565,328 B1 | 7/2009 | Donner |
| 7,574,509 B2 | 8/2009 | Nixon et al. |
| 7,574,731 B2 | 8/2009 | Fascenda |
| 7,577,431 B2 | 8/2009 | Jiang |
| 7,580,356 B1 | 8/2009 | Mishra et al. |
| 7,580,857 B2 | 8/2009 | VanFleet et al. |
| 7,583,964 B2 | 9/2009 | Wong |
| 7,584,298 B2 | 9/2009 | Klinker et al. |
| 7,585,217 B2 | 9/2009 | Lutnick et al. |
| 7,586,871 B2 | 9/2009 | Hamilton et al. |
| 7,593,417 B2 | 9/2009 | Wang et al. |
| 7,593,730 B2 | 9/2009 | Khandelwal et al. |
| 7,596,373 B2 | 9/2009 | Mcgregor et al. |
| 7,599,288 B2 | 10/2009 | Cole et al. |
| 7,599,714 B2 | 10/2009 | Kuzminskiy |
| 7,602,746 B2 | 10/2009 | Calhoun et al. |
| 7,603,710 B2 | 10/2009 | Harvey et al. |
| 7,606,357 B2 | 10/2009 | Daigle |
| 7,606,918 B2 | 10/2009 | Holzman et al. |
| 7,607,041 B2 | 10/2009 | Kraemer et al. |
| 7,609,650 B2 | 10/2009 | Roskowski et al. |
| 7,609,700 B1 | 10/2009 | Ying et al. |
| 7,610,047 B2 | 10/2009 | Hicks, III et al. |
| 7,610,057 B2 | 10/2009 | Bahl et al. |
| 7,610,328 B2 | 10/2009 | Haase et al. |
| 7,610,396 B2 | 10/2009 | Taglienti et al. |
| 7,612,712 B2 | 11/2009 | LaMance et al. |
| 7,613,444 B2 | 11/2009 | Lindqvist et al. |
| 7,614,051 B2 | 11/2009 | Glaum et al. |
| 7,616,962 B2 | 11/2009 | Oswal et al. |
| 7,617,516 B2 | 11/2009 | Huslak et al. |
| 7,620,041 B2 | 11/2009 | Dunn et al. |
| 7,620,065 B2 | 11/2009 | Falardeau |
| 7,620,162 B2 | 11/2009 | Aaron et al. |
| 7,620,383 B2 | 11/2009 | Taglienti et al. |
| 7,627,314 B2 | 12/2009 | Carlson et al. |
| 7,627,600 B2 | 12/2009 | Citron et al. |
| 7,627,767 B2 | 12/2009 | Sherman et al. |
| 7,627,872 B2 | 12/2009 | Hebeler et al. |

(56) References Cited

U.S. PATENT DOCUMENTS

| | | |
|---|---|---|
| 7,633,438 B2 | 12/2009 | Tysowski |
| 7,634,253 B2 | 12/2009 | Plestid et al. |
| 7,634,388 B2 | 12/2009 | Archer et al. |
| 7,636,574 B2 | 12/2009 | Poosala |
| 7,636,626 B2 | 12/2009 | Oesterling et al. |
| 7,643,411 B2 | 1/2010 | Andreasen et al. |
| 7,644,151 B2 | 1/2010 | Jerrim et al. |
| 7,644,267 B2 | 1/2010 | Ylikoski et al. |
| 7,644,414 B2 | 1/2010 | Smith et al. |
| 7,647,047 B2 | 1/2010 | Moghaddam et al. |
| 7,650,137 B2 | 1/2010 | Jobs et al. |
| 7,653,394 B2 | 1/2010 | McMillin |
| 7,656,271 B2 | 2/2010 | Ehrman et al. |
| 7,657,920 B2 | 2/2010 | Arseneau et al. |
| 7,660,419 B1 | 2/2010 | Ho |
| 7,661,124 B2 | 2/2010 | Ramanathan et al. |
| 7,664,494 B2 | 2/2010 | Jiang |
| 7,668,176 B2 | 2/2010 | Chuah |
| 7,668,612 B1 | 2/2010 | Okkonen |
| 7,668,903 B2 | 2/2010 | Edwards et al. |
| 7,668,966 B2 | 2/2010 | Klinker et al. |
| 7,676,673 B2 | 3/2010 | Weller et al. |
| 7,680,086 B2 | 3/2010 | Eglin |
| 7,681,226 B2 | 3/2010 | Kraemer et al. |
| 7,684,370 B2 | 3/2010 | Kezys |
| 7,685,131 B2 | 3/2010 | Batra et al. |
| 7,685,254 B2 | 3/2010 | Pandya |
| 7,685,530 B2 | 3/2010 | Sherrard et al. |
| 7,688,792 B2 | 3/2010 | Babbar et al. |
| 7,693,107 B2 | 4/2010 | De Froment |
| 7,693,720 B2 | 4/2010 | Kennewick et al. |
| 7,697,540 B2 | 4/2010 | Haddad et al. |
| 7,707,320 B2 | 4/2010 | Singhai et al. |
| 7,710,932 B2 | 5/2010 | Muthuswamy et al. |
| 7,711,848 B2 | 5/2010 | Maes |
| 7,719,966 B2 | 5/2010 | Luft et al. |
| 7,720,206 B2 | 5/2010 | Devolites et al. |
| 7,720,464 B2 | 5/2010 | Batta |
| 7,720,505 B2 | 5/2010 | Gopi et al. |
| 7,720,960 B2 | 5/2010 | Pruss et al. |
| 7,721,296 B2 | 5/2010 | Ricagni |
| 7,724,716 B2 | 5/2010 | Fadell |
| 7,725,570 B1 | 5/2010 | Lewis |
| 7,729,326 B2 | 6/2010 | Sekhar |
| 7,730,123 B1 | 6/2010 | Erickson et al. |
| 7,734,784 B1 | 6/2010 | Araujo et al. |
| 7,742,406 B1 | 6/2010 | Muppala |
| 7,742,961 B2 * | 6/2010 | Aaron .................. G06Q 40/02 705/35 |
| 7,743,119 B2 | 6/2010 | Friend et al. |
| 7,746,854 B2 | 6/2010 | Ambe et al. |
| 7,747,240 B1 | 6/2010 | Briscoe et al. |
| 7,747,699 B2 | 6/2010 | Prueitt et al. |
| 7,747,730 B1 | 6/2010 | Harlow |
| 7,752,330 B2 | 7/2010 | Olsen et al. |
| 7,756,056 B2 | 7/2010 | Kim et al. |
| 7,756,509 B2 | 7/2010 | Rajagopalan et al. |
| 7,756,534 B2 | 7/2010 | Anupam et al. |
| 7,756,757 B1 | 7/2010 | Oakes, III |
| 7,760,137 B2 | 7/2010 | Martucci et al. |
| 7,760,711 B1 | 7/2010 | Kung et al. |
| 7,760,861 B1 | 7/2010 | Croak et al. |
| 7,765,294 B2 | 7/2010 | Edwards et al. |
| 7,769,397 B2 | 8/2010 | Funato et al. |
| 7,770,785 B2 | 8/2010 | Jha et al. |
| 7,774,323 B2 | 8/2010 | Helfman |
| 7,774,412 B1 | 8/2010 | Schnepel |
| 7,774,456 B1 | 8/2010 | Lownsbrough et al. |
| 7,778,176 B2 | 8/2010 | Morford |
| 7,778,643 B2 | 8/2010 | Laroia et al. |
| 7,783,754 B2 | 8/2010 | Morford et al. |
| 7,788,386 B2 | 8/2010 | Svensson |
| 7,788,700 B1 | 8/2010 | Feezel et al. |
| 7,792,257 B1 | 9/2010 | Vanier et al. |
| 7,792,538 B2 | 9/2010 | Kozisek |
| 7,792,708 B2 | 9/2010 | Alva |
| 7,797,019 B2 | 9/2010 | Friedmann |
| 7,797,060 B2 | 9/2010 | Grgic et al. |
| 7,797,204 B2 | 9/2010 | Balent |
| 7,797,401 B2 | 9/2010 | Stewart et al. |
| 7,801,523 B1 | 9/2010 | Kenderov |
| 7,801,783 B2 | 9/2010 | Kende et al. |
| 7,801,985 B1 | 9/2010 | Pitkow et al. |
| 7,802,724 B1 | 9/2010 | Nohr |
| 7,805,140 B2 | 9/2010 | Friday et al. |
| 7,805,522 B2 | 9/2010 | Schluter et al. |
| 7,805,606 B2 * | 9/2010 | Birger .................. H04L 67/125 713/168 |
| 7,809,351 B1 | 10/2010 | Panda et al. |
| 7,809,372 B2 | 10/2010 | Rajaniemi |
| 7,813,746 B2 | 10/2010 | Rajkotia |
| 7,817,615 B1 | 10/2010 | Breau et al. |
| 7,817,983 B2 | 10/2010 | Cassett et al. |
| 7,822,837 B1 | 10/2010 | Urban et al. |
| 7,822,849 B2 | 10/2010 | Titus |
| 7,826,427 B2 | 11/2010 | Sood et al. |
| 7,826,607 B1 | 11/2010 | De Carvalho Resende et al. |
| 7,835,275 B1 | 11/2010 | Swan et al. |
| 7,843,831 B2 | 11/2010 | Morrill et al. |
| 7,843,843 B1 | 11/2010 | Papp, III et al. |
| 7,844,034 B1 | 11/2010 | Oh et al. |
| 7,844,728 B2 | 11/2010 | Anderson et al. |
| 7,848,768 B2 | 12/2010 | Omori et al. |
| 7,849,161 B2 | 12/2010 | Koch et al. |
| 7,849,170 B1 | 12/2010 | Hargens et al. |
| 7,849,477 B2 | 12/2010 | Cristofalo et al. |
| 7,853,250 B2 | 12/2010 | Harvey et al. |
| 7,853,255 B2 | 12/2010 | Karaoguz et al. |
| 7,853,656 B2 | 12/2010 | Yach et al. |
| 7,856,226 B2 | 12/2010 | Wong et al. |
| 7,860,088 B2 | 12/2010 | Lioy |
| 7,865,182 B2 | 1/2011 | Macaluso |
| 7,865,187 B2 | 1/2011 | Ramer et al. |
| 7,868,778 B2 | 1/2011 | Kenwright |
| 7,868,814 B1 | 1/2011 | Bergman |
| 7,873,001 B2 | 1/2011 | Silver |
| 7,873,344 B2 | 1/2011 | Bowser et al. |
| 7,873,346 B2 | 1/2011 | Petersson et al. |
| 7,873,540 B2 | 1/2011 | Arumugam |
| 7,873,705 B2 | 1/2011 | Kalish |
| 7,873,985 B2 | 1/2011 | Baum |
| 7,877,090 B2 | 1/2011 | Maes |
| 7,881,199 B2 | 2/2011 | Krstulich |
| 7,881,697 B2 | 2/2011 | Baker et al. |
| 7,882,029 B2 | 2/2011 | White |
| 7,882,247 B2 | 2/2011 | Sturniolo et al. |
| 7,882,560 B2 | 2/2011 | Kraemer et al. |
| 7,885,644 B2 | 2/2011 | Gallagher et al. |
| 7,886,047 B1 | 2/2011 | Potluri |
| 7,889,384 B2 | 2/2011 | Armentrout et al. |
| 7,890,084 B1 | 2/2011 | Dudziak et al. |
| 7,890,111 B2 | 2/2011 | Bugenhagen |
| 7,890,581 B2 | 2/2011 | Rao et al. |
| 7,894,431 B2 | 2/2011 | Goring et al. |
| 7,899,039 B2 | 3/2011 | Andreasen et al. |
| 7,899,438 B2 | 3/2011 | Baker et al. |
| 7,903,553 B2 | 3/2011 | Liu |
| 7,907,970 B2 | 3/2011 | Park et al. |
| 7,908,358 B1 | 3/2011 | Prasad et al. |
| 7,911,975 B2 | 3/2011 | Droz et al. |
| 7,912,025 B2 | 3/2011 | Pattenden et al. |
| 7,912,056 B1 | 3/2011 | Brassem |
| 7,916,707 B2 | 3/2011 | Fontaine |
| 7,917,130 B1 | 3/2011 | Christensen et al. |
| 7,920,529 B1 | 4/2011 | Mahler et al. |
| 7,921,463 B2 | 4/2011 | Sood et al. |
| 7,925,740 B2 | 4/2011 | Nath et al. |
| 7,925,778 B1 | 4/2011 | Wijnands et al. |
| 7,929,446 B2 | 4/2011 | Bozarth et al. |
| 7,929,959 B2 | 4/2011 | DeAtley et al. |
| 7,929,960 B2 | 4/2011 | Martin et al. |
| 7,929,973 B2 | 4/2011 | Zavalkovsky et al. |
| 7,930,327 B2 | 4/2011 | Craft et al. |
| 7,930,446 B2 | 4/2011 | Kesselman et al. |

(56) References Cited

U.S. PATENT DOCUMENTS

| | | |
|---|---|---|
| 7,930,553 B2 | 4/2011 | Satarasinghe et al. |
| 7,933,274 B2 | 4/2011 | Verma et al. |
| 7,936,736 B2 | 5/2011 | Proctor, Jr. et al. |
| 7,937,069 B2 | 5/2011 | Rassam |
| 7,937,450 B2 | 5/2011 | Janik |
| 7,937,470 B2 | 5/2011 | Curley et al. |
| 7,940,685 B1 | 5/2011 | Breslau et al. |
| 7,940,751 B2 | 5/2011 | Hansen |
| 7,941,184 B2 | 5/2011 | Prendergast et al. |
| 7,944,948 B2 | 5/2011 | Chow et al. |
| 7,945,238 B2 | 5/2011 | Baker et al. |
| 7,945,240 B1 | 5/2011 | Klock et al. |
| 7,945,470 B1 | 5/2011 | Cohen et al. |
| 7,945,945 B2 | 5/2011 | Graham et al. |
| 7,948,952 B2 | 5/2011 | Hurtta et al. |
| 7,948,953 B2 | 5/2011 | Melkote et al. |
| 7,948,968 B2 | 5/2011 | Voit et al. |
| 7,949,529 B2 | 5/2011 | Weider et al. |
| 7,953,808 B2 | 5/2011 | Sharp et al. |
| 7,953,877 B2 | 5/2011 | Vemula et al. |
| 7,957,020 B2 | 6/2011 | Mine et al. |
| 7,957,381 B2 | 6/2011 | Clermidy et al. |
| 7,957,511 B2 | 6/2011 | Drudis et al. |
| 7,958,029 B1 | 6/2011 | Bobich et al. |
| 7,962,622 B2 | 6/2011 | Friend et al. |
| 7,965,983 B1 | 6/2011 | Swan et al. |
| 7,966,405 B2 | 6/2011 | Sundaresan et al. |
| 7,967,682 B2 | 6/2011 | Huizinga |
| 7,969,950 B2 | 6/2011 | Iyer et al. |
| 7,970,350 B2 | 6/2011 | Sheynman |
| 7,970,426 B2 | 6/2011 | Poe et al. |
| 7,974,624 B2 | 7/2011 | Gallagher et al. |
| 7,975,184 B2 | 7/2011 | Goff et al. |
| 7,978,627 B2 | 7/2011 | Taylor et al. |
| 7,978,686 B2 | 7/2011 | Goyal et al. |
| 7,979,069 B2 | 7/2011 | Hupp et al. |
| 7,979,889 B2 | 7/2011 | Gladstone et al. |
| 7,979,896 B2 | 7/2011 | McMurtry et al. |
| 7,984,130 B2 | 7/2011 | Bogineni et al. |
| 7,984,511 B2 | 7/2011 | Kocher et al. |
| 7,986,935 B1 | 7/2011 | D'Souza et al. |
| 7,987,449 B1 | 7/2011 | Marolia et al. |
| 7,987,496 B2 | 7/2011 | Bryce et al. |
| 7,987,510 B2 | 7/2011 | Kocher et al. |
| 3,000,276 A1 | 8/2011 | Scherzer et al. |
| 3,000,318 A1 | 8/2011 | Wiley et al. |
| 3,005,009 A1 | 8/2011 | McKee et al. |
| 3,005,459 A1 | 8/2011 | Balsillie |
| 3,005,726 A1 | 8/2011 | Bao |
| 3,005,913 A1 | 8/2011 | Carlander |
| 3,005,988 A1 | 8/2011 | Maes |
| 7,990,049 B2 | 8/2011 | Shioya |
| 8,010,080 B1 | 8/2011 | Thenthiruperai et al. |
| 8,010,081 B1 | 8/2011 | Roskowski |
| 8,010,082 B2 | 8/2011 | Sutaria et al. |
| 8,010,623 B2 | 8/2011 | Fitch et al. |
| 8,010,990 B2 | 8/2011 | Ferguson et al. |
| 8,015,133 B1 | 9/2011 | Wu et al. |
| 8,015,234 B2 | 9/2011 | Lum et al. |
| 8,015,249 B2 | 9/2011 | Nayak et al. |
| 8,019,687 B2 | 9/2011 | Wang et al. |
| 8,019,820 B2 | 9/2011 | Son et al. |
| 8,019,846 B2 | 9/2011 | Roelens et al. |
| 8,019,868 B2 | 9/2011 | Rao et al. |
| 8,019,886 B2 | 9/2011 | Harrang et al. |
| 8,023,425 B2 | 9/2011 | Raleigh |
| 8,024,397 B1 | 9/2011 | Erickson et al. |
| 8,024,424 B2 | 9/2011 | Freimuth et al. |
| 8,027,339 B2 | 9/2011 | Short et al. |
| 8,031,601 B2 | 10/2011 | Feroz et al. |
| 8,032,168 B2 | 10/2011 | Ikaheimo |
| 8,032,409 B1 | 10/2011 | Mikurak |
| 8,032,899 B2 | 10/2011 | Archer et al. |
| 8,036,387 B2 | 10/2011 | Kudelski et al. |
| 8,036,600 B2 | 10/2011 | Garrett et al. |
| 8,044,792 B2 | 10/2011 | Orr et al. |
| 8,045,973 B2 | 10/2011 | Chambers |
| 8,046,449 B2 | 10/2011 | Yoshiuchi |
| 8,050,275 B1 | 11/2011 | Iyer |
| 8,050,690 B2 | 11/2011 | Neeraj |
| 8,050,705 B2 | 11/2011 | Sicher et al. |
| 8,054,778 B2 | 11/2011 | Polson |
| 8,059,530 B1 | 11/2011 | Cole |
| 8,060,017 B2 | 11/2011 | Schlicht et al. |
| 8,060,463 B1 | 11/2011 | Spiegel |
| 8,060,603 B2 | 11/2011 | Caunter et al. |
| 8,064,418 B2 | 11/2011 | Maki |
| 8,064,896 B2 | 11/2011 | Bell et al. |
| 8,065,365 B2 | 11/2011 | Saxena et al. |
| 8,068,824 B2 | 11/2011 | Shan et al. |
| 8,068,829 B2 | 11/2011 | Lemond et al. |
| 8,073,427 B2 | 12/2011 | Koch et al. |
| 8,073,721 B1 | 12/2011 | Lewis |
| 8,078,140 B2 | 12/2011 | Baker et al. |
| 8,078,163 B2 | 12/2011 | Lemond et al. |
| 8,085,808 B2 | 12/2011 | Brusca et al. |
| 8,086,398 B2 | 12/2011 | Sanchez et al. |
| 8,086,497 B1 | 12/2011 | Oakes, III |
| 8,086,791 B2 | 12/2011 | Caulkins |
| 8,090,359 B2 | 1/2012 | Proctor, Jr. et al. |
| 8,090,361 B2 | 1/2012 | Hagan |
| 8,090,616 B2 | 1/2012 | Proctor, Jr. et al. |
| 8,091,087 B2 | 1/2012 | Ali et al. |
| 8,094,551 B2 | 1/2012 | Huber et al. |
| 8,095,112 B2 | 1/2012 | Chow et al. |
| 8,095,124 B2 | 1/2012 | Balia |
| 8,095,175 B2 | 1/2012 | Todd et al. |
| 8,095,640 B2 | 1/2012 | Guingo et al. |
| 8,095,666 B2 | 1/2012 | Schmidt et al. |
| 8,098,579 B2 | 1/2012 | Ray et al. |
| 8,099,077 B2 | 1/2012 | Chowdhury et al. |
| 8,099,517 B2 | 1/2012 | Jia et al. |
| 8,102,814 B2 | 1/2012 | Rahman et al. |
| 8,103,285 B2 | 1/2012 | Kalhan |
| 8,104,080 B2 | 1/2012 | Burns et al. |
| 8,107,953 B2 | 1/2012 | Zimmerman et al. |
| 8,108,520 B2 | 1/2012 | Ruutu et al. |
| 8,108,680 B2 | 1/2012 | Murray |
| 8,112,435 B2 | 2/2012 | Epstein et al. |
| 8,116,223 B2 | 2/2012 | Tian et al. |
| 8,116,749 B2 | 2/2012 | Proctor, Jr. et al. |
| 8,116,781 B2 | 2/2012 | Chen et al. |
| 8,121,117 B1 | 2/2012 | Amdahl et al. |
| 8,122,128 B2 | 2/2012 | Burke, II et al. |
| 8,122,249 B2 | 2/2012 | Falk et al. |
| 8,125,897 B2 | 2/2012 | Ray et al. |
| 8,126,123 B2 | 2/2012 | Cai et al. |
| 8,126,396 B2 | 2/2012 | Bennett |
| 8,126,476 B2 | 2/2012 | Vardi et al. |
| 8,126,722 B2 | 2/2012 | Robb et al. |
| 8,130,793 B2 | 3/2012 | Edwards et al. |
| 8,131,256 B2 | 3/2012 | Martti et al. |
| 8,131,281 B1 | 3/2012 | Hildner et al. |
| 8,131,301 B1 | 3/2012 | Ahmed et al. |
| 8,131,840 B1 | 3/2012 | Denker |
| 8,131,858 B2 | 3/2012 | Agulnik et al. |
| 8,132,256 B2 | 3/2012 | Bari |
| 8,134,954 B2 | 3/2012 | Godfrey et al. |
| 8,135,388 B1 | 3/2012 | Gailloux et al. |
| 8,135,392 B2 | 3/2012 | Marcellino et al. |
| 8,135,657 B2 | 3/2012 | Kapoor et al. |
| 8,140,690 B2 | 3/2012 | Ly et al. |
| 8,144,591 B2 | 3/2012 | Ghai et al. |
| 8,144,853 B1 | 3/2012 | Aboujaoude et al. |
| 8,145,194 B2 | 3/2012 | Yoshikawa et al. |
| 8,146,142 B2 | 3/2012 | Lortz et al. |
| 8,149,748 B2 | 4/2012 | Bata et al. |
| 8,149,771 B2 | 4/2012 | Khivesara et al. |
| 8,149,823 B2 | 4/2012 | Turcan et al. |
| 8,150,394 B2 | 4/2012 | Bianconi et al. |
| 8,150,431 B2 | 4/2012 | Wolovitz et al. |
| 8,151,205 B2 | 4/2012 | Follmann et al. |
| 8,152,246 B2 | 4/2012 | Miller et al. |
| 8,155,155 B1 | 4/2012 | Chow et al. |

(56) References Cited

U.S. PATENT DOCUMENTS

| | | |
|---|---|---|
| 8,155,620 B2 | 4/2012 | Wang et al. |
| 8,155,666 B2 | 4/2012 | Alizadeh-Shabdiz |
| 8,155,670 B2 | 4/2012 | Fullam et al. |
| 8,156,206 B2 | 4/2012 | Kiley et al. |
| 8,159,520 B1 | 4/2012 | Dhanoa et al. |
| 8,160,015 B2 | 4/2012 | Rashid et al. |
| 8,160,056 B2 | 4/2012 | Van der Merwe et al. |
| 8,160,554 B2 | 4/2012 | Gosselin et al. |
| 8,160,555 B2 | 4/2012 | Gosselin et al. |
| 8,160,556 B2 | 4/2012 | Gosselin et al. |
| 8,160,598 B2 | 4/2012 | Savoor |
| 8,165,576 B2 | 4/2012 | Raju et al. |
| 8,166,040 B2 | 4/2012 | Brindisi et al. |
| 8,166,554 B2 | 4/2012 | John |
| 8,170,553 B2 | 5/2012 | Bennett |
| 8,174,378 B2 | 5/2012 | Richman et al. |
| 8,174,970 B2 | 5/2012 | Adamczyk et al. |
| 8,175,574 B1 | 5/2012 | Panda et al. |
| 8,175,966 B2 | 5/2012 | Steinberg et al. |
| 8,180,333 B1 | 5/2012 | Wells et al. |
| 8,180,881 B2 | 5/2012 | Seo et al. |
| 8,180,886 B2 | 5/2012 | Overcash et al. |
| 8,184,530 B1 | 5/2012 | Swan et al. |
| 8,184,590 B2 | 5/2012 | Rosenblatt |
| 8,185,088 B2 | 5/2012 | Klein et al. |
| 8,185,093 B2 | 5/2012 | Jheng et al. |
| 8,185,127 B1 | 5/2012 | Cai et al. |
| 8,185,152 B1 | 5/2012 | Goldner |
| 8,185,158 B2 | 5/2012 | Tamura et al. |
| 8,190,087 B2 | 5/2012 | Fisher et al. |
| 8,190,122 B1 | 5/2012 | Alexander et al. |
| 8,190,675 B2 | 5/2012 | Tribbett |
| 8,191,106 B2 | 5/2012 | Choyi et al. |
| 8,191,116 B1 | 5/2012 | Gazzard |
| 8,191,124 B2 | 5/2012 | Wynn et al. |
| 8,194,549 B2 | 6/2012 | Huber et al. |
| 8,194,553 B2 | 6/2012 | Liang et al. |
| 8,194,572 B2 | 6/2012 | Horvath et al. |
| 8,194,581 B1 | 6/2012 | Schroeder et al. |
| 8,195,093 B2 | 6/2012 | Garrett et al. |
| 8,195,153 B1 | 6/2012 | Frencel et al. |
| 8,195,163 B2 | 6/2012 | Gisby et al. |
| 8,195,661 B2 | 6/2012 | Kalavade |
| 8,196,199 B2 | 6/2012 | Hrastar et al. |
| 8,200,163 B2 | 6/2012 | Hoffman |
| 8,200,200 B1 | 6/2012 | Belser et al. |
| 8,200,509 B2 | 6/2012 | Kenedy et al. |
| 8,200,775 B2 | 6/2012 | Moore |
| 8,200,818 B2 | 6/2012 | Freund et al. |
| 8,204,190 B2 | 6/2012 | Bang et al. |
| 8,204,505 B2 | 6/2012 | Jin et al. |
| 8,204,794 B1 | 6/2012 | Peng et al. |
| 8,208,788 B2 | 6/2012 | Ando et al. |
| 8,208,919 B2 | 6/2012 | Kotecha |
| 8,213,296 B2 | 7/2012 | Shannon et al. |
| 8,213,363 B2 | 7/2012 | Ying et al. |
| 8,214,536 B2 | 7/2012 | Zhao |
| 8,214,890 B2 | 7/2012 | Kirovski et al. |
| 8,219,134 B2 | 7/2012 | Maharajh et al. |
| 8,223,655 B2 | 7/2012 | Heinz et al. |
| 8,223,741 B1 | 7/2012 | Bartlett et al. |
| 8,224,382 B2 | 7/2012 | Bultman |
| 8,224,773 B2 | 7/2012 | Spiegel |
| 8,228,818 B2 | 7/2012 | Chase et al. |
| 8,229,394 B2 | 7/2012 | Karlberg |
| 8,229,914 B2 | 7/2012 | Ramer et al. |
| 8,230,061 B2 | 7/2012 | Hassan et al. |
| 8,233,433 B2 | 7/2012 | Kalhan |
| 8,233,878 B2 | 7/2012 | Gosnell et al. |
| 8,233,883 B2 | 7/2012 | De Froment |
| 8,233,895 B2 | 7/2012 | Tysowski |
| 8,234,583 B2 | 7/2012 | Sloo et al. |
| 8,238,287 B1 | 8/2012 | Gopi et al. |
| 8,238,913 B1 | 8/2012 | Bhattacharyya et al. |
| 8,239,520 B2 | 8/2012 | Grah |
| 8,242,959 B2 | 8/2012 | Mia et al. |
| 8,244,241 B2 | 8/2012 | Montemurro |
| 8,249,601 B2 | 8/2012 | Emberson et al. |
| 8,254,880 B2 | 8/2012 | Aaltonen et al. |
| 8,254,915 B2 | 8/2012 | Kozisek |
| 8,255,515 B1 | 8/2012 | Melman et al. |
| 8,255,534 B2 | 8/2012 | Assadzadeh |
| 8,255,689 B2 | 8/2012 | Kim et al. |
| 8,259,692 B2 | 9/2012 | Bajko |
| 8,264,965 B2 | 9/2012 | Dolganow et al. |
| 8,265,004 B2 | 9/2012 | Toutonghi |
| 8,266,249 B2 | 9/2012 | Hu |
| 8,266,269 B2 | 9/2012 | Short et al. |
| 8,266,681 B2 | 9/2012 | Deshpande et al. |
| 8,270,955 B2 | 9/2012 | Ramer et al. |
| 8,270,972 B2 | 9/2012 | Otting et al. |
| 8,271,025 B2 | 9/2012 | Brisebois et al. |
| 8,271,045 B2 | 9/2012 | Parolkar et al. |
| 8,271,049 B2 | 9/2012 | Silver et al. |
| 8,271,992 B2 | 9/2012 | Chatley et al. |
| 8,275,415 B2 | 9/2012 | Huslak |
| 8,275,830 B2 | 9/2012 | Raleigh |
| 8,279,067 B2 | 10/2012 | Berger et al. |
| 8,279,864 B2 | 10/2012 | Wood |
| 8,280,351 B1 | 10/2012 | Ahmed et al. |
| 8,280,354 B2 | 10/2012 | Smith et al. |
| 8,284,740 B2 | 10/2012 | O'Connor |
| 8,285,249 B2 | 10/2012 | Baker et al. |
| 8,285,992 B2 | 10/2012 | Mathur et al. |
| 8,290,820 B2 | 10/2012 | Plastina et al. |
| 8,291,238 B2 | 10/2012 | Ginter et al. |
| 8,291,439 B2 | 10/2012 | Jethi et al. |
| 8,296,404 B2 | 10/2012 | McDysan et al. |
| 8,300,575 B2 | 10/2012 | Willars |
| 8,301,513 B1 | 10/2012 | Peng et al. |
| 8,306,505 B2 | 11/2012 | Bennett |
| 8,306,518 B1 | 11/2012 | Gailloux |
| 8,306,741 B2 | 11/2012 | Tu |
| 8,307,067 B2 | 11/2012 | Ryan |
| 8,307,095 B2 | 11/2012 | Clark et al. |
| 8,310,943 B2 | 11/2012 | Mehta et al. |
| 8,315,198 B2 | 11/2012 | Corneille et al. |
| 8,315,593 B2 | 11/2012 | Gallant et al. |
| 8,315,594 B1 | 11/2012 | Mauser et al. |
| 8,315,718 B2 | 11/2012 | Caffrey et al. |
| 8,315,999 B2 | 11/2012 | Chatley et al. |
| 8,320,244 B2 | 11/2012 | Muqattash et al. |
| 8,320,902 B2 | 11/2012 | Moring et al. |
| 8,320,949 B2 | 11/2012 | Matta |
| 8,325,638 B2 | 12/2012 | Jin et al. |
| 8,325,906 B2 | 12/2012 | Fullarton et al. |
| 8,326,319 B2 | 12/2012 | Davis |
| 8,326,359 B2 | 12/2012 | Kauffman |
| 8,326,828 B2 | 12/2012 | Zhou et al. |
| 8,331,223 B2 | 12/2012 | Hill et al. |
| 8,331,293 B2 | 12/2012 | Sood |
| 8,332,375 B2 | 12/2012 | Chatley et al. |
| 8,332,517 B2 | 12/2012 | Russell |
| 8,335,161 B2 | 12/2012 | Foottit et al. |
| 8,339,991 B2 | 12/2012 | Biswas et al. |
| 8,340,625 B1 | 12/2012 | Johnson et al. |
| 8,340,628 B2 | 12/2012 | Taylor et al. |
| 8,340,644 B2 | 12/2012 | Sigmund et al. |
| 8,340,678 B1 | 12/2012 | Pandey |
| 8,340,718 B2 | 12/2012 | Colonna et al. |
| 8,346,023 B2 | 1/2013 | Lin |
| 8,346,210 B2 | 1/2013 | Balsan et al. |
| 8,346,225 B2 * | 1/2013 | Raleigh ................ H04W 28/24 709/224 |
| 8,346,923 B2 | 1/2013 | Rowles et al. |
| 8,347,104 B2 | 1/2013 | Pathiyal |
| 8,347,362 B2 | 1/2013 | Cai et al. |
| 8,347,378 B2 | 1/2013 | Merkin et al. |
| 8,350,700 B2 | 1/2013 | Fast et al. |
| 8,351,592 B2 | 1/2013 | Freeny, Jr. et al. |
| 8,351,898 B2 | 1/2013 | Raleigh |
| 8,352,360 B2 | 1/2013 | De Judicibus et al. |
| 8,352,630 B2 | 1/2013 | Hart |
| 8,352,980 B2 | 1/2013 | Howcroft |

(56) References Cited

U.S. PATENT DOCUMENTS

| | | |
|---|---|---|
| 8,353,001 B2 | 1/2013 | Herrod |
| 8,355,570 B2 | 1/2013 | Karsanbhai et al. |
| 8,355,696 B1 | 1/2013 | Olding et al. |
| 8,356,336 B2 | 1/2013 | Johnston et al. |
| 8,358,638 B2 | 1/2013 | Scherzer et al. |
| 8,358,975 B2 | 1/2013 | Bahl et al. |
| 8,363,658 B1 | 1/2013 | Delker et al. |
| 8,363,799 B2 | 1/2013 | Gruchala et al. |
| 8,364,089 B2 | 1/2013 | Phillips |
| 8,364,806 B2 | 1/2013 | Short et al. |
| 8,369,274 B2 | 2/2013 | Sawai |
| 8,370,477 B2 | 2/2013 | Short et al. |
| 8,370,483 B2 | 2/2013 | Choong et al. |
| 8,374,090 B2 | 2/2013 | Morrill et al. |
| 8,374,102 B2 | 2/2013 | Luft et al. |
| 8,374,592 B2 | 2/2013 | Proctor, Jr. et al. |
| 8,375,128 B2 | 2/2013 | Tofighbakhsh et al. |
| 8,375,136 B2 | 2/2013 | Roman et al. |
| 8,379,847 B2 | 2/2013 | Bell et al. |
| 8,380,247 B2 | 2/2013 | Engstrom |
| 8,380,804 B2 | 2/2013 | Jain et al. |
| 8,385,199 B1 | 2/2013 | Coward et al. |
| 8,385,896 B1 | 2/2013 | Proctor, Jr. et al. |
| 8,385,964 B2 | 2/2013 | Haney |
| 8,385,975 B2 | 2/2013 | Forutanpour et al. |
| 8,386,386 B1 | 2/2013 | Zhu |
| 8,391,262 B2 | 3/2013 | Maki et al. |
| 8,391,834 B2 | 3/2013 | Raleigh |
| 8,392,982 B2 | 3/2013 | Harris et al. |
| 8,396,458 B2 | 3/2013 | Raleigh |
| 8,396,929 B2 | 3/2013 | Helfman et al. |
| 8,401,906 B2 | 3/2013 | Ruckart |
| 8,401,968 B1 | 3/2013 | Schattauer et al. |
| 8,402,165 B2 | 3/2013 | Deu-Ngoc et al. |
| 8,402,540 B2 | 3/2013 | Kapoor et al. |
| 8,406,427 B2 | 3/2013 | Chand et al. |
| 8,406,736 B2 | 3/2013 | Das et al. |
| 8,406,756 B1 | 3/2013 | Reeves et al. |
| 8,407,472 B2 | 3/2013 | Hao et al. |
| 8,407,763 B2 | 3/2013 | Weller et al. |
| 8,411,587 B2 | 4/2013 | Curtis et al. |
| 8,411,691 B2 | 4/2013 | Aggarwal |
| 8,412,798 B1 | 4/2013 | Wang |
| 8,413,245 B2 | 4/2013 | Kraemer et al. |
| 8,418,168 B2 | 4/2013 | Tyhurst et al. |
| 8,422,988 B1 | 4/2013 | Keshav |
| 8,423,016 B2 | 4/2013 | Buckley et al. |
| 8,429,403 B2 | 4/2013 | Moret et al. |
| 8,437,734 B2 | 5/2013 | Ray et al. |
| 8,441,955 B2 | 5/2013 | Wilkinson et al. |
| 8,442,015 B2 | 5/2013 | Behzad et al. |
| 8,442,507 B2 | 5/2013 | Duggal et al. |
| 8,443,390 B2 | 5/2013 | Lo et al. |
| 8,446,831 B2 | 5/2013 | Kwan et al. |
| 8,447,324 B2 | 5/2013 | Shuman et al. |
| 8,447,607 B2 | 5/2013 | Weider et al. |
| 8,447,980 B2 | 5/2013 | Godfrey et al. |
| 8,448,015 B2 | 5/2013 | Gerhart |
| 8,452,858 B2 | 5/2013 | Wu et al. |
| 8,457,603 B2 | 6/2013 | El-Kadri et al. |
| 8,461,958 B2 | 6/2013 | Saenz et al. |
| 8,463,194 B2 | 6/2013 | Erlenback et al. |
| 8,463,232 B2 | 6/2013 | Tuli et al. |
| 8,468,337 B2 | 6/2013 | Gaur et al. |
| 8,472,371 B1 | 6/2013 | Bari et al. |
| 8,477,778 B2 | 7/2013 | Lehmann, Jr. et al. |
| 8,478,840 B2 | 7/2013 | Skutela et al. |
| 8,483,057 B2 | 7/2013 | Cuervo |
| 8,483,135 B2 | 7/2013 | Cai et al. |
| 8,483,694 B2 | 7/2013 | Lewis et al. |
| 8,484,327 B2 | 7/2013 | Werner et al. |
| 8,484,568 B2 | 7/2013 | Rados et al. |
| 8,488,597 B2 | 7/2013 | Nie et al. |
| 8,489,110 B2 | 7/2013 | Frank et al. |
| 8,489,720 B1 | 7/2013 | Morford et al. |
| 8,494,559 B1 | 7/2013 | Malmi |
| 8,495,181 B2 | 7/2013 | Venkatraman et al. |
| 8,495,207 B2 | 7/2013 | Lee |
| 8,495,227 B2 | 7/2013 | Kaminsky et al. |
| 8,495,360 B2 | 7/2013 | Falk et al. |
| 8,495,700 B2 | 7/2013 | Shahbazi |
| 8,495,743 B2 | 7/2013 | Kraemer et al. |
| 8,499,087 B2 | 7/2013 | Hu |
| RE44,412 E | 8/2013 | Naqvi et al. |
| 8,500,533 B2 | 8/2013 | Lutnick et al. |
| 8,503,358 B2 | 8/2013 | Hanson et al. |
| 8,503,455 B2 | 8/2013 | Heikens |
| 8,504,032 B2 | 8/2013 | Lott et al. |
| 8,504,574 B2 | 8/2013 | Dvorak et al. |
| 8,504,687 B2 | 8/2013 | Maffione et al. |
| 8,504,690 B2 | 8/2013 | Shah et al. |
| 8,504,729 B2 | 8/2013 | Pezzutti |
| 8,505,073 B2 | 8/2013 | Taglienti et al. |
| 8,509,082 B2 | 8/2013 | Heinz et al. |
| 8,510,743 B2 | 8/2013 | Hackborn et al. |
| 8,510,804 B1 | 8/2013 | Bonn et al. |
| 8,514,927 B2 | 8/2013 | Sundararajan et al. |
| 8,516,552 B2 | 8/2013 | Raleigh |
| 8,520,589 B2 | 8/2013 | Bhatt et al. |
| 8,520,595 B2 | 8/2013 | Yadav et al. |
| 8,521,110 B2 | 8/2013 | Rofougaran |
| 8,521,775 B1 | 8/2013 | Poh et al. |
| 8,522,039 B2 | 8/2013 | Hyndman et al. |
| 8,522,249 B2 | 8/2013 | Beaule |
| 8,522,337 B2 | 8/2013 | Adusumilli et al. |
| 8,523,547 B2 | 9/2013 | Pekrul |
| 8,526,329 B2 | 9/2013 | Mahany et al. |
| 8,526,350 B2 | 9/2013 | Xue et al. |
| 8,527,013 B2 | 9/2013 | Guba et al. |
| 8,527,410 B2 | 9/2013 | Markki et al. |
| 8,527,662 B2 | 9/2013 | Biswas et al. |
| 8,528,068 B1 | 9/2013 | Weglein et al. |
| 8,531,954 B2 | 9/2013 | McNaughton et al. |
| 8,531,995 B2 | 9/2013 | Khan et al. |
| 8,532,610 B2 | 9/2013 | Manning Cassett et al. |
| 8,533,341 B2 | 9/2013 | Aguirre et al. |
| 8,533,775 B2 | 9/2013 | Alcorn et al. |
| 8,535,160 B2 | 9/2013 | Lutnick et al. |
| 8,538,394 B2 | 9/2013 | Zimmerman et al. |
| 8,538,421 B2 | 9/2013 | Brisebois et al. |
| 8,538,458 B2 | 9/2013 | Haney |
| 8,539,544 B2 | 9/2013 | Garimella et al. |
| 8,539,561 B2 | 9/2013 | Gupta et al. |
| 8,543,265 B2 | 9/2013 | Ekhaguere et al. |
| 8,543,814 B2 | 9/2013 | Laitinen et al. |
| 8,544,105 B2 | 9/2013 | Mclean et al. |
| 8,548,427 B2 | 10/2013 | Chow et al. |
| 8,548,428 B2 | 10/2013 | Raleigh |
| 8,549,173 B1 | 10/2013 | Wu et al. |
| 8,549,588 B2 * | 10/2013 | Wynn .................. H04L 63/062 726/28 |
| 8,554,876 B2 | 10/2013 | Winsor |
| 8,559,369 B2 | 10/2013 | Barkan |
| 8,561,138 B2 | 10/2013 | Rothman et al. |
| 8,565,746 B2 | 10/2013 | Hoffman |
| 8,566,236 B2 | 10/2013 | Busch |
| 8,571,474 B2 | 10/2013 | Chavez et al. |
| 8,571,501 B2 | 10/2013 | Miller et al. |
| 8,571,598 B2 | 10/2013 | Valavi |
| 8,571,993 B2 | 10/2013 | Kocher et al. |
| 8,572,117 B2 | 10/2013 | Rappaport |
| 8,572,256 B2 | 10/2013 | Babbar |
| 8,583,499 B2 | 11/2013 | De Judicibus et al. |
| 8,584,226 B2 | 11/2013 | Kudla et al. |
| 8,588,240 B2 | 11/2013 | Ramankutty et al. |
| 8,589,541 B2 * | 11/2013 | Raleigh ................ H04L 47/803 709/224 |
| 8,589,955 B2 | 11/2013 | Roundtree et al. |
| 8,594,626 B1 | 11/2013 | Woodson et al. |
| 8,594,665 B2 | 11/2013 | Anschutz |
| 8,595,186 B1 | 11/2013 | Mandyam et al. |
| 8,600,850 B2 | 12/2013 | Zabawskyj et al. |
| 8,600,895 B2 | 12/2013 | Felsher |
| 8,601,125 B2 | 12/2013 | Huang et al. |

(56) References Cited

U.S. PATENT DOCUMENTS

| | | |
|---|---|---|
| 8,605,691 B2 | 12/2013 | Soomro et al. |
| 8,609,911 B1 | 12/2013 | Nicholas et al. |
| 8,611,919 B2 | 12/2013 | Barnes, Jr. |
| 8,615,507 B2 | 12/2013 | Varadarajulu et al. |
| 8,619,735 B2 | 12/2013 | Montemurro et al. |
| 8,620,257 B2 | 12/2013 | Qiu et al. |
| 8,620,281 B2 | 12/2013 | Gosselin et al. |
| 8,621,056 B2 | 12/2013 | Coussemaeker et al. |
| 8,630,314 B2 | 1/2014 | York |
| 8,630,925 B2 | 1/2014 | Bystrom et al. |
| 8,631,428 B2 | 1/2014 | Scott et al. |
| 8,634,425 B2 | 1/2014 | Gorti et al. |
| 8,635,164 B2 | 1/2014 | Rosenhaf et al. |
| 8,635,335 B2 | 1/2014 | Raleigh et al. |
| 8,639,215 B2 | 1/2014 | McGregor et al. |
| 8,644,702 B1 | 2/2014 | Kalajan |
| 8,644,813 B1 | 2/2014 | Gailloux et al. |
| 8,645,518 B2 | 2/2014 | David |
| 8,654,952 B2 | 2/2014 | Wang et al. |
| 8,655,357 B1 | 2/2014 | Gazzard et al. |
| 8,656,472 B2 | 2/2014 | McMurtry et al. |
| 8,660,853 B2 | 2/2014 | Robb et al. |
| 8,666,395 B2 | 3/2014 | Silver |
| 8,667,542 B1 | 3/2014 | Bertz et al. |
| 8,670,334 B2 | 3/2014 | Keohane et al. |
| 8,670,752 B2 | 3/2014 | Fan et al. |
| 8,675,507 B2 | 3/2014 | Raleigh |
| 8,675,852 B2 | 3/2014 | Maes |
| 8,676,682 B2 | 3/2014 | Kalliola |
| 8,676,925 B1 | 3/2014 | Liu et al. |
| 8,688,671 B2 | 4/2014 | Ramer et al. |
| 8,688,784 B2 | 4/2014 | Zabawskyj et al. |
| 8,693,323 B1 | 4/2014 | McDysan |
| 8,694,772 B2 | 4/2014 | Kao et al. |
| 8,699,355 B2 | 4/2014 | Macias |
| 8,700,729 B2 | 4/2014 | Dua |
| 8,701,015 B2 | 4/2014 | Bonnat |
| 8,701,080 B2 | 4/2014 | Tripathi |
| 8,705,361 B2 | 4/2014 | Venkataraman et al. |
| 8,706,863 B2 | 4/2014 | Fadell |
| 8,713,535 B2 | 4/2014 | Malhotra et al. |
| 8,713,641 B1 | 4/2014 | Pagan et al. |
| 8,719,397 B2 | 5/2014 | Levi et al. |
| 8,719,423 B2 | 5/2014 | Wyld |
| 8,724,486 B2 | 5/2014 | Seto et al. |
| 8,725,700 B2 | 5/2014 | Rappaport |
| 8,725,899 B2 | 5/2014 | Short et al. |
| 8,730,842 B2 | 5/2014 | Collins et al. |
| 8,731,519 B2 | 5/2014 | Flynn et al. |
| 8,732,808 B2 | 5/2014 | Sewall et al. |
| 8,738,860 B1 | 5/2014 | Griffin et al. |
| 8,739,035 B2 | 5/2014 | Trethewey |
| 8,742,694 B2 | 6/2014 | Bora et al. |
| 8,744,339 B2 | 6/2014 | Halfmann et al. |
| 8,761,711 B2 | 6/2014 | Grignani et al. |
| 8,761,809 B2 | 6/2014 | Faith et al. |
| 8,775,233 B1 | 7/2014 | Lybrook et al. |
| 8,780,857 B2 | 7/2014 | Balasubramanian et al. |
| 8,787,249 B2 | 7/2014 | Giaretta et al. |
| 8,792,857 B2 | 7/2014 | Cai et al. |
| 8,793,304 B2 | 7/2014 | Lu et al. |
| 8,793,758 B2 | 7/2014 | Raleigh et al. |
| 8,798,610 B2 | 8/2014 | Prakash et al. |
| 8,799,440 B2 | 8/2014 | Zhou et al. |
| 8,804,517 B2 | 8/2014 | Oerton |
| 8,804,695 B2 | 8/2014 | Branam |
| 8,811,338 B2 | 8/2014 | Jin et al. |
| 8,811,991 B2 | 8/2014 | Jain et al. |
| 8,812,525 B1 | 8/2014 | Taylor, III |
| 8,818,394 B2 | 8/2014 | Bienas et al. |
| 8,819,253 B2 | 8/2014 | Simeloff et al. |
| 8,825,109 B2 | 9/2014 | Montemurro et al. |
| 8,826,411 B2 | 9/2014 | Moen et al. |
| 8,831,561 B2 | 9/2014 | Sutaria et al. |
| 8,837,322 B2 | 9/2014 | Venkataramanan et al. |
| 8,838,686 B2 | 9/2014 | Getchius |
| 8,838,752 B2 | 9/2014 | Lor et al. |
| 8,839,388 B2 | 9/2014 | Raleigh |
| 8,843,849 B2 | 9/2014 | Neil et al. |
| 8,845,415 B2 | 9/2014 | Lutnick et al. |
| 8,849,262 B2 | 9/2014 | Desai et al. |
| 8,849,297 B2 | 9/2014 | Balasubramanian |
| 8,855,620 B2 | 10/2014 | Sievers et al. |
| 8,856,015 B2 | 10/2014 | Mesaros |
| 8,862,751 B2 | 10/2014 | Faccin et al. |
| 8,863,111 B2 | 10/2014 | Selitser et al. |
| 8,868,725 B2 | 10/2014 | Samba |
| 8,868,727 B2 | 10/2014 | Yumerefendi et al. |
| 8,875,042 B2 | 10/2014 | LeJeune et al. |
| 8,880,047 B2 | 11/2014 | Konicek et al. |
| 8,891,483 B2 | 11/2014 | Connelly et al. |
| 8,891,524 B2 * | 11/2014 | Chandrapal ......... H04L 41/0266 |
| | | 709/219 |
| 8,898,748 B2 | 11/2014 | Burks et al. |
| 8,908,516 B2 | 12/2014 | Tzamaloukas et al. |
| 8,924,469 B2 | 12/2014 | Raleigh et al. |
| 8,929,374 B2 | 1/2015 | Tönsing et al. |
| 8,930,238 B2 | 1/2015 | Coffman et al. |
| 8,930,551 B2 | 1/2015 | Pandya et al. |
| 8,943,551 B2 | 1/2015 | Ganapathy et al. |
| 8,948,198 B2 | 2/2015 | Nee et al. |
| 8,948,726 B2 | 2/2015 | Smith et al. |
| 8,949,382 B2 | 2/2015 | Cornett et al. |
| 8,949,597 B1 | 2/2015 | Reeves et al. |
| 8,955,038 B2 | 2/2015 | Nicodemus et al. |
| 8,966,018 B2 | 2/2015 | Bugwadia et al. |
| 8,971,841 B2 | 3/2015 | Menezes et al. |
| 8,971,912 B2 | 3/2015 | Chou et al. |
| 8,977,284 B2 | 3/2015 | Reed |
| 8,995,952 B1 | 3/2015 | Baker et al. |
| 9,002,342 B2 | 4/2015 | Tenhunen et al. |
| 9,008,653 B2 | 4/2015 | Sparks et al. |
| 9,014,059 B2 | 4/2015 | Richardson et al. |
| 9,014,973 B2 | 4/2015 | Ruckart |
| 9,015,331 B2 | 4/2015 | Lai et al. |
| 9,020,467 B2 * | 4/2015 | Zhang ................. H04L 63/0853 |
| | | 370/332 |
| 9,026,100 B2 | 5/2015 | Castro et al. |
| 9,030,934 B2 | 5/2015 | Shah et al. |
| 9,032,427 B2 | 5/2015 | Gallant et al. |
| 9,049,010 B2 | 6/2015 | Jueneman et al. |
| 9,064,275 B1 | 6/2015 | Lu et al. |
| 9,105,031 B2 | 8/2015 | Shen et al. |
| 9,106,414 B2 | 8/2015 | Laves |
| 9,107,053 B2 | 8/2015 | Davis et al. |
| 9,111,088 B2 | 8/2015 | Ghai et al. |
| 9,135,037 B1 | 9/2015 | Petrescu-Prahova et al. |
| 9,137,286 B1 | 9/2015 | Yuan |
| 9,143,933 B2 | 9/2015 | Ikeda et al. |
| 9,172,553 B2 | 10/2015 | Dawes et al. |
| 9,173,090 B2 | 10/2015 | Fuchman et al. |
| 9,177,455 B2 | 11/2015 | Remer |
| 9,183,524 B2 | 11/2015 | Carter |
| 9,225,847 B2 | 12/2015 | Daymond et al. |
| 9,252,977 B2 | 2/2016 | Levi et al. |
| 9,262,370 B2 | 2/2016 | Hofstaedter et al. |
| 9,265,003 B2 | 2/2016 | Zhao et al. |
| 9,277,433 B2 | 3/2016 | Raleigh et al. |
| 9,282,460 B2 | 3/2016 | Souissi |
| 9,286,469 B2 | 3/2016 | Kraemer et al. |
| 9,286,604 B2 | 3/2016 | Aabye et al. |
| 9,288,276 B2 | 3/2016 | Adamczyk et al. |
| 9,313,708 B2 | 4/2016 | Nam et al. |
| 9,325,737 B2 | 4/2016 | Gutowski et al. |
| 9,326,173 B2 | 4/2016 | Luft |
| 9,344,557 B2 | 5/2016 | Gruchala et al. |
| 9,350,842 B2 | 5/2016 | Swanburg et al. |
| 9,363,285 B2 | 6/2016 | Kitamura |
| 9,367,680 B2 | 6/2016 | Mahaffey et al. |
| 9,402,254 B2 | 7/2016 | Kneckt et al. |
| 9,413,546 B2 | 8/2016 | Meier et al. |
| 9,418,381 B2 | 8/2016 | Ahuja et al. |
| 9,419,867 B2 | 8/2016 | Okholm et al. |
| 9,436,805 B1 | 9/2016 | Kravets |

(56) References Cited

U.S. PATENT DOCUMENTS

| | | |
|---|---|---|
| 9,438,642 B2 | 9/2016 | Alberth, Jr. et al. |
| 9,479,917 B1 | 10/2016 | Gota et al. |
| 9,491,199 B2 | 11/2016 | Raleigh et al. |
| 9,501,803 B2 | 11/2016 | Bilac et al. |
| 9,525,992 B2 | 12/2016 | Rao et al. |
| 9,534,861 B1 | 1/2017 | Kellgren |
| 9,544,397 B2 | 1/2017 | Raleigh et al. |
| 9,557,889 B2 | 1/2017 | Raleigh et al. |
| 9,589,117 B2 | 3/2017 | Ali et al. |
| 9,609,459 B2 | 3/2017 | Raleigh |
| 9,609,510 B2 | 3/2017 | Raleigh et al. |
| 9,609,544 B2 | 3/2017 | Raleigh et al. |
| 9,615,192 B2 | 4/2017 | Raleigh |
| 9,634,850 B2 | 4/2017 | Taft et al. |
| 9,642,004 B2 | 5/2017 | Wang et al. |
| 9,648,022 B2 | 5/2017 | Peterka et al. |
| 9,673,996 B1 | 6/2017 | Upadhyay et al. |
| 9,680,658 B2 | 6/2017 | Goel et al. |
| 9,681,003 B1 | 6/2017 | Kim et al. |
| 9,691,082 B1 | 6/2017 | Burnett et al. |
| 9,712,443 B1 | 7/2017 | Phaal |
| 9,712,476 B2 | 7/2017 | Boynton et al. |
| 9,749,899 B2 | 8/2017 | Raleigh et al. |
| 9,755,842 B2 | 9/2017 | Raleigh et al. |
| 9,766,873 B2 | 9/2017 | Steigleder |
| 9,852,426 B2 | 12/2017 | Bacastow |
| 9,923,790 B2 | 3/2018 | Patel et al. |
| 9,942,796 B2 | 4/2018 | Raleigh |
| 9,954,975 B2 | 4/2018 | Raleigh et al. |
| 9,986,413 B2 | 5/2018 | Raleigh |
| 10,002,332 B2 | 6/2018 | Spong |
| 10,021,251 B2 | 7/2018 | Aaron et al. |
| 10,021,463 B2 | 7/2018 | Qiu et al. |
| 10,024,948 B2 | 7/2018 | Ganick et al. |
| 10,034,220 B2 | 7/2018 | Silver |
| 10,057,775 B2 | 8/2018 | Raleigh et al. |
| 10,064,033 B2 | 8/2018 | Raleigh |
| 10,171,681 B2 | 1/2019 | Raleigh et al. |
| 10,171,988 B2 | 1/2019 | Raleigh et al. |
| 10,171,990 B2 | 1/2019 | Raleigh et al. |
| 10,178,554 B2 | 1/2019 | Pawar et al. |
| 10,237,773 B2 | 3/2019 | Raleigh et al. |
| 10,248,996 B2 | 4/2019 | Raleigh |
| 10,264,138 B2 | 4/2019 | Raleigh et al. |
| 10,285,025 B1 | 5/2019 | Baker et al. |
| 10,321,515 B2 | 6/2019 | Shen et al. |
| 10,395,216 B2 | 8/2019 | Coffing |
| 10,462,627 B2 | 10/2019 | Raleigh et al. |
| 10,492,102 B2 | 11/2019 | Raleigh et al. |
| 10,521,781 B1 | 12/2019 | Singfield |
| 10,523,726 B2 | 12/2019 | Pantos et al. |
| 10,536,983 B2 | 1/2020 | Raleigh et al. |
| 10,567,930 B2 | 2/2020 | Silver |
| 10,582,375 B2 | 3/2020 | Raleigh |
| 10,616,818 B2 | 4/2020 | Silver |
| 10,798,252 B2 * | 10/2020 | Raleigh ................. H04M 15/83 |
| 10,798,254 B2 * | 10/2020 | Raleigh ................. H04M 15/72 |
| 10,798,558 B2 * | 10/2020 | Raleigh ................. H04M 15/00 |
| 2001/0048738 A1 | 12/2001 | Baniak et al. |
| 2001/0053694 A1 | 12/2001 | Igarashi et al. |
| 2002/0013844 A1 | 1/2002 | Garrett et al. |
| 2002/0022472 A1 | 2/2002 | Watler et al. |
| 2002/0022483 A1 | 2/2002 | Thompson et al. |
| 2002/0049074 A1 | 4/2002 | Eisinger et al. |
| 2002/0085516 A1 | 7/2002 | Bridgelall |
| 2002/0099848 A1 | 7/2002 | Lee |
| 2002/0116338 A1 | 8/2002 | Gonthier et al. |
| 2002/0120370 A1 | 8/2002 | Parupudi et al. |
| 2002/0120540 A1 | 8/2002 | Kende et al. |
| 2002/0131397 A1 | 9/2002 | Patel et al. |
| 2002/0131404 A1 | 9/2002 | Mehta et al. |
| 2002/0138599 A1 | 9/2002 | Dilman et al. |
| 2002/0138601 A1 | 9/2002 | Piponius et al. |
| 2002/0154751 A1 | 10/2002 | Thompson et al. |
| 2002/0161601 A1 | 10/2002 | Nauer et al. |
| 2002/0164983 A1 | 11/2002 | Raviv et al. |
| 2002/0176377 A1 | 11/2002 | Hamilton |
| 2002/0188732 A1 | 12/2002 | Buckman et al. |
| 2002/0191573 A1 | 12/2002 | Whitehill et al. |
| 2002/0199001 A1 | 12/2002 | Wenocur et al. |
| 2003/0004937 A1 | 1/2003 | Salmenkaita et al. |
| 2003/0005112 A1 | 1/2003 | Krautkremer |
| 2003/0013434 A1 | 1/2003 | Rosenberg et al. |
| 2003/0018524 A1 | 1/2003 | Fishman et al. |
| 2003/0028623 A1 | 2/2003 | Hennessey et al. |
| 2003/0046396 A1 | 3/2003 | Richter et al. |
| 2003/0050070 A1 | 3/2003 | Mashinsky et al. |
| 2003/0050837 A1 | 3/2003 | Kim |
| 2003/0060189 A1 | 3/2003 | Minear et al. |
| 2003/0084321 A1 | 5/2003 | Tarquini et al. |
| 2003/0088671 A1 | 5/2003 | Klinker et al. |
| 2003/0133408 A1 | 7/2003 | Cheng et al. |
| 2003/0134650 A1 | 7/2003 | Sundar et al. |
| 2003/0159030 A1 | 8/2003 | Evans |
| 2003/0161265 A1 | 8/2003 | Cao et al. |
| 2003/0171112 A1 | 9/2003 | Lupper et al. |
| 2003/0182420 A1 | 9/2003 | Jones et al. |
| 2003/0182435 A1 | 9/2003 | Redlich et al. |
| 2003/0184793 A1 | 10/2003 | Pineau |
| 2003/0188006 A1 | 10/2003 | Bard |
| 2003/0188117 A1 | 10/2003 | Yoshino et al. |
| 2003/0191646 A1 | 10/2003 | D'Avello et al. |
| 2003/0220984 A1 | 11/2003 | Jones et al. |
| 2003/0224781 A1 | 12/2003 | Milford et al. |
| 2003/0229900 A1 | 12/2003 | Reisman |
| 2003/0233332 A1 | 12/2003 | Keeler et al. |
| 2003/0236745 A1 | 12/2003 | Hartsell et al. |
| 2004/0019539 A1 | 1/2004 | Raman et al. |
| 2004/0019564 A1 | 1/2004 | Goldthwaite et al. |
| 2004/0021697 A1 | 2/2004 | Beaton et al. |
| 2004/0024756 A1 | 2/2004 | Rickard |
| 2004/0030705 A1 | 2/2004 | Bowman-Amuah |
| 2004/0039792 A1 | 2/2004 | Nakanishi |
| 2004/0044623 A1 | 3/2004 | Wake et al. |
| 2004/0047358 A1 | 3/2004 | Chen et al. |
| 2004/0054779 A1 | 3/2004 | Takeshima et al. |
| 2004/0073672 A1 | 4/2004 | Fascenda |
| 2004/0082346 A1 | 4/2004 | Skytt et al. |
| 2004/0098715 A1 | 5/2004 | Aghera et al. |
| 2004/0102182 A1 | 5/2004 | Reith et al. |
| 2004/0103193 A1 | 5/2004 | Pandya et al. |
| 2004/0107360 A1 | 6/2004 | Herrmann et al. |
| 2004/0114553 A1 | 6/2004 | Jiang et al. |
| 2004/0116140 A1 | 6/2004 | Babbar et al. |
| 2004/0123153 A1 | 6/2004 | Wright et al. |
| 2004/0127200 A1 | 7/2004 | Shaw et al. |
| 2004/0127208 A1 | 7/2004 | Nair et al. |
| 2004/0127256 A1 | 7/2004 | Goldthwaite et al. |
| 2004/0132427 A1 | 7/2004 | Lee et al. |
| 2004/0133668 A1 | 7/2004 | Nicholas, III |
| 2004/0137890 A1 | 7/2004 | Kalke |
| 2004/0165596 A1 | 8/2004 | Garcia et al. |
| 2004/0167958 A1 | 8/2004 | Stewart et al. |
| 2004/0168052 A1 | 8/2004 | Clisham et al. |
| 2004/0170191 A1 | 9/2004 | Guo et al. |
| 2004/0176104 A1 | 9/2004 | Arcens |
| 2004/0198331 A1 | 10/2004 | Coward et al. |
| 2004/0203755 A1 | 10/2004 | Brunet et al. |
| 2004/0203833 A1 | 10/2004 | Rathunde et al. |
| 2004/0225561 A1 | 11/2004 | Hertzberg et al. |
| 2004/0225898 A1 | 11/2004 | Frost et al. |
| 2004/0236547 A1 | 11/2004 | Rappaport et al. |
| 2004/0243680 A1 | 12/2004 | Mayer |
| 2004/0243992 A1 | 12/2004 | Gustafson et al. |
| 2004/0249918 A1 | 12/2004 | Sunshine |
| 2004/0255145 A1 | 12/2004 | Chow |
| 2004/0259534 A1 | 12/2004 | Chaudhari et al. |
| 2004/0260766 A1 | 12/2004 | Barros et al. |
| 2004/0267872 A1 | 12/2004 | Serdy et al. |
| 2005/0007993 A1 | 1/2005 | Chambers et al. |
| 2005/0009499 A1 | 1/2005 | Koster |
| 2005/0021995 A1 | 1/2005 | Lal et al. |
| 2005/0041617 A1 | 2/2005 | Huotari et al. |
| 2005/0048950 A1 | 3/2005 | Morper |

(56) References Cited

U.S. PATENT DOCUMENTS

| | | |
|---|---|---|
| 2005/0055291 A1 | 3/2005 | Bevente et al. |
| 2005/0055309 A1 | 3/2005 | Williams et al. |
| 2005/0055595 A1 | 3/2005 | Frazer et al. |
| 2005/0060266 A1 | 3/2005 | Demello et al. |
| 2005/0060525 A1 | 3/2005 | Schwartz et al. |
| 2005/0075115 A1 | 4/2005 | Corneille et al. |
| 2005/0079863 A1 | 4/2005 | Macaluso |
| 2005/0091505 A1 | 4/2005 | Riley et al. |
| 2005/0096024 A1 | 5/2005 | Bicker et al. |
| 2005/0097516 A1 | 5/2005 | Donnelly et al. |
| 2005/0107091 A1 | 5/2005 | Vannithamby et al. |
| 2005/0108075 A1 | 5/2005 | Douglis et al. |
| 2005/0111463 A1 | 5/2005 | Leung et al. |
| 2005/0128967 A1 | 6/2005 | Scobbie |
| 2005/0135264 A1 | 6/2005 | Popoff et al. |
| 2005/0163320 A1 | 7/2005 | Brown et al. |
| 2005/0166043 A1 | 7/2005 | Zhang et al. |
| 2005/0183143 A1 | 8/2005 | Anderholm et al. |
| 2005/0186948 A1 | 8/2005 | Gallagher et al. |
| 2005/0198377 A1 | 9/2005 | Ferguson et al. |
| 2005/0216421 A1 | 9/2005 | Barry et al. |
| 2005/0226178 A1 | 10/2005 | Forand et al. |
| 2005/0228985 A1 | 10/2005 | Ylikoski et al. |
| 2005/0238046 A1 | 10/2005 | Hassan et al. |
| 2005/0239447 A1 | 10/2005 | Holzman et al. |
| 2005/0245241 A1 | 11/2005 | Durand et al. |
| 2005/0246282 A1 | 11/2005 | Naslund et al. |
| 2005/0250508 A1 | 11/2005 | Guo et al. |
| 2005/0250536 A1 | 11/2005 | Deng et al. |
| 2005/0254435 A1 | 11/2005 | Moakley et al. |
| 2005/0266825 A1 | 12/2005 | Clayton |
| 2005/0266880 A1 | 12/2005 | Gupta |
| 2006/0014519 A1 | 1/2006 | Marsh et al. |
| 2006/0019632 A1 | 1/2006 | Cunningham et al. |
| 2006/0020787 A1 | 1/2006 | Choyi et al. |
| 2006/0026679 A1 | 2/2006 | Zakas |
| 2006/0030306 A1 | 2/2006 | Kuhn |
| 2006/0034256 A1 | 2/2006 | Addagatla et al. |
| 2006/0035631 A1 | 2/2006 | White et al. |
| 2006/0040642 A1 | 2/2006 | Boris et al. |
| 2006/0045245 A1 | 3/2006 | Aaron et al. |
| 2006/0048223 A1 | 3/2006 | Lee et al. |
| 2006/0068796 A1 | 3/2006 | Millen et al. |
| 2006/0072451 A1 | 4/2006 | Ross |
| 2006/0072550 A1 | 4/2006 | Davis et al. |
| 2006/0072646 A1 | 4/2006 | Feher |
| 2006/0075506 A1 | 4/2006 | Sanda et al. |
| 2006/0085543 A1 | 4/2006 | Hrastar et al. |
| 2006/0095517 A1 | 5/2006 | O'Connor et al. |
| 2006/0098627 A1 | 5/2006 | Karaoguz et al. |
| 2006/0099970 A1 | 5/2006 | Morgan et al. |
| 2006/0101507 A1 | 5/2006 | Camenisch |
| 2006/0112016 A1 | 5/2006 | Ishibashi |
| 2006/0114821 A1 | 6/2006 | Willey et al. |
| 2006/0114832 A1 | 6/2006 | Hamilton et al. |
| 2006/0126562 A1 | 6/2006 | Liu |
| 2006/0135144 A1 | 6/2006 | Jothipragasam |
| 2006/0136882 A1 | 6/2006 | Noonan et al. |
| 2006/0143066 A1 | 6/2006 | Calabria |
| 2006/0143098 A1 | 6/2006 | Lazaridis |
| 2006/0156398 A1 | 7/2006 | Ross et al. |
| 2006/0160536 A1 | 7/2006 | Chou |
| 2006/0165060 A1 | 7/2006 | Dua |
| 2006/0168128 A1 | 7/2006 | Sistla et al. |
| 2006/0173959 A1 | 8/2006 | Mckelvie et al. |
| 2006/0174035 A1 | 8/2006 | Tufail |
| 2006/0178917 A1 | 8/2006 | Merriam et al. |
| 2006/0178918 A1 | 8/2006 | Mikurak |
| 2006/0178943 A1 | 8/2006 | Rollinson et al. |
| 2006/0182137 A1 | 8/2006 | Zhou et al. |
| 2006/0183462 A1 | 8/2006 | Kolehmainen |
| 2006/0190314 A1 | 8/2006 | Hernandez |
| 2006/0190987 A1 | 8/2006 | Ohta et al. |
| 2006/0193280 A1 | 8/2006 | Lee et al. |
| 2006/0199608 A1 | 9/2006 | Dunn et al. |
| 2006/0200663 A1 | 9/2006 | Thornton |
| 2006/0206709 A1 | 9/2006 | Labrou et al. |
| 2006/0206904 A1 | 9/2006 | Watkins et al. |
| 2006/0218395 A1 | 9/2006 | Maes |
| 2006/0221829 A1 | 10/2006 | Holmstrom et al. |
| 2006/0233108 A1 | 10/2006 | Krishnan |
| 2006/0233166 A1 | 10/2006 | Bou-Diab et al. |
| 2006/0236095 A1 | 10/2006 | Smith et al. |
| 2006/0242685 A1 | 10/2006 | Heard et al. |
| 2006/0258341 A1 | 11/2006 | Miller et al. |
| 2006/0274706 A1 | 12/2006 | Chen et al. |
| 2006/0277590 A1 | 12/2006 | Limont et al. |
| 2006/0291419 A1 | 12/2006 | McConnell et al. |
| 2006/0291477 A1 | 12/2006 | Croak et al. |
| 2007/0005795 A1 | 1/2007 | Gonzalez |
| 2007/0019670 A1 | 1/2007 | Falardeau |
| 2007/0022289 A1 | 1/2007 | Alt et al. |
| 2007/0025301 A1 | 2/2007 | Petersson et al. |
| 2007/0033194 A1 | 2/2007 | Srinivas et al. |
| 2007/0033197 A1 | 2/2007 | Scherzer et al. |
| 2007/0035390 A1 | 2/2007 | Thomas et al. |
| 2007/0036312 A1 | 2/2007 | Cai et al. |
| 2007/0038763 A1 | 2/2007 | Oestvall |
| 2007/0055694 A1 | 3/2007 | Ruge et al. |
| 2007/0060200 A1 | 3/2007 | Boris et al. |
| 2007/0061243 A1 | 3/2007 | Ramer et al. |
| 2007/0061800 A1 | 3/2007 | Cheng et al. |
| 2007/0061878 A1 | 3/2007 | Hagiu et al. |
| 2007/0073899 A1 | 3/2007 | Judge et al. |
| 2007/0076616 A1 | 4/2007 | Ngo et al. |
| 2007/0093243 A1 | 4/2007 | Kapadekar et al. |
| 2007/0100981 A1 | 5/2007 | Adamczyk et al. |
| 2007/0101426 A1 | 5/2007 | Lee et al. |
| 2007/0104126 A1 | 5/2007 | Calhoun et al. |
| 2007/0104169 A1 | 5/2007 | Polson |
| 2007/0109983 A1 | 5/2007 | Shankar et al. |
| 2007/0111740 A1 | 5/2007 | Wandel |
| 2007/0124077 A1 | 5/2007 | Hedlund |
| 2007/0130283 A1 | 6/2007 | Klein et al. |
| 2007/0130315 A1 | 6/2007 | Friend et al. |
| 2007/0140113 A1 | 6/2007 | Gemelos |
| 2007/0140145 A1 | 6/2007 | Kumar et al. |
| 2007/0140275 A1 | 6/2007 | Bowman et al. |
| 2007/0143824 A1 | 6/2007 | Shahbazi |
| 2007/0147317 A1 | 6/2007 | Smith et al. |
| 2007/0147324 A1 | 6/2007 | McGary |
| 2007/0155365 A1 | 7/2007 | Kim et al. |
| 2007/0157203 A1 | 7/2007 | Lim |
| 2007/0165630 A1 | 7/2007 | Rasanen et al. |
| 2007/0168499 A1 | 7/2007 | Chu |
| 2007/0171856 A1 | 7/2007 | Bruce et al. |
| 2007/0174490 A1 | 7/2007 | Choi et al. |
| 2007/0191006 A1 | 8/2007 | Carpenter |
| 2007/0192460 A1 | 8/2007 | Choi et al. |
| 2007/0198656 A1 | 8/2007 | Mazzaferri et al. |
| 2007/0201502 A1 | 8/2007 | Abramson |
| 2007/0213054 A1 | 9/2007 | Han |
| 2007/0220251 A1 | 9/2007 | Rosenberg et al. |
| 2007/0226225 A1 | 9/2007 | Yiu et al. |
| 2007/0226775 A1 | 9/2007 | Andreasen et al. |
| 2007/0234402 A1 | 10/2007 | Khosravi et al. |
| 2007/0242619 A1 | 10/2007 | Murakami et al. |
| 2007/0242659 A1 | 10/2007 | Cantu et al. |
| 2007/0243862 A1 | 10/2007 | Coskun et al. |
| 2007/0244965 A1 | 10/2007 | Dowling |
| 2007/0248100 A1 | 10/2007 | Zuberi et al. |
| 2007/0254646 A1 | 11/2007 | Sokondar |
| 2007/0254675 A1 | 11/2007 | Zorlu Ozer et al. |
| 2007/0255769 A1 | 11/2007 | Agrawal et al. |
| 2007/0255797 A1 | 11/2007 | Dunn et al. |
| 2007/0255848 A1 | 11/2007 | Sewall et al. |
| 2007/0256128 A1 | 11/2007 | Jung et al. |
| 2007/0257767 A1 | 11/2007 | Beeson |
| 2007/0259656 A1 | 11/2007 | Jeong |
| 2007/0259673 A1 | 11/2007 | Willars et al. |
| 2007/0263558 A1 | 11/2007 | Salomons |
| 2007/0265003 A1 | 11/2007 | Kezys et al. |
| 2007/0266422 A1 | 11/2007 | Germano et al. |
| 2007/0274327 A1 | 11/2007 | Kaarela et al. |

(56) References Cited

U.S. PATENT DOCUMENTS

| | | |
|---|---|---|
| 2007/0280453 A1 | 12/2007 | Kelley |
| 2007/0282896 A1 | 12/2007 | Wydroug et al. |
| 2007/0293191 A1 | 12/2007 | Mir et al. |
| 2007/0294395 A1 | 12/2007 | Strub et al. |
| 2007/0294410 A1 | 12/2007 | Pandya et al. |
| 2007/0297378 A1 | 12/2007 | Poyhonen et al. |
| 2007/0298764 A1 | 12/2007 | Clayton |
| 2007/0299965 A1 | 12/2007 | Nieh et al. |
| 2007/0300252 A1 | 12/2007 | Acharya et al. |
| 2008/0005285 A1 | 1/2008 | Robinson et al. |
| 2008/0005561 A1 | 1/2008 | Brown et al. |
| 2008/0010379 A1 | 1/2008 | Zhao |
| 2008/0010452 A1 | 1/2008 | Holtzman et al. |
| 2008/0018494 A1 | 1/2008 | Waite et al. |
| 2008/0022354 A1 | 1/2008 | Grewal et al. |
| 2008/0025230 A1 | 1/2008 | Patel et al. |
| 2008/0032715 A1 | 2/2008 | Jia et al. |
| 2008/0034063 A1 | 2/2008 | Yee |
| 2008/0034419 A1 | 2/2008 | Mullick et al. |
| 2008/0039102 A1 | 2/2008 | Sewall et al. |
| 2008/0049630 A1 | 2/2008 | Kozisek et al. |
| 2008/0050715 A1 | 2/2008 | Golczewski et al. |
| 2008/0051076 A1 | 2/2008 | O'Shaughnessy et al. |
| 2008/0052387 A1 | 2/2008 | Heinz et al. |
| 2008/0056273 A1 | 3/2008 | Pelletier et al. |
| 2008/0057894 A1 | 3/2008 | Aleksic et al. |
| 2008/0059474 A1 | 3/2008 | Lim |
| 2008/0059743 A1 | 3/2008 | Bychkov et al. |
| 2008/0060066 A1 | 3/2008 | Wynn et al. |
| 2008/0062900 A1 | 3/2008 | Rao |
| 2008/0064367 A1 | 3/2008 | Nath et al. |
| 2008/0066149 A1 | 3/2008 | Lim |
| 2008/0066150 A1 | 3/2008 | Lim |
| 2008/0066181 A1 | 3/2008 | Haveson et al. |
| 2008/0070550 A1 | 3/2008 | Hose |
| 2008/0077705 A1 | 3/2008 | Li et al. |
| 2008/0080457 A1 | 4/2008 | Cole |
| 2008/0081606 A1 | 4/2008 | Cole |
| 2008/0082643 A1 | 4/2008 | Storrie et al. |
| 2008/0083013 A1 | 4/2008 | Soliman et al. |
| 2008/0085707 A1 | 4/2008 | Fadell |
| 2008/0089295 A1 | 4/2008 | Keeler et al. |
| 2008/0089303 A1 | 4/2008 | Wirtanen et al. |
| 2008/0095339 A1 | 4/2008 | Elliott et al. |
| 2008/0096559 A1 | 4/2008 | Phillips et al. |
| 2008/0098062 A1 | 4/2008 | Balia |
| 2008/0101291 A1 | 5/2008 | Jiang et al. |
| 2008/0109679 A1 | 5/2008 | Wright et al. |
| 2008/0120129 A1 | 5/2008 | Seubert et al. |
| 2008/0120668 A1 | 5/2008 | Yau |
| 2008/0120688 A1 | 5/2008 | Qiu et al. |
| 2008/0125079 A1 | 5/2008 | O'Neil et al. |
| 2008/0126287 A1 | 5/2008 | Cox et al. |
| 2008/0127304 A1 | 5/2008 | Ginter et al. |
| 2008/0130534 A1 | 6/2008 | Tomioka |
| 2008/0130656 A1 | 6/2008 | Kim et al. |
| 2008/0132201 A1 | 6/2008 | Karlberg |
| 2008/0132268 A1 | 6/2008 | Choi-Grogan et al. |
| 2008/0134330 A1 | 6/2008 | Kapoor et al. |
| 2008/0139210 A1 | 6/2008 | Gisby et al. |
| 2008/0147454 A1 | 6/2008 | Walker et al. |
| 2008/0148402 A1 | 6/2008 | Bogineni et al. |
| 2008/0160958 A1 | 7/2008 | Abichandani et al. |
| 2008/0161041 A1 | 7/2008 | Pemu |
| 2008/0162637 A1 | 7/2008 | Adamczyk et al. |
| 2008/0162704 A1 | 7/2008 | Poplett et al. |
| 2008/0164304 A1 | 7/2008 | Narasimhan et al. |
| 2008/0166993 A1 | 7/2008 | Gautier et al. |
| 2008/0167027 A1 | 7/2008 | Gautier et al. |
| 2008/0167033 A1 | 7/2008 | Beckers |
| 2008/0168275 A1 | 7/2008 | DeAtley et al. |
| 2008/0168523 A1 | 7/2008 | Ansari et al. |
| 2008/0177998 A1 | 7/2008 | Apsangi et al. |
| 2008/0178300 A1 | 7/2008 | Brown et al. |
| 2008/0181117 A1 | 7/2008 | Acke et al. |
| 2008/0183811 A1 | 7/2008 | Kotras et al. |
| 2008/0183812 A1 | 7/2008 | Paul et al. |
| 2008/0184127 A1 | 7/2008 | Rafey et al. |
| 2008/0189760 A1 | 8/2008 | Rosenberg et al. |
| 2008/0201266 A1 | 8/2008 | Chua et al. |
| 2008/0207167 A1 | 8/2008 | Bugenhagen |
| 2008/0212470 A1 | 9/2008 | Castaneda et al. |
| 2008/0212751 A1 | 9/2008 | Chung |
| 2008/0219268 A1 | 9/2008 | Dennison |
| 2008/0221951 A1 | 9/2008 | Stanforth et al. |
| 2008/0222692 A1 | 9/2008 | Andersson et al. |
| 2008/0225748 A1 | 9/2008 | Khemani et al. |
| 2008/0229385 A1 | 9/2008 | Feder et al. |
| 2008/0229388 A1 | 9/2008 | Maes |
| 2008/0235511 A1 | 9/2008 | O'Brien et al. |
| 2008/0240373 A1 | 10/2008 | Wilhelm |
| 2008/0242290 A1 | 10/2008 | Bhatia et al. |
| 2008/0250053 A1 | 10/2008 | Aaltonen et al. |
| 2008/0256593 A1 | 10/2008 | Vinberg et al. |
| 2008/0259924 A1 | 10/2008 | Gooch et al. |
| 2008/0262798 A1 | 10/2008 | Kim et al. |
| 2008/0263348 A1 | 10/2008 | Zaltsman et al. |
| 2008/0268813 A1 | 10/2008 | Maes |
| 2008/0270212 A1 | 10/2008 | Blight et al. |
| 2008/0279216 A1 | 11/2008 | Sharif-Ahmadi et al. |
| 2008/0280656 A1 | 11/2008 | Gonikberg et al. |
| 2008/0282319 A1 | 11/2008 | Fontijn et al. |
| 2008/0291872 A1 | 11/2008 | Henriksson |
| 2008/0293395 A1 | 11/2008 | Mathews et al. |
| 2008/0298230 A1 | 12/2008 | Luft et al. |
| 2008/0305793 A1 | 12/2008 | Gallagher et al. |
| 2008/0311885 A1 | 12/2008 | Dawson et al. |
| 2008/0313315 A1 | 12/2008 | Karaoguz et al. |
| 2008/0313730 A1 | 12/2008 | Iftimie et al. |
| 2008/0316923 A1 | 12/2008 | Fedders et al. |
| 2008/0316983 A1 | 12/2008 | Daigle |
| 2008/0318547 A1 | 12/2008 | Ballou et al. |
| 2008/0318550 A1 | 12/2008 | DeAtley |
| 2008/0319879 A1 | 12/2008 | Carroll et al. |
| 2008/0320497 A1 | 12/2008 | Tarkoma et al. |
| 2009/0005000 A1 | 1/2009 | Baker et al. |
| 2009/0005005 A1 | 1/2009 | Forstall et al. |
| 2009/0006116 A1 | 1/2009 | Baker et al. |
| 2009/0006200 A1 | 1/2009 | Baker et al. |
| 2009/0006229 A1 | 1/2009 | Sweeney et al. |
| 2009/0013157 A1 | 1/2009 | Beaule |
| 2009/0016310 A1 | 1/2009 | Rasal |
| 2009/0017809 A1 | 1/2009 | Jethi et al. |
| 2009/0036111 A1 | 2/2009 | Danford et al. |
| 2009/0042536 A1 | 2/2009 | Bernard et al. |
| 2009/0044185 A1 | 2/2009 | Krivopaltsev |
| 2009/0046707 A1 | 2/2009 | Smires et al. |
| 2009/0046723 A1 | 2/2009 | Rahman et al. |
| 2009/0047989 A1 | 2/2009 | Harmon et al. |
| 2009/0048913 A1 | 2/2009 | Shenfield et al. |
| 2009/0049156 A1 | 2/2009 | Aronsson et al. |
| 2009/0049518 A1 | 2/2009 | Roman et al. |
| 2009/0054030 A1 | 2/2009 | Golds |
| 2009/0054061 A1 | 2/2009 | Dawson et al. |
| 2009/0065571 A1 | 3/2009 | Jain |
| 2009/0067372 A1 | 3/2009 | Shah et al. |
| 2009/0068984 A1 | 3/2009 | Burnett |
| 2009/0070379 A1 | 3/2009 | Rappaport |
| 2009/0077622 A1 | 3/2009 | Baum et al. |
| 2009/0079699 A1 | 3/2009 | Sun |
| 2009/0109898 A1 | 4/2009 | Adams et al. |
| 2009/0113514 A1 | 4/2009 | Hu |
| 2009/0125619 A1 | 5/2009 | Antani |
| 2009/0132860 A1 | 5/2009 | Liu et al. |
| 2009/0149154 A1 | 6/2009 | Bhasin et al. |
| 2009/0157792 A1 | 6/2009 | Fiatal |
| 2009/0163173 A1 | 6/2009 | Williams |
| 2009/0170554 A1 | 7/2009 | Want et al. |
| 2009/0172077 A1 | 7/2009 | Roxburgh et al. |
| 2009/0180391 A1 | 7/2009 | Petersen et al. |
| 2009/0181662 A1 | 7/2009 | Fleischman et al. |
| 2009/0197585 A1 | 8/2009 | Aaron |
| 2009/0197612 A1 | 8/2009 | Kiiskinen |
| 2009/0203352 A1 | 8/2009 | Fordon et al. |

(56) References Cited

U.S. PATENT DOCUMENTS

| | | |
|---|---|---|
| 2009/0217065 A1 | 8/2009 | Araujo, Jr. |
| 2009/0217364 A1 | 8/2009 | Salmela et al. |
| 2009/0219170 A1 | 9/2009 | Clark et al. |
| 2009/0248883 A1 | 10/2009 | Suryanarayana et al. |
| 2009/0254857 A1 | 10/2009 | Romine et al. |
| 2009/0257379 A1 | 10/2009 | Robinson et al. |
| 2009/0261783 A1 | 10/2009 | Gonzales et al. |
| 2009/0262715 A1 | 10/2009 | Juang |
| 2009/0271514 A1 | 10/2009 | Thomas et al. |
| 2009/0282127 A1 | 11/2009 | Leblanc et al. |
| 2009/0286507 A1 | 11/2009 | O'Neil et al. |
| 2009/0287921 A1 | 11/2009 | Zhu et al. |
| 2009/0288140 A1 | 11/2009 | Huber et al. |
| 2009/0291665 A1 | 11/2009 | Gaskarth et al. |
| 2009/0292815 A1 | 11/2009 | Gao et al. |
| 2009/0299857 A1 | 12/2009 | Brubaker |
| 2009/0307696 A1 | 12/2009 | Vals et al. |
| 2009/0307746 A1 | 12/2009 | Di et al. |
| 2009/0315735 A1 | 12/2009 | Bhavani et al. |
| 2009/0320110 A1 | 12/2009 | Nicolson et al. |
| 2010/0010873 A1 | 1/2010 | Moreau |
| 2010/0017506 A1 | 1/2010 | Fadell |
| 2010/0020822 A1 | 1/2010 | Zerillo et al. |
| 2010/0027469 A1 | 2/2010 | Gurajala et al. |
| 2010/0027525 A1 | 2/2010 | Zhu |
| 2010/0027559 A1 | 2/2010 | Lin et al. |
| 2010/0030890 A1 | 2/2010 | Dutta et al. |
| 2010/0041364 A1 | 2/2010 | Lott et al. |
| 2010/0041365 A1 | 2/2010 | Lott et al. |
| 2010/0041391 A1 | 2/2010 | Spivey et al. |
| 2010/0042675 A1 | 2/2010 | Fujii |
| 2010/0043068 A1 | 2/2010 | Varadhan et al. |
| 2010/0046373 A1 | 2/2010 | Smith et al. |
| 2010/0069074 A1 | 3/2010 | Kodialam et al. |
| 2010/0071053 A1 | 3/2010 | Ansari et al. |
| 2010/0075666 A1 | 3/2010 | Garner |
| 2010/0077035 A1 | 3/2010 | Li et al. |
| 2010/0080202 A1 | 4/2010 | Hanson |
| 2010/0082431 A1 | 4/2010 | Ramer et al. |
| 2010/0088387 A1 | 4/2010 | Calamera |
| 2010/0103820 A1 | 4/2010 | Fuller et al. |
| 2010/0105378 A1 | 4/2010 | Shi et al. |
| 2010/0113020 A1 | 5/2010 | Subramanian et al. |
| 2010/0121744 A1 | 5/2010 | Belz et al. |
| 2010/0131584 A1 | 5/2010 | Johnson |
| 2010/0142478 A1 | 6/2010 | Forssell et al. |
| 2010/0144310 A1 | 6/2010 | Bedingfield |
| 2010/0151866 A1 | 6/2010 | Karpov et al. |
| 2010/0153781 A1 | 6/2010 | Hanna |
| 2010/0167696 A1 | 7/2010 | Smith et al. |
| 2010/0188975 A1 | 7/2010 | Raleigh |
| 2010/0188990 A1 | 7/2010 | Raleigh |
| 2010/0188992 A1 | 7/2010 | Raleigh |
| 2010/0188994 A1 | 7/2010 | Raleigh |
| 2010/0190469 A1 | 7/2010 | Vanderveen et al. |
| 2010/0191576 A1 | 7/2010 | Raleigh |
| 2010/0191612 A1 | 7/2010 | Raleigh |
| 2010/0191846 A1 | 7/2010 | Raleigh |
| 2010/0192170 A1 | 7/2010 | Raleigh |
| 2010/0192212 A1 | 7/2010 | Raleigh |
| 2010/0195503 A1 | 8/2010 | Raleigh |
| 2010/0197268 A1 | 8/2010 | Raleigh |
| 2010/0198698 A1 | 8/2010 | Raleigh et al. |
| 2010/0198939 A1 | 8/2010 | Raleigh |
| 2010/0227632 A1 | 9/2010 | Bell et al. |
| 2010/0235329 A1 | 9/2010 | Koren et al. |
| 2010/0241544 A1 | 9/2010 | Benson et al. |
| 2010/0248719 A1 | 9/2010 | Scholaert |
| 2010/0254387 A1 | 10/2010 | Trinh et al. |
| 2010/0284327 A1 | 11/2010 | Miklos |
| 2010/0284388 A1 | 11/2010 | Fantini et al. |
| 2010/0287599 A1 | 11/2010 | He et al. |
| 2010/0311402 A1 | 12/2010 | Srinivasan et al. |
| 2010/0318652 A1 | 12/2010 | Samba |
| 2010/0322071 A1 | 12/2010 | Avdanin et al. |
| 2010/0325420 A1 | 12/2010 | Kanekar |
| 2011/0004917 A1 | 1/2011 | Saisa et al. |
| 2011/0013569 A1 | 1/2011 | Scherzer et al. |
| 2011/0019574 A1 | 1/2011 | Malomsoky et al. |
| 2011/0071854 A1 | 3/2011 | Medeiros et al. |
| 2011/0081881 A1 | 4/2011 | Baker et al. |
| 2011/0082790 A1 | 4/2011 | Baker et al. |
| 2011/0110309 A1 | 5/2011 | Bennett |
| 2011/0126141 A1 | 5/2011 | King et al. |
| 2011/0145920 A1 | 6/2011 | Mahaffey et al. |
| 2011/0159818 A1 | 6/2011 | Scherzer et al. |
| 2011/0173678 A1 | 7/2011 | Kaippallimalil et al. |
| 2011/0177811 A1 | 7/2011 | Heckman et al. |
| 2011/0182220 A1 | 7/2011 | Black et al. |
| 2011/0185202 A1 | 7/2011 | Black et al. |
| 2011/0195700 A1 | 8/2011 | Kukuchka et al. |
| 2011/0238545 A1 | 9/2011 | Fanaian et al. |
| 2011/0241624 A1 | 10/2011 | Park et al. |
| 2011/0244837 A1 | 10/2011 | Murata et al. |
| 2011/0249668 A1 | 10/2011 | Milligan et al. |
| 2011/0252430 A1 | 10/2011 | Chapman et al. |
| 2011/0264923 A1 | 10/2011 | Kocher et al. |
| 2011/0277019 A1 | 11/2011 | Pritchard, Jr. |
| 2011/0294502 A1 | 12/2011 | Oerton |
| 2012/0020296 A1 | 1/2012 | Scherzer et al. |
| 2012/0029718 A1 | 2/2012 | Davis |
| 2012/0108225 A1 | 5/2012 | Luna et al. |
| 2012/0122514 A1 | 5/2012 | Cheng et al. |
| 2012/0144025 A1 | 6/2012 | Welander et al. |
| 2012/0155296 A1 | 6/2012 | Kashanian |
| 2012/0166364 A1 | 6/2012 | Ahmad et al. |
| 2012/0166604 A1 | 6/2012 | Fortier et al. |
| 2012/0195200 A1 | 8/2012 | Regan |
| 2012/0196644 A1 | 8/2012 | Scherzer et al. |
| 2012/0215682 A1* | 8/2012 | Lent .................. G06Q 40/08 705/38 |
| 2012/0238287 A1 | 9/2012 | Scherzer |
| 2012/0330792 A1 | 12/2012 | Kashanian |
| 2013/0024914 A1 | 1/2013 | Ahmed et al. |
| 2013/0029653 A1 | 1/2013 | Baker et al. |
| 2013/0030960 A1 | 1/2013 | Kashanian |
| 2013/0058274 A1 | 3/2013 | Scherzer et al. |
| 2013/0065555 A1 | 3/2013 | Baker et al. |
| 2013/0072177 A1 | 3/2013 | Ross et al. |
| 2013/0084835 A1 | 4/2013 | Scherzer et al. |
| 2013/0095787 A1 | 4/2013 | Kashanian |
| 2013/0117140 A1 | 5/2013 | Kashanian |
| 2013/0144789 A1 | 6/2013 | Aaltonen et al. |
| 2013/0176908 A1 | 7/2013 | Baniel et al. |
| 2013/0196685 A1 | 8/2013 | Griff et al. |
| 2013/0225151 A1 | 8/2013 | King et al. |
| 2013/0326356 A9 | 12/2013 | Zheng et al. |
| 2014/0071895 A1 | 3/2014 | Bane et al. |
| 2014/0073291 A1 | 3/2014 | Hildner et al. |
| 2014/0074719 A1* | 3/2014 | Gressel ............... G06Q 30/06 713/168 |
| 2014/0082142 A1* | 3/2014 | Geffin ............... G06F 11/3055 709/217 |
| 2014/0198687 A1 | 7/2014 | Raleigh |
| 2014/0241342 A1 | 8/2014 | Constantinof |
| 2015/0039763 A1 | 2/2015 | Chaudhary et al. |
| 2015/0181628 A1 | 6/2015 | Haverinen et al. |
| 2015/0341226 A1 | 11/2015 | Griff et al. |
| 2016/0057011 A1* | 2/2016 | Drope ................. H04L 9/0891 709/221 |
| 2017/0063695 A1 | 3/2017 | Ferrell |
| 2020/0092707 A1 | 3/2020 | Raleigh |

FOREIGN PATENT DOCUMENTS

| | | |
|---|---|---|
| CN | 1345154 A | 4/2002 |
| CN | 1508734 A | 6/2004 |
| CN | 1538730 A | 10/2004 |
| CN | 1567818 A | 1/2005 |
| CN | 101035308 A | 3/2006 |
| CN | 1801829 A | 7/2006 |
| CN | 1802839 A | 7/2006 |
| CN | 1889777 A | 7/2006 |

(56) References Cited

FOREIGN PATENT DOCUMENTS

| | | |
|---|---|---|
| CN | 101155343 B | 9/2006 |
| CN | 1867024 A | 11/2006 |
| CN | 1878160 A | 12/2006 |
| CN | 1937511 A | 3/2007 |
| CN | 101123553 A | 9/2007 |
| CN | 101080055 A | 11/2007 |
| CN | 101115248 A | 1/2008 |
| CN | 101127988 A | 2/2008 |
| CN | 101183958 A | 5/2008 |
| CN | 101335666 A | 12/2008 |
| CN | 101341764 A | 1/2009 |
| CN | 101815275 A | 8/2010 |
| EP | 1098490 A2 | 5/2001 |
| EP | 1289326 A1 | 3/2003 |
| EP | 1463238 | 9/2004 |
| EP | 1503548 A1 | 2/2005 |
| EP | 1545114 A1 | 6/2005 |
| EP | 1739518 | 1/2007 |
| EP | 1772988 | 4/2007 |
| EP | 1850575 A1 | 10/2007 |
| EP | 1887732 A1 | 2/2008 |
| EP | 1942698 A1 | 7/2008 |
| EP | 1978772 | 10/2008 |
| EP | 2007065 A1 | 12/2008 |
| EP | 2026514 A1 | 2/2009 |
| EP | 2466831 A1 | 6/2012 |
| EP | 2154602 B1 | 6/2017 |
| JP | 3148713 B2 | 3/2001 |
| JP | 2005339247 A | 12/2005 |
| JP | 2006041989 | 2/2006 |
| JP | 2006155263 A | 6/2006 |
| JP | 2006197137 | 7/2006 |
| JP | 2006344007 A | 12/2006 |
| JP | 2007318354 A | 12/2007 |
| JP | 2008301121 A | 12/2008 |
| JP | 2009111919 | 5/2009 |
| JP | 2009212707 A | 9/2009 |
| JP | 2009218773 | 9/2009 |
| JP | 2009232107 A | 10/2009 |
| KR | 20040053858 A | 6/2004 |
| WO | 1998058505 | 12/1998 |
| WO | 1999027723 | 6/1999 |
| WO | 1999065185 | 12/1999 |
| WO | 0208863 | 1/2002 |
| WO | 2002045315 A2 | 6/2002 |
| WO | 2002067616 A1 | 8/2002 |
| WO | 2002093877 A1 | 11/2002 |
| WO | 2003014891 | 2/2003 |
| WO | 2003017063 A2 | 2/2003 |
| WO | 2003017065 A2 | 2/2003 |
| WO | 2003058880 | 7/2003 |
| WO | 2004028070 | 4/2004 |
| WO | 2004064306 A2 | 7/2004 |
| WO | 2004077797 | 9/2004 |
| WO | 2004095753 | 11/2004 |
| WO | 2005008995 | 1/2005 |
| WO | 2005053335 A1 | 6/2005 |
| WO | 2005083934 A1 | 9/2005 |
| WO | 2006004467 | 1/2006 |
| WO | 2006004784 A1 | 1/2006 |
| WO | 2006012610 A2 | 2/2006 |
| WO | 2006050758 | 5/2006 |
| WO | 2006073837 | 7/2006 |
| WO | 2006077481 | 7/2006 |
| WO | 2006093961 A1 | 9/2006 |
| WO | 2006120558 | 11/2006 |
| WO | 2006130960 | 12/2006 |
| WO | 2007001833 | 1/2007 |
| WO | 2007014630 | 2/2007 |
| WO | 2007018363 | 2/2007 |
| WO | 2007053848 | 5/2007 |
| WO | 2007068288 | 6/2007 |
| WO | 2007069245 | 6/2007 |
| WO | 2007097786 A | 8/2007 |
| WO | 2007107701 | 9/2007 |
| WO | 2007120310 | 10/2007 |
| WO | 2007124279 | 11/2007 |
| WO | 2007126352 | 11/2007 |
| WO | 2007129180 A2 | 11/2007 |
| WO | 2007133844 A | 11/2007 |
| WO | 2008017837 | 2/2008 |
| WO | 2008051379 | 5/2008 |
| WO | 2008066419 | 6/2008 |
| WO | 2008080139 | 7/2008 |
| WO | 2008080430 A1 | 7/2008 |
| WO | 2008099802 | 8/2008 |
| WO | 2009008817 A1 | 1/2009 |
| WO | 2009091295 A1 | 7/2009 |
| WO | 2010088413 | 8/2010 |
| WO | 2010128391 A2 | 11/2010 |
| WO | 2010128391 A3 | 1/2011 |
| WO | 2011002450 A1 | 1/2011 |
| WO | 2011149532 A1 | 12/2011 |

OTHER PUBLICATIONS

"ASA/PIX: Allow Split Tunneling for VPN Clients on the ASA Configuration Example," Document ID 70917, Jan. 10, 2008.
"Communication Concepts for Mobile Agent Systems," by Joachim Baumann et al.; Inst. of Parallel and Distributed High-Performance Systems, Univ, of Stuttgart, Germany, pp. 123-135, 1997.
"End to End QoS Solution for Real-time Multimedia Application;" Computer Engineering and Applications, 2007, 43 (4):155-159, by Tan Zu-guo, Wang Wen-juan; Information and Science School, Zhanjian Normal College, Zhan jiang, Guangdong 524048, China.
"Jentro Technologies launches Zenlet platform to accelerate location-based content delivery to mobile devices," The Mobile Internet, Boston, MA, Feb. 2008.
"The Construction of Intelligent Residential District in Use of Cable Television Network," Shandong Science, vol. 13, No. 2, Jun. 2000.
3rd Generation Partnership Project, "Technical Specification Group Core Network and Terminals; Access Network Discovery and Selection Function (ANDSF) Management Object (MO)," Release 9, Document No. 3GPP TS 24.312, V9.1.0, Mar. 2010.
3rd Generation Partnership Project, "Technical Specification Group Services and System Aspects; General Packet Radio Service (GPRS) Enhancements for Evolved Universal Terrestrial Radio Access Network (E-UTRAN) Access," Release 8, Document No. 3GPP TS 23.401, V8.4.0, Dec. 2008.
3rd Generation Partnership Project, "Technical Specification Group Services and System Aspects; Policy and Charging Control Architecture," Release 8, Document No. 3GPP TS 23 203, V8.4.0, Dec. 2008.
3rd Generation Partnership Project; "Technical Specification Group Services and System Aspects; IP Flow Mobility and seamless WLAN offlload; Stage 2," Release 10, Document No. 3GPP TS 23.261, V1.0.0, Mar. 2010.
Accuris Networks, "The Business Value of Mobile Data Offload—a White Paper", 2010.
Ahmed et al., "A Context-Aware Vertical Handover Decision Algorithm for Multimode Mobile Terminals and Its Performance," BenQ Mobile, Munich Germany; University of Klagenfurt, Klagenfurt, Austria; 2006.
Ahmed et al., "Multi Access Data Network Connectivity and IP Flow Mobility in Evolved Packet System (EPS)," 2010 IEEE.
Alonistioti et al., "Intelligent Architectures Enabling Flexible Service Provision and Adaptability," 2002.
Amazon Technologies, Inc., "Kindle™ User's Guide," 3rd Edition, Copyright 2004-2009.
Android Cupcake excerpts, The Android Open Source Project, Feb. 10, 2009.
Anton, B. et al., "Best Current Practices for Wireless Internet Service Provider (WISP) Roaming"; Release Date Feb. 2003, Version 1.0; Wi-Fi Alliance—Wireless ISP Roaming (WISPr).
Blackberry Mobile Data System, version 4.1, Technical Overview, 2006.
Byrd, Open Secure Wireless, May 5, 2010.
Chandrasekhar et al., "Femtocell Networks: A Survey," Jun. 28, 2008.

(56) References Cited

OTHER PUBLICATIONS

Chaouchi et al., "Policy Based Networking in the Integration Effort of 4G Networks and Services," 2004 IEEE.
Cisco Systems, Inc., "Cisco Mobile Exchange (CMX) Solution Guide: Chapter 2—Overview of GSM, GPRS, and UMTS," Nov. 4, 2008.
Client Guide for Symantec Endpoint Protection and Symantec Network Access Control, 2007.
Dikaiakos et al., "A Distributed Middleware Infrastructure for Personalized Services," Nov. 24, 2003.
Dixon et al., Triple Play Digital Services: Comcast and Verizon (Digital Phone, Television, and Internet), Aug. 2007.
Droid Wall 1.3.7 description Apr. 28, 2010 obtained from https://www.freewarelovers.com/android/apps/droid-wall.
Ehnert, "Small application to monitor IP trafic on a Blackberry—1.01.03 ", Mar. 27, 2008; http://www.ehnert.net/MiniMoni/.
European Commission, "Data Roaming Tariffs—Transparency Measures," obtained from EUROPA—Europe's Information Society Thematic Portal website, Jun. 24, 2011: "http://ec.europa.eu/information_society/activities/roaming/data/measures/index_en.htm.".
Farooq et al., "An IEEE 802.16 WiMax Module for the NS-3 Simulator," Mar. 2-6, 2009.
Fujitsu, "Server Push Technology Survey and Bidirectional Communication in HTTP Browser," Jan. 9, 2008 (JP).
Han et al., "Information Collection Services for Qos-Aware Mobile Applications," 2005.
Hartmann et al., "Agent-Based Banking Transactions & Information Retrieval—What About Performance Issues?" 1999.
Hewlett-Packard Development Company, LP, "IP Multimedia Services Charging," white paper, Jan. 2006.
Hossain et al., "Gain-Based Selection of Ambient Media Services in Pervasive Environments," Mobile Networks and Applications. Oct. 3, 2008.
Jing et al., "Client-Server Computing in Mobile Environments," GTE Labs. Inc., Purdue University, ACM Computing Surveys, vol. 31, No. 2, Jun. 1999.
Kasper et al., "Subscriber Authentication in mobile cellular Networks with virtual software SIM Credentials using Trusted Computing," Fraunhofer-Institute for Secure Information Technology SIT, Darmstadt, Germany; ICACT 2008.
Kassar et al., "An overview of vertical handover decision strategies in heterogeneous wireless networks," ScienceDirect, University Pierre & Marie Curie, Paris, France, Jun. 5, 2007.
Kim, "Free wireless a high-wire act; MetroFi needs to draw enough ads to make service add profits," San Francisco Chronicle, Aug. 21, 2006.
Knight et al., "Layer 2 and 3 Virtual Private Networks: Taxonomy, Technology, and Standarization Efforts," IEEE Communications Magazine, Jun. 2004.
Koutsopoulou et al., "Charging, Accounting and Billing Management Schemes In Mobile Telecommunication Networks and the Internet," IEEE Communications Surveys & Tutorials, First Quarter 2004, vol. 6, No. 1.
Koutsopoulou et al., "Middleware Platform for the Support of Charging Reconfiguration Actions," 2005.
Kuntze et al., "Trustworthy content push," Fraunhofer-Institute for Secure Information Technology SIT; Germany; WCNC 2007 proceedings, IEEE.
Kyriakakos et al., "Ubiquitous Service Provision in Next Generation Mobile Networks," Proceedings of the 13th IST Mobile and Wireless Communications Summit, Lyon, France, Jun. 2004.
Li, Yu, "Dedicated E-Reading Device: The State of the Art and The Challenges," Scroll, vol. 1, No. 1, 2008.
Loopt User Guide, metroPCS, Jul. 17, 2008.
Muntermann et al., "Potentiale und Sicherheitsanforderungen mobiler Finanzinformationsdienste und deren Systeminfrastrukturen," Chair of Mobile Commerce & Multilateral Security, Goethe Univ. Frankfurt, 2004.
NetLimiter Lite 4.0.19.0; http://www.heise.de/download/netlimiter-lite-3617703.html from vol. 14/2007.
Nilsson et al., "A Novel MAC Scheme for Solving the QoS Parameter Adjustment Problem in IEEE802.11e EDCA," Feb. 2006.
Nuzman et al., "A compund model for TCP connection arrivals for LAN and WAN applications," Oct. 22, 2002.
Open Mobile Alliance (OMA), Push Architecture, Candidate Version 2.2; Oct. 2, 2007; OMA-AD-Push-V2_2-20071002-C.
Oppliger, Rolf, "Internet Security: Firewalls and Bey," Communications of the ACM, May 1997, vol. 40. No. 5.
Quintana, David, "Mobile Multitasking," Apr. 14, 2010.
Rao et al., "Evolution of Mobile Location-Based Services," Communication of the ACM, Dec. 2003.
Richtel, "Cellphone consumerism; If even a debit card is too slow, now you have a new way to act on impulse [National Edition]," National Post, Canada, Oct. 2, 2007.
Rivadeneyra et al., "A communication architecture to access data services through GSM," San Sebastian, Spain, 1998.
Roy et al., "Energy Management in Mobile Devices with the Cinder Operating System", Stanford University, MIT CSAIL, Jun. 3, 2010.
Ruckus Wireless—White Paper; "Smarter Wi-Fi for Mobile Operator Infrastructures" 2010.
Sabat, "The evolving mobile wireless value chain and market structure," Nov. 2002.
Sadeh et al., "Understanding and Capturing People's Privacy Policies in a Mobile Social Networking Application," ISR School of Computer Science, Carnegie Mellon University, 2007.
Schiller et al., "Location-Based Services," The Morgan Kaufmann Series in Data Management Systems, 2004.
Sharkey, "Coding for Life-Battery Life That Is," May 27, 2009.
Sharkey, Jeff, "Coding for Life Battery Life, That Is," May 27, 2009.
Steglich, Stephan, "I-Centric User Interaction," Nov. 21, 2003.
Sun et al., "Towards Connectivity Management Adaptability: Context Awareness in Policy Representation and End-to-end Evaluation Algorithm," Dept. of Electrical and Information Engineering, Univ. of Oulu, Finland, 2004.
Thurston, Richard, "WISPr 2.0 Boosts Roaming Between 3G and Wi-Fi"; Jun. 23, 2010; Web page from zdnet.com; Zdnet.com/wispr-2-0-boosts-roaming-between-3g-and-wi-fi-3040089325/.
Van Eijk, et al., "GigaMobile, Agent Technology for Designing Personalized Mobile Service Brokerage," Jul. 1, 2002.
VerizonWireless.com news, "Verizon Wireless Adds to Portfolio of Cosumer-Friendly Tools With Introduction of Usage Controls, Usage Controls and Chaperone 2.0 Offer Parents Full Family Security Solution," Aug. 18, 2008.
Windows7 Power Management, published Apr. 2009.
Wireless Broadband Alliance, "WISPr 2.0, Apr. 8, 2010"; Doc. Ref. No. WBA/RM/WISPr, Version 01.00.
Zhu et al., "A Survey of Quality of Service in IEEE 802.11 Networks," IEEE Wireless Communications, Aug. 2004.

\* cited by examiner

Home > Plan Catalogs > Bill's Catalog (1)

| Properties | Plans | Plan Priorities | Tabs | Subscriber Groups | LCP Errors | Upsells | Promotions | Review |

Name: Bill's Catalog
Version: 1
Description: Intended to illustrate a specific implementation of a service design engine.
Status: DRAFT   Enable Beta Test
LCP Error: No Service

Plans
- ItsOn (1)
- Facebook (1)
- YouTube Application and Site (3.0)
- Twitter (1)
- Shazam (1)

Subscriber Groups
- Bill's Group

Promotions

| Promo | Date Range |
|---|---|
| Trick or Treat | 2011-10-31 00:00:00.0 - 2021-10-31 00:00:00.0 |

Upsells
- No Service
- ItsOn (1)
- Trick or Treat

Errors
(under construction)

◀ Prev    Home

Welcome, das | Help | Sign Out

Copyright © 2010 ItsOn Inc. ItsOn Version: 2.3.2-SNAPSHOT | Revision: 4659 | Build: 2069
By using this software, you agree to the following EULA

SERVICE DESIGN CENTER FOR DEVICE ASSISTED SERVICES

BACKGROUND

Today, end user devices (such as a mobile phone, tablet computer, or notebook computer) sign up for one or more mutually exclusive service plans (e.g., text messages, voice, or data) before being allowed to use an access network. The service plans usually are either pre-paid or post-pay. Depending on which service plans a user subscribes, a cost of using the access network can vary. The access network determines whether the requested use is for the mutually exclusive categories of text messages, voice, or data. Once the appropriate service plan is determined, the access network can use a policy of the service plan to determine the cost for the use. However, a user is limited to selecting one service plan from each of these three mutually exclusive categories, and thus the user is limited in selecting how he/she wants to use the access network. For example, a user cannot select multiple data plans for various data services to customize an end user device's use of the access network.

The configuration of the access network to implement a particular service plan is also very difficult. For example, to create a service plan for data services, employees of the carrier that operate the access network will discuss basic attributes of the plan (e.g., whether to charge by MB or to be unlimited), and the cost of the plan. Then, an employee will enter into a network device the policy to track use of the access network (e.g., if the former is chosen) for end user devices that subscribe to the particular data plan. An employee also enters a policy into another network device for allowing end user devices that subscribe to the data plan to use the access network. This cumbersome process makes the design of the service plan rigid, time-consuming, and prone to errors, thereby taking a long time to complete and have users begin selecting the data plan for their data services.

The foregoing example of trends and issues is intended to be illustrative and not exclusive. Other limitations of the art will become apparent to those of skill in the relevant art upon a reading of the specification and a study of the drawings.

DETAILED DESCRIPTION

Figure 1:
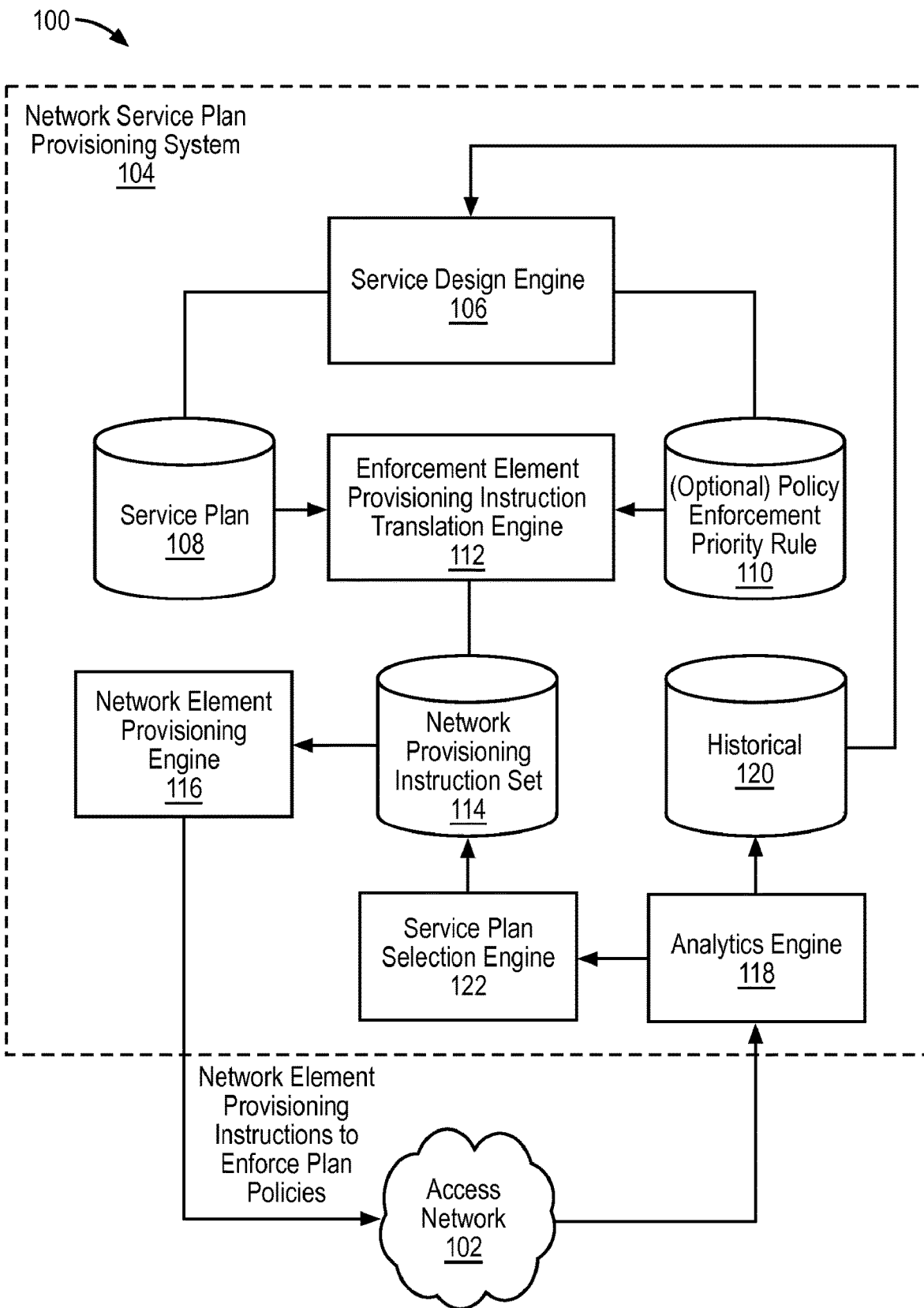
FIG. 1 depicts an example of a system including an access network and a network service plan provisioning system.

FIG. 1 depicts an example of a system 100 including an access network 102 and a network service plan provisioning system 104. In the example of FIG. 1, the access network 102 receives network element provisioning instructions to enforce plan policies from the network service plan provisioning system 104. In a specific implementation, the network service plan provisioning system 104 can receive service plan selection data from the access network, and provide new instructions based upon the selection.

The access network 102 can include a network that can provide network services to a device. The access network 102 can include a wireless network (e.g., WiFi, cellular, or some other wireless technology) and/or a wired network (e.g., LAN or DSL). Wireless or wired devices can be referred to as "on" the access network 102 when the devices complete relevant association, authentication, and/or other procedures that enable to devices to obtain the services offered on the access network 102 in accordance with applicable known or convenient techniques. Advantageously, the devices can have inter-network policies that are provided by the network service plan provisioning system 104 in accordance with techniques described in this paper. Inter-network policies, as the term is used in this paper, refer to traffic control, charging, and notification policies that remain in effect after a device passes from one network to another (e.g., by roaming). Intra-network policies, on the other hand, refer to control traffic control limited to the boundaries of a network (e.g., in-network traffic control, charging, and/or notification policies, plus an optional traffic control policy that permits or prevents roaming to another network).

It is likely that it will be desirable to couple the access network 102 to another network. Networks can include enterprise private networks and virtual private networks (collectively, private networks), which are well known to those of skill in computer networks. As the name suggests, private networks are under the control of an entity rather than being open to the public. Private networks include a head office and optional regional offices (collectively, offices). Many offices enable remote users to connect to the private network offices via some other network, such as the Internet, a public switched telephone network (PSTN), or the like. As used in this paper, a private network is intended to mean a network that is under the control of a single entity or hierarchy of entities. This is typically the case for cellular networks, wireless infrastructure networks, company LANs and WANs, and the like.

In the example of FIG. 1, the access network 102 and the network service plan provisioning system 104 may or may not be on the same private network, or a first entity may own or control a portion of the access network 102 and a second entity may own or control a portion of the access network 102 as well as the network service plan provisioning system 104. For example, a carrier may include the network service plan provisioning system 104, but the access network 102 may include a WiFi network owned by a local business entity.

Advantageously, in a specific implementation, the carrier can continue to provide policy control while a subscriber is on the access network 102. Where the access network 102 includes a cellular network of the carrier in this example, even greater policy control may be possible.

It should be noted that a subscriber can be defined broadly to include any applicable device on the access network 102. For example, the access network 102 could include parking meter devices, food-dispensing machines, and automobile onboard computers, as well as smart phones and other devices frequently used by humans.

In the example of FIG. 1, the network service plan provisioning system 104 includes a service design engine 106, a service plan datastore 108, an optional policy enforcement priority rule datastore 110, an enforcement element provisioning instruction translation engine 112, a network provisioning instruction set 114, a network element provisioning engine 116, and analytics engine 118, a historical datastore 120 and a service plan selection engine 122.

The service design engine 106 inputs service plan data structures and other related data that is described later in more detail into the service plan datastore 108. Engines, as described in this paper, refer to computer-readable media coupled to a processor. The computer-readable media have data, including executable files, that the processor can use to transform the data and create new data. An engine can include a dedicated or shared processor and, typically, firmware or software modules that are executed by the processor. Depending upon implementation-specific or other considerations, an engine can be centralized or its functionality distributed. An engine can include special purpose hardware, firmware, or software embodied in a computer-readable medium for execution by the processor. As used in this paper, a computer-readable medium is intended to include all mediums that are statutory (e.g., in the United States, under 35 U.S.C. 101), and to specifically exclude all mediums that are non-statutory in nature to the extent that the exclusion is necessary for a claim that includes the computer-readable medium to be valid. Known statutory computer-readable mediums include hardware (e.g., registers, random access memory (RAM), non-volatile (NV) storage, to name a few), but may or may not be limited to hardware.

Datastores, as described in this paper, can be implemented, for example, as software embodied in a physical computer-readable medium on a general- or specific-purpose machine, in firmware, in hardware, in a combination thereof, or in an applicable known or convenient device or system. Datastores in this paper are intended to include any applicable organization of data, including tables, comma-separated values (CSV) files, traditional databases (e.g., SQL), or other applicable known or convenient organizational formats. Datastore-associated components, such as database interfaces, can be considered "part of" a datastore, part of some other system component, or a combination thereof, though the physical location and other characteristics of datastore-associated components is not critical for an understanding of the techniques described in this paper.

The service plan datastore 108 can store service plan data structures. As used in this paper, a data structure is associated with a particular way of storing and organizing data in a computer so that it can be used efficiently within a given context. Data structures are generally based on the ability of a computer to fetch and store data at any place in its memory, specified by an address, a bit string that can be itself stored in memory and manipulated by the program. Thus some data structures are based on computing the addresses of data items with arithmetic operations; while other data structures are based on storing addresses of data items within the structure itself. Many data structures use both principles, sometimes combined in non-trivial ways. The implementation of a data structure usually entails writing a set of procedures that create and manipulate instances of that structure.

In an example of a system where the service plan datastore 108 is implemented as a database, a database management system (DBMS) can be used to manage the service plan datastore 108. In such a case, the DBMS may be thought of as part of the service plan datastore 108 or as part of the service design engine 106 and/or the enforcement element provisioning instruction translation engine 112, or as a separate functional unit (not shown). A DBMS is typically implemented as an engine that controls organization, storage, management, and retrieval of data in a database. DBMSs frequently provide the ability to query, backup and replicate, enforce rules, provide security, do computation, perform change and access logging, and automate optimization. Examples of DBMSs include Alpha Five, DataEase, Oracle database, IBM DB2, Adaptive Server Enterprise, FileMaker, Firebird, Ingres, Informix, Mark Logic, Microsoft Access, InterSystems Cache, Microsoft SQL Server, Microsoft Visual FoxPro, MonetDB, MySQL, PostgreSQL, Progress, SQLite, Teradata, CSQL, OpenLink Virtuoso, Daffodil DB, and OpenOffice.org Base, to name several.

Database servers can store databases, as well as the DBMS and related engines. Any of the datastores described in this paper could presumably be implemented as database servers. It should be noted that there are two logical views of data in a database, the logical (external) view and the physical (internal) view. In this paper, the logical view is generally assumed to be data found in a report, while the physical view is the data stored in a physical storage medium and available to a specifically programmed processor. With most DBMS implementations, there is one physical view and an almost unlimited number of logical views for the same data.

A DBMS typically includes a modeling language, data structure, database query language, and transaction mechanism. The modeling language is used to define the schema of each database in the DBMS, according to the database model, which may include a hierarchical model, network model, relational model, object model, or some other applicable known or convenient organization. An optimal structure may vary depending upon application requirements (e.g., speed, reliability, maintainability, scalability, and cost). One of the more common models in use today is the ad hoc model embedded in SQL. Data structures can include fields, records, files, objects, and any other applicable known or convenient structures for storing data. A database query language can enable users to query databases, and can include report writers and security mechanisms to prevent unauthorized access. A database transaction mechanism ideally ensures data integrity, even during concurrent user accesses, with fault tolerance. DBMSs can also include a metadata repository; metadata is data that describes other data.

In a specific implementation, the service design engine 106 inputs policy enforcement priority rule data structures in the policy enforcement priority rule datastore 110. An aspect of policy control described in this paper entails the superposition of a first traffic classification filter of a service plan over a second traffic classification filter of the service plan. There is more than one way to accomplish this superposition including, for example, ordering the first and second traffic classification filter such that the first traffic classification filter is applied to a traffic event before the second traffic classification filter, trapping a match of the first traffic classification filter in a kernel until the second traffic classification filter is matched (then applying a first relevant action of an action list), or applying an explicit policy enforcement priority rule. Because implicit policy enforcement priorities can be used, the policy enforcement priority rule datastore 110 is optional. It should be noted that explicit policy enforcement priorities can be mandated in accordance with implementation- and/or configuration-specific parameters or a combination of implicit and explicit policy enforcement priorities can be used. In a specific implementation, explicit priorities trump implicit priorities (e.g., ordering).

In the example of FIG. 1, the enforcement element provisioning instruction translation engine 112 converts service plan data structures in the service plan datastore 108 into respective network provisioning instruction set data structures, which are stored in the network provisioning instruction set datastore 114. The translation engine 112 can also convert the relevant policy enforcement priority rule data structures from the policy enforcement priority rule datastore 110, if applicable, for inclusion in the network provisioning instruction set data structures.

In the example of FIG. 1, the network element provisioning engine 116 provides network element provisioning instructions to enforce plan policies to the access network 102. The network element provisioning instructions are applicable to one or more devices that may or may not currently be on the access network 102. In a specific implementation, the network element provisioning instructions are sent to the access network 102 only when the applicable one or more devices are on the access network 102.

In the example of FIG. 1, the analytics engine 118 receives data from the access network 102, which can include subscriber feedback or instructions. For the purposes of this example, the data is presumed to include service plan selection data, which is used by the service plan selection engine 122. The analytics engine 118 can modify the data in a manner that is useful to the network service plan provisioning system 104, which can include triggering actions based upon feedback or instructions from the access network 102. The data can be stored in the historical datastore 120, which can be used by the service design engine 106. For example, the service design engine 106 can specify whether more or less data should be requested from the device (e.g., based upon network state), determine whether to reduce counts or other notifications, specify parameters that are to be recorded within classifications, or the like.

Network state can be associated with a network busy state (or, conversely, a network availability state). A network availability state can include, for example, a state or measure of availability/capacity of a segment of a network (e.g., a last edge element of a wireless network). A network busy state can include, for example, a state or measure of the network usage level or network congestion of a segment of a network (e.g., a last edge element of a wireless network). In some embodiments, network availability state and network busy state are inverse measures. As used herein with respect to certain embodiments, network availability state and network busy state can be used interchangeably based on, for example, a design choice (e.g., designing to assign background policies based on a network busy state or a network availability state yields similar results, but they are different ways to characterize the network performance and/or capacity and/or congestion). In some embodiments, network availability state and network busy state are dynamic measures as such states change based on network usage activities (e.g., based on a time of day, availability/capacity level, congestion level, and/or performance level). In some embodiments, differential network service usage control of a network service usage activity is based on a network busy state or network availability state. In a specific implementation, there are four levels of network busy state (not busy, light, medium, critical).

In the example of FIG. 1, the service plan selection engine 122 receives service plan selection data from the analytics engine 118. The service plan selection data can be from a device on the access network 102, originate from the access network 102, or a combination thereof. In a specific implementation, the service plan selection data is entered at a device by a user and forwarded to the service plan selection engine 122 through the access network 102.

Upon receipt of the service plan selection data, the service plan selection engine 122 can, if appropriate, select a new network provisioning instruction set in the network provisioning instruction set 114 for provisioning to the access network 102 in the manner described previously. (The service plan selection engine 122 may or may not be capable of triggering the service design engine 106 to modify a service plan, which is translated into a network provisioning instruction set for selection by the service plan selection engine 122.)

Figure 2:
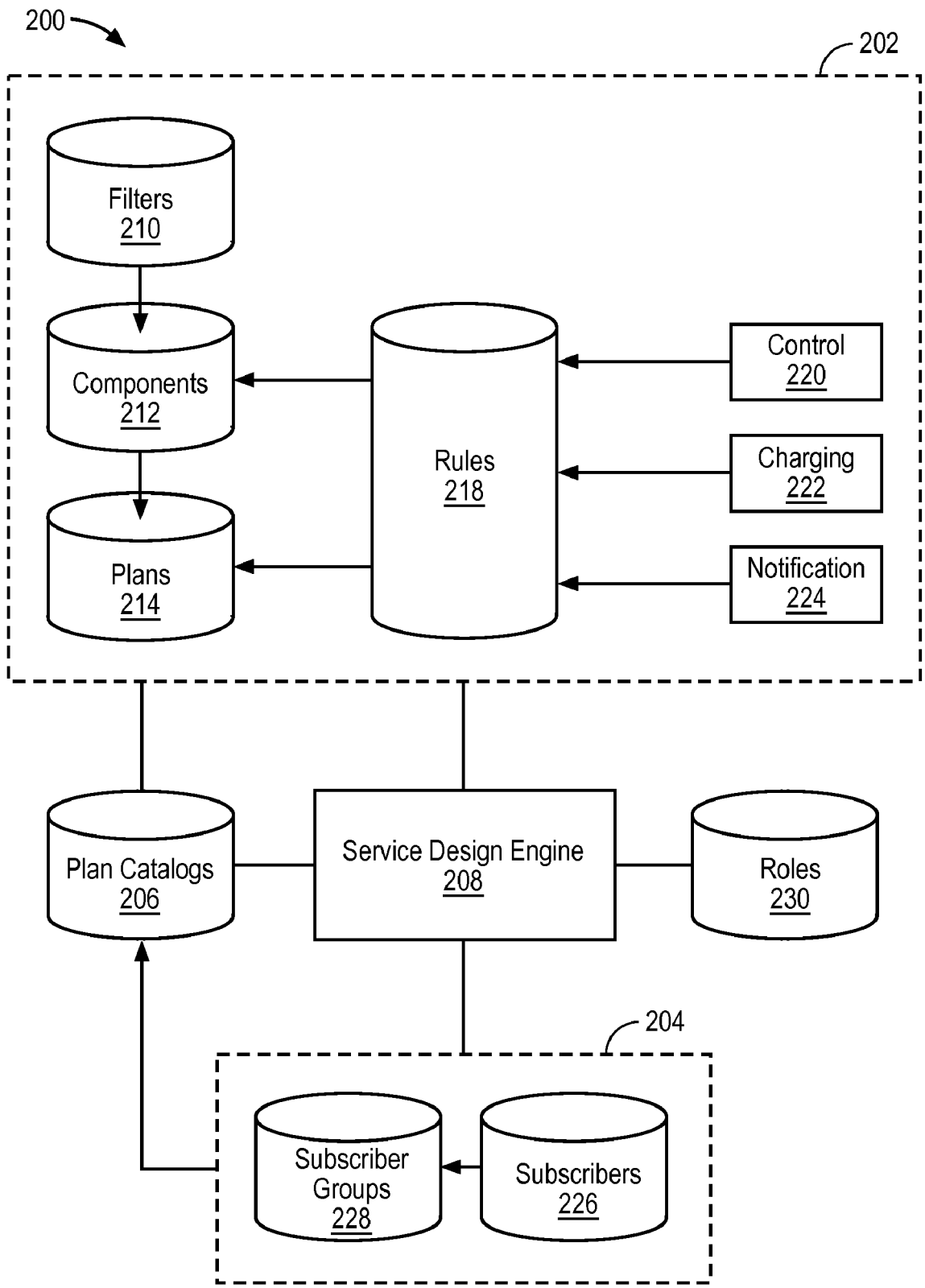
FIG. 2 depicts a conceptual diagram of an example of a hierarchical structure useful for understanding service plan design and provisioning.

FIG. 2 depicts a conceptual diagram 200 of an example of a hierarchical structure useful for understanding service plan design and provisioning. The conceptual diagram 200 includes a collection of datastores associated with service plans 202, a collection of datastores associated with subscribers 204, a plan catalogs datastore 206, and a service design engine 208.

The collection of datastores 202 includes a filters datastore 210, a components datastore 212, a plans datastore 214, a rules datastore 218, a traffic control rule data structure 220, a charging data structure 222, and a notification data structure 224. The filters datastore 210 can include, for example, traffic control filter data structures that, when used, allow, block, throttle, delay (for a fixed period of time), and defer (until an event) a matched traffic event. Aspects of a traffic event to which a filter is mapped can include, for example, by remote destination, by application, by content (e.g., generic content such as streaming, specific content identifiable using regular expressions, etc.), by protocol, by port, by target operating system, to name several. In the context of service design, it has proven convenient to offer designers filter packages that combine a traffic control filter with an action. Such actions can include notify (which triggers a notification to be sent to a notification destination), cap (which increments a count), trap (which traps a match at the kernel level to see if another filter is matched later), and instructions (which can result in some other instruction to be executed).

The components datastore 212 can include, for example, a set of filter packages, including at least one filter, and a set of policies. Because components can inherit policy, it is not an explicit requirement that a component include at least one policy. However, when a component is assembled in a service plan offering, the component will have either a policy in the set of policies or will inherit a policy.

The plans datastore 214 can include, for example, a hierarchy of components. The components are organized into classes, which can include, for example, carrier, network protection, application (paid or sponsored), interceptor (marketing interceptor or parental control), bulk, post-bulk, and end-of-life. It at least one implementation, the end-of-life class is handled by a default, rather than a component that is stored in the components datastore 212.

The rules datastore 218 includes policy rules. For illustrative purposes, three policy type data structures are depicted as directed toward the rules datastore 218: traffic control policy data structure 220, charging policy data structure 222, and notification policy data structure 224. The traffic control policy data structure 220 can include a variety of filter packages designed to control the flow of traffic, such as allow or block, and take certain actions in association with the traffic control, such as cap-and-match. The charging policy data structure 222 can be directed to a user or a sponsor (who can subsidize network service usage) and can include a charging code.

The notification policy data structure 224 can be directed to a user, a sponsor, or an engine that takes further action in accordance with variables or constant parameters in the notification and can include content for use by the target of the notification and a trigger (e.g., a selectable button that results in the execution of relevant instructions). Notification types include plan limit thresholds (plan has reached a specified % of charging policy cap), plan cap limit (requested network activity has been capped because charging policy cap has been reached), plan limit overage (overage has reached a specified %; offer the option of overage, new service plan, block ongoing usage, etc.), plan expiration (plan expired; offer option to buy a new plan), activity block event (activity blocked by filter or activity state change), no capable plan (plan does not support the requested network activity, which has been blocked), marketing interceptor (specific message or offer based on current activity or status), promotional message (overview of what plan provides), upsell offer (upsell tiered plan based on current usage). Notification actions can be added to notifications to make them "actionable," which means that a recipient of the notification can provide feedback or instructions in response to the notification. Notification actions can include, for example, OK/dismiss, cancel, acknowledge, buy (links to buy workflow), more info (e.g., more information regarding why a traffic event was blocked, suggestions for traffic activity changes or service plan purchase), back (call a previous workflow screen), next (call a next workflow screen), launch (launch URL or application). Notification customizations can include foreground, background, foreground/background (display in foreground if activity is in foreground and in background otherwise), title, subtitle, text, icon, buttons/actions, "do not show again" (will not show again for a specified time), default target button (specifies a default response action), or the like.

The collection of datastores associated with subscribers 204 includes a subscribers datastore 226 and a subscriber groups datastore 228. The subscribers datastore 226 includes subscriber data structures that include information about subscribers. A minimalist subscriber data structure is likely to at least include a subscriber identification that is unique within the system 200 or universally, such as an International Mobile Subscriber Identity (IMSI). It may also be useful to include such information as a phone number, device type, and/or International Mobile Equipment Identity (IMEI).

The subscriber groups datastore 228 includes subscriber group data structures that include groupings of subscribers. The types of groupings that can be done in a system depends upon the amount of information that is known about subscribers. For example, subscribers can be grouped by device type, device characteristics, demographic characteristics of the subscriber, region, etc.

The plan catalogs datastore 206 includes plan catalog data structures that are available to consumers or providers of network service plans. The plan catalog data structures are combinations of components from the collection of datastores associated with service plans 202 and the collection of datastores associated with subscribers 204.

The service design engine 208 can manage the datastores depicted in the example of FIG. 2. Aspects of service design and/or provisioning can be assigned to agents of the system 200. The amount of control over the system that an agent is granted is based upon the role of the agent, which can be recorded in the roles datastore 230. Roles can be set to super user, portal admin, system admin, or some other role that is applicable to the capabilities of the design center (e.g., whether it is a carrier design center, or a sandbox for an enterprise, applications developer, community-based organization, gifting organization, Mobile Virtual Network Operator (MVNO), etc.) and the human agent who is using the system.

Figure 3A:
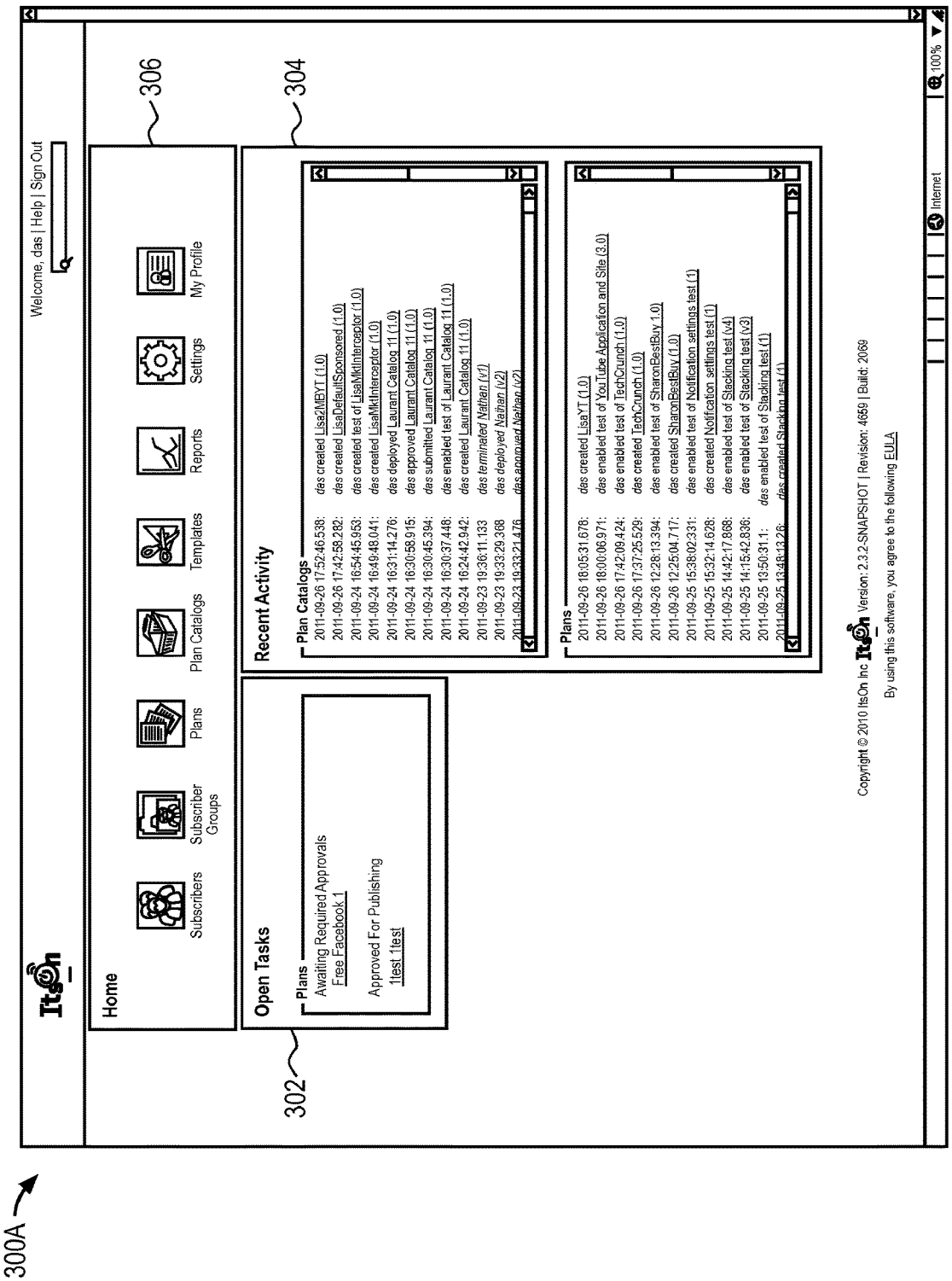
FIGS. 3A through 3AB depict screenshots of a specific implementation of a service design system.

Screenshots of a user interface for a specific implementation of a service design engine, such as the service design engine 208, can be used to illustrate some of the functionality of the service design engine 208. FIGS. 3A-3AB depict screenshots of a User Interface (UI) for a specific implementation of a service design system.

In the example of FIG. 3A, following login, a designer is directed to a service design center UI home page with an open tasks field 302, a recent activity field 304, and a menu buttons field 306. The open tasks field 302 can include drafts that are awaiting approval, beta tests that are awaiting publication/deployment, and deployed plans that are targeted for termination, or other open tasks. The recent activity field 304 can include as much or as little information as is deemed useful to designers.

Figure 3B:
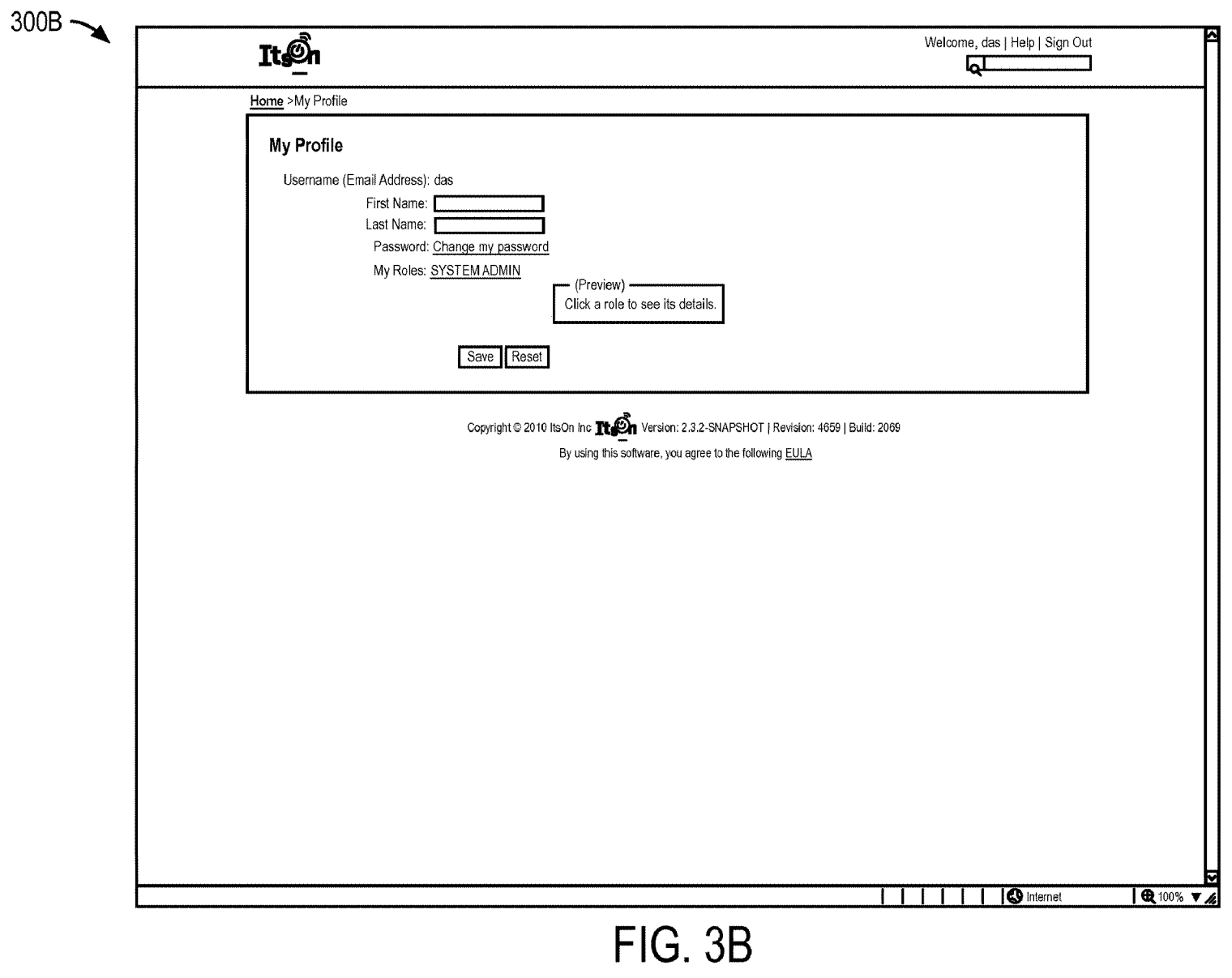

The menu buttons field 306 includes eight buttons, a subscribers button, a subscriber group button, a plans button, a plan catalogs button, a templates button, a reports button, a settings button, and a my profile button. Selecting the my profile button brings a designer to screenshot 300B (FIG. 3B), where the designer can enter information such as first name, last name, password, and role. Roles can be set to super user, portal admin, system admin, or some other role that is applicable to the capabilities of the design center (e.g., whether it is a carrier design center, or a sandbox for an enterprise, applications developer, community-based organization, gifting organization, Mobile Virtual Network Operator (MVNO), etc.) and the particular designer who is using the system.

Figure 3C:
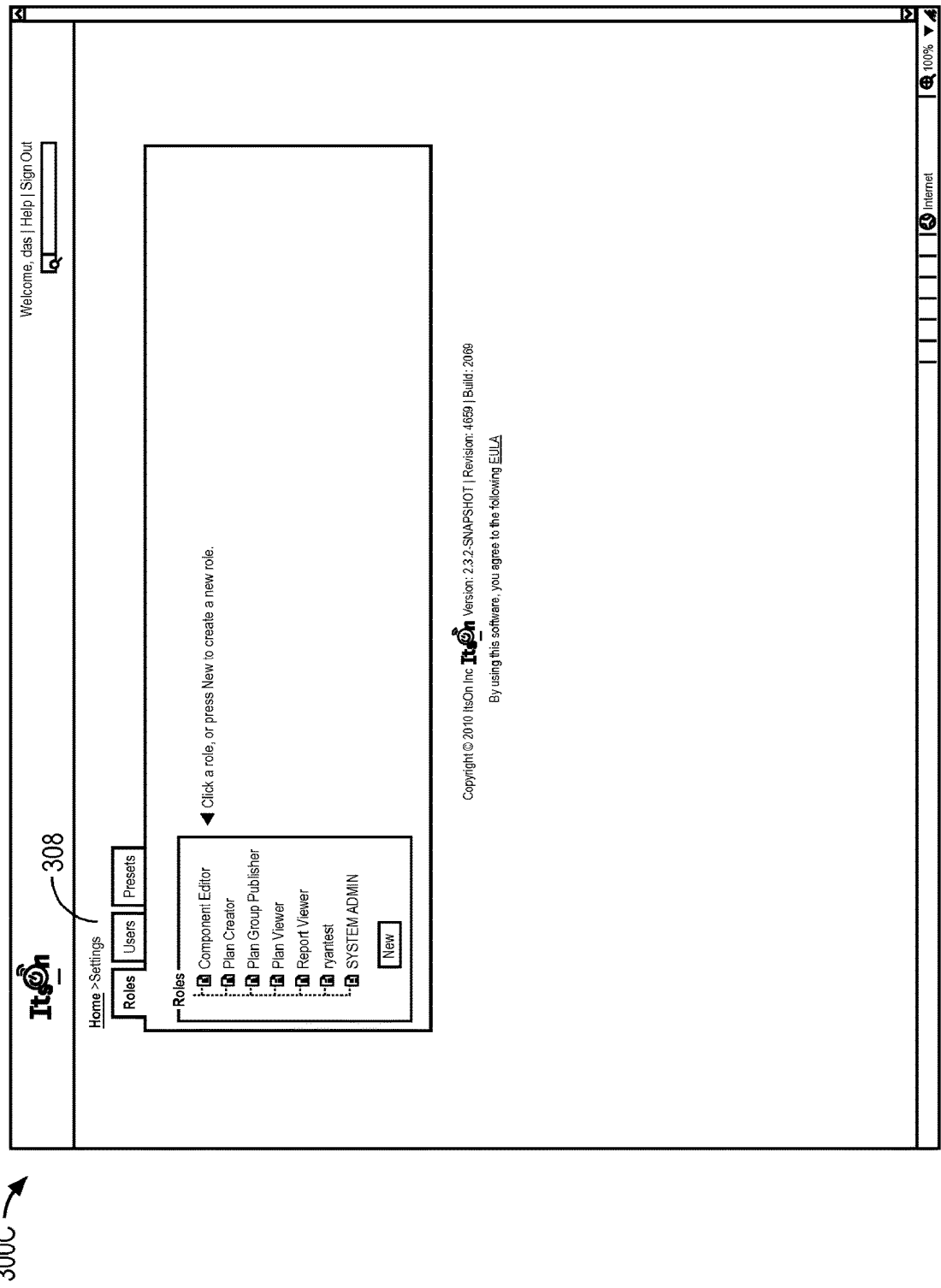
Figure 3D:
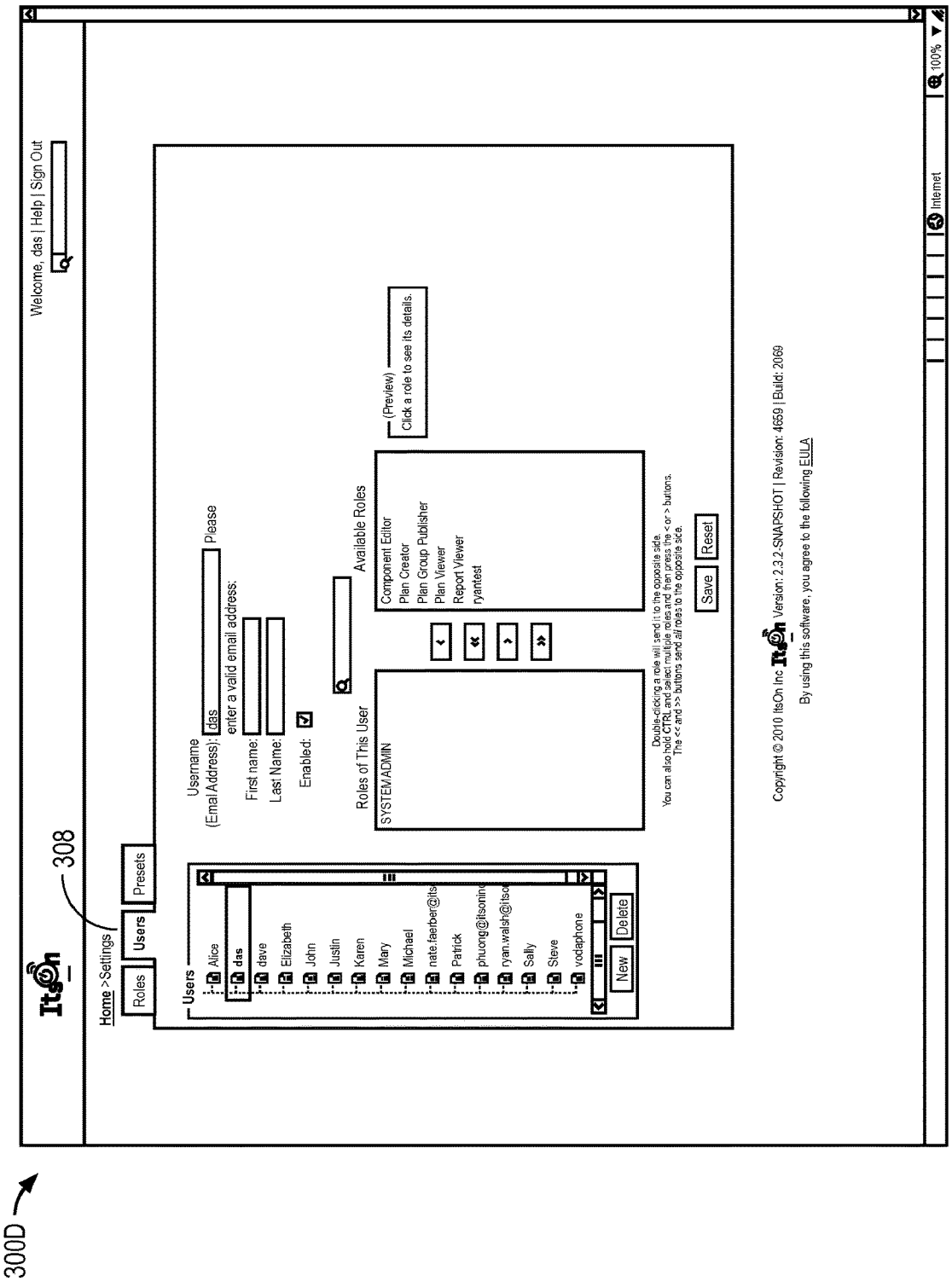
Figure 3E:
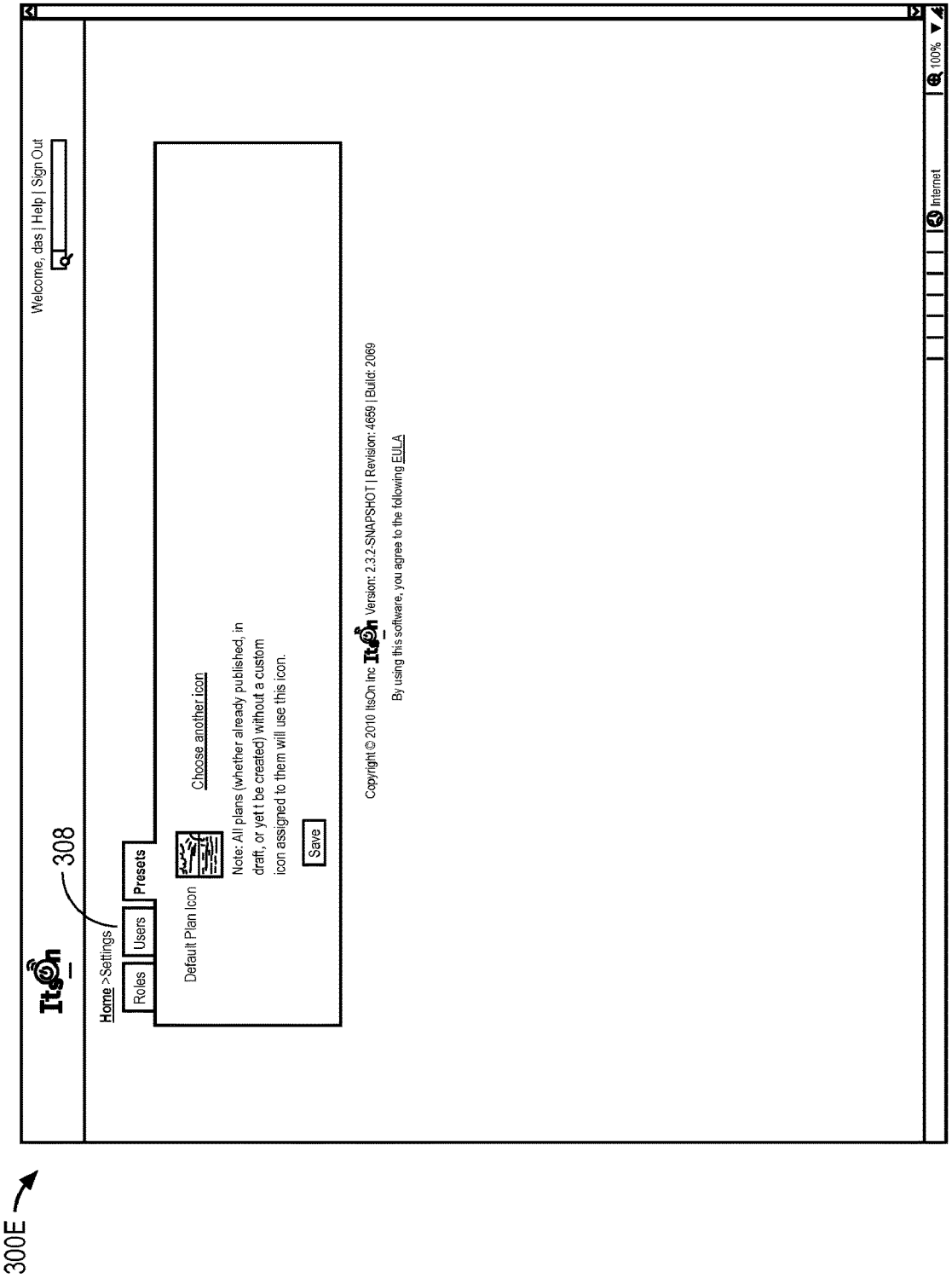

Selecting the settings button of the menu buttons field 306 brings a designer to screenshot 300C (FIG. 3C), where the designer can select a roles tab, a users tab, or a presets tab from a tabs menu 308. Selecting the Roles tab from the tabs menu 308 enables a designer to add roles, such as component editor, plan creator, plan group publisher, plan viewer, report viewer, and system admin. It may be noted that a designer will not necessarily be able to view all roles in this tab and, in a likely implementation, may be unable to create roles with rights the designer does not have (e.g., a system admin may have fewer rights than a super user and different rights than a portal admin). Selecting the Users tab from the tabs menu 308 enables a designer to add and edit users. In the example of FIG. 3D (screenshot 300D), the user das has been selected, and das' details, such as username (email address), first name, last name, whether the user is enabled, roles, and available roles are depicted. Selecting the Presets tab from the tabs menu 308 enables a designer to choose a default plan icon as depicted in the example of FIG. 3E (screenshot 300E).

Figure 3F:
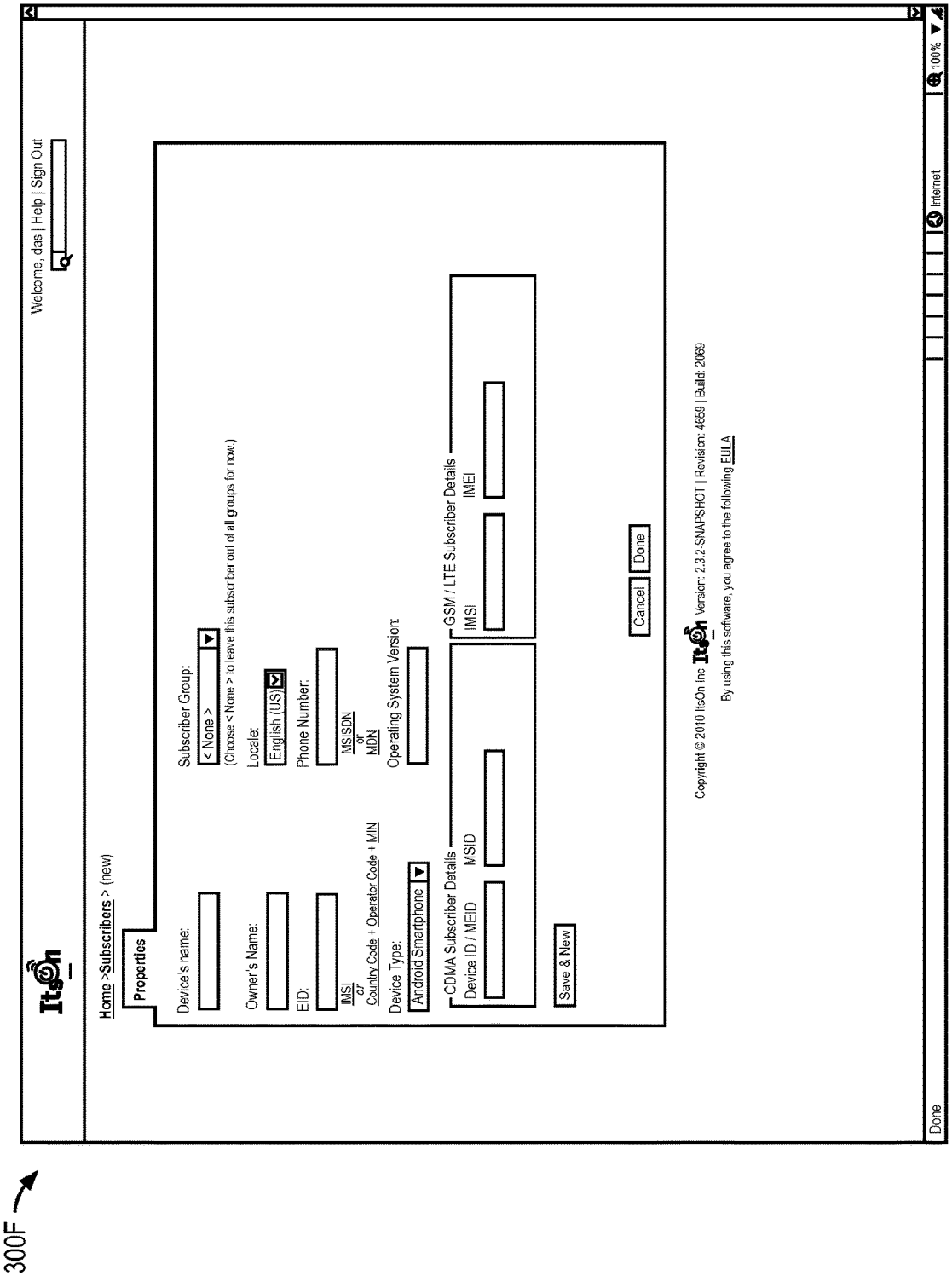

Selecting the subscribers button of the menu buttons field 306 and selecting a new subscriber brings a designer to screenshot 300F (FIG. 3F). In this specific implementation, the subscriber information includes a device name, subscriber group, owner name, locale, EID, phone number, device type, operating system version, CDMA subscriber details, and GSM/LTE subscriber details. This information can also be edited for subscribers that are already in the subscribers datastore.

Figure 3G:
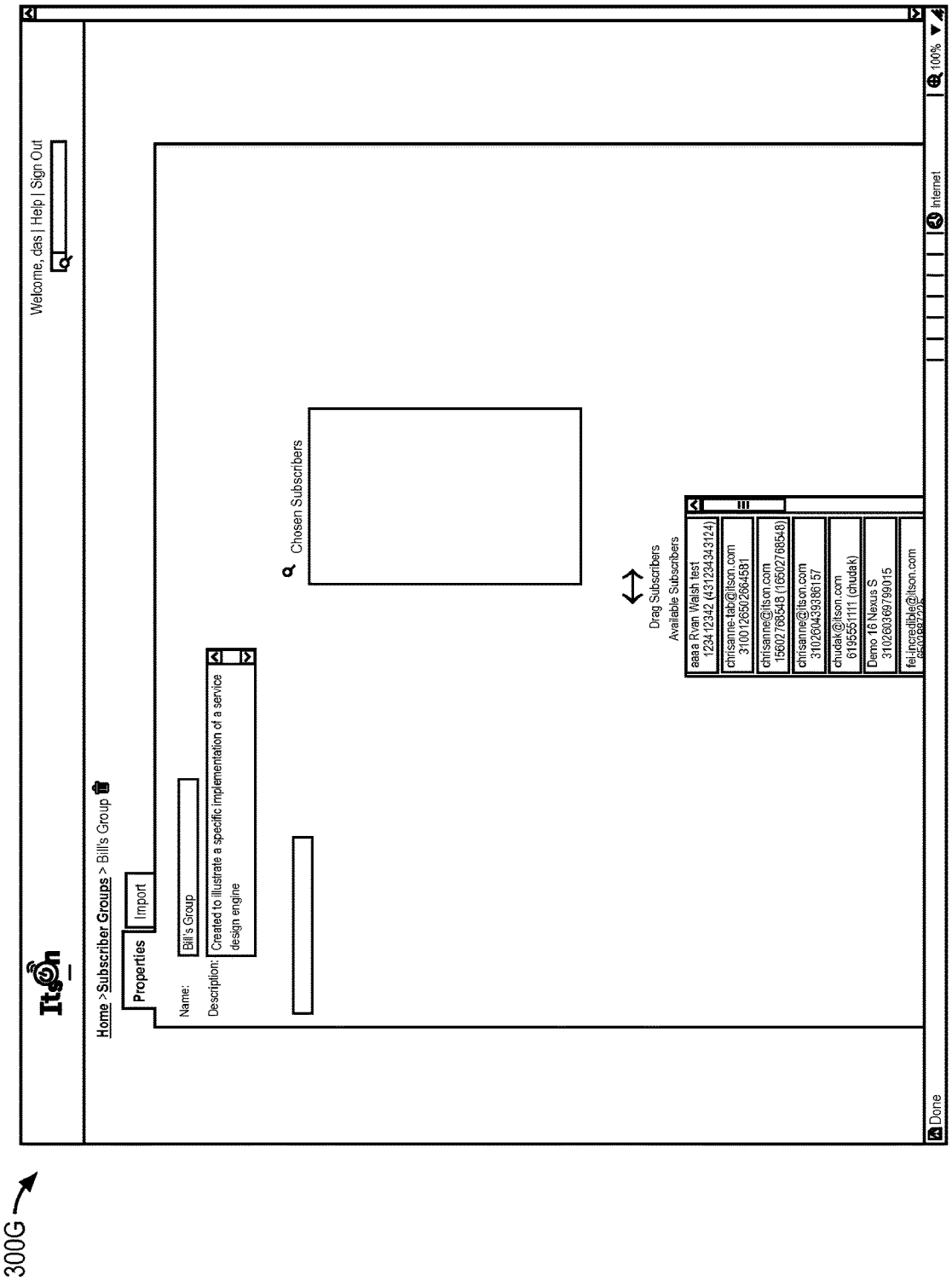
Figure 3H:
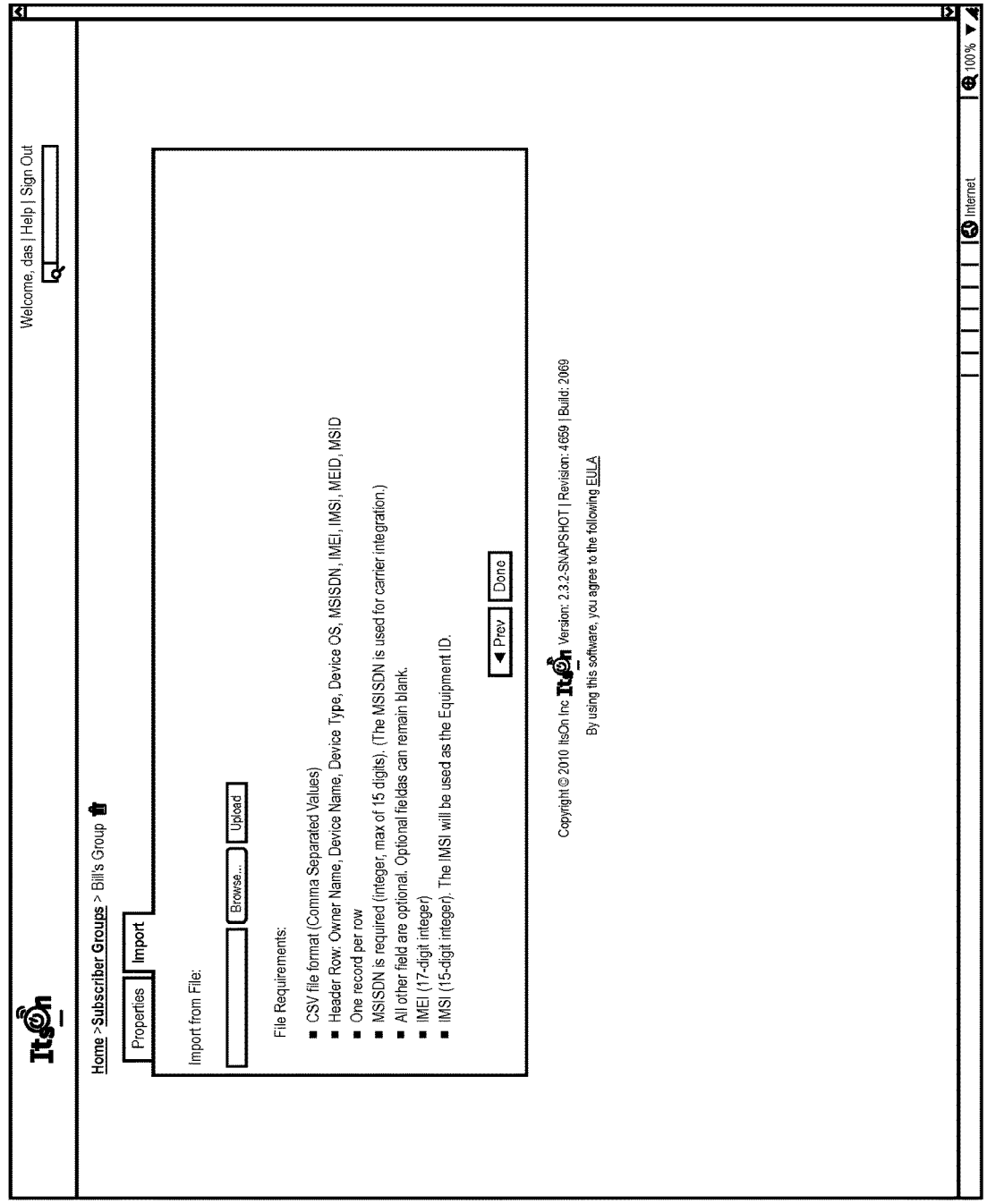
Figure 31:
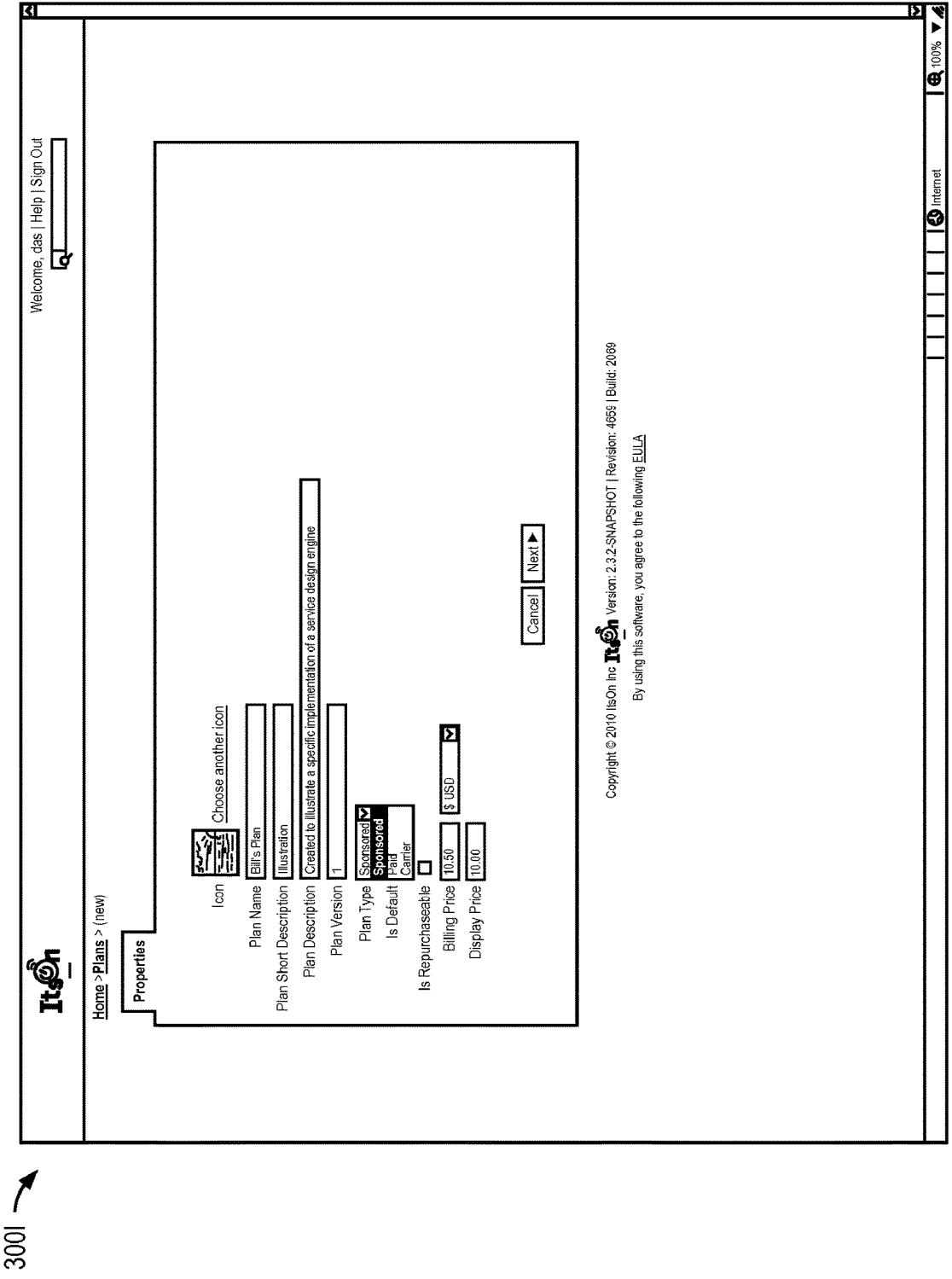

Selecting the subscriber groups button of the menu buttons field 306 brings a designer to screenshot 300G (FIG. 3G), where the designer can select a properties tab or an import tab. Choosing to create a new subscriber group prompts the designer to enter a group name and description, and to drag subscribers into the group. Selecting the import tab enables the designer to import subscribers from a subscribers datastore in a batch operation. See, e.g., FIG. 3H, screenshot 300H. Information can also be edited for subscriber groups that are already in the subscriber groups datastore.

Figure 3J:
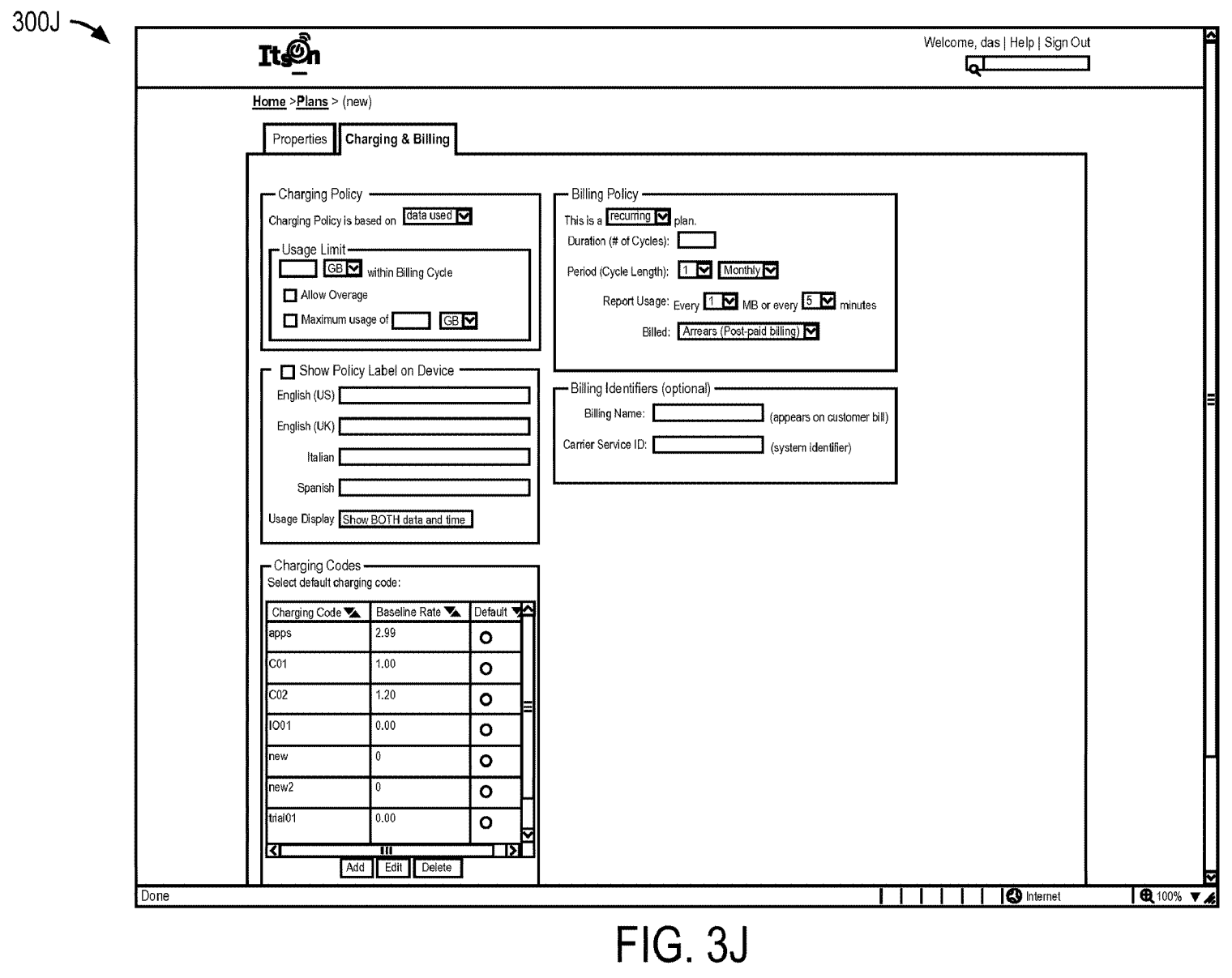
Figure 3K:
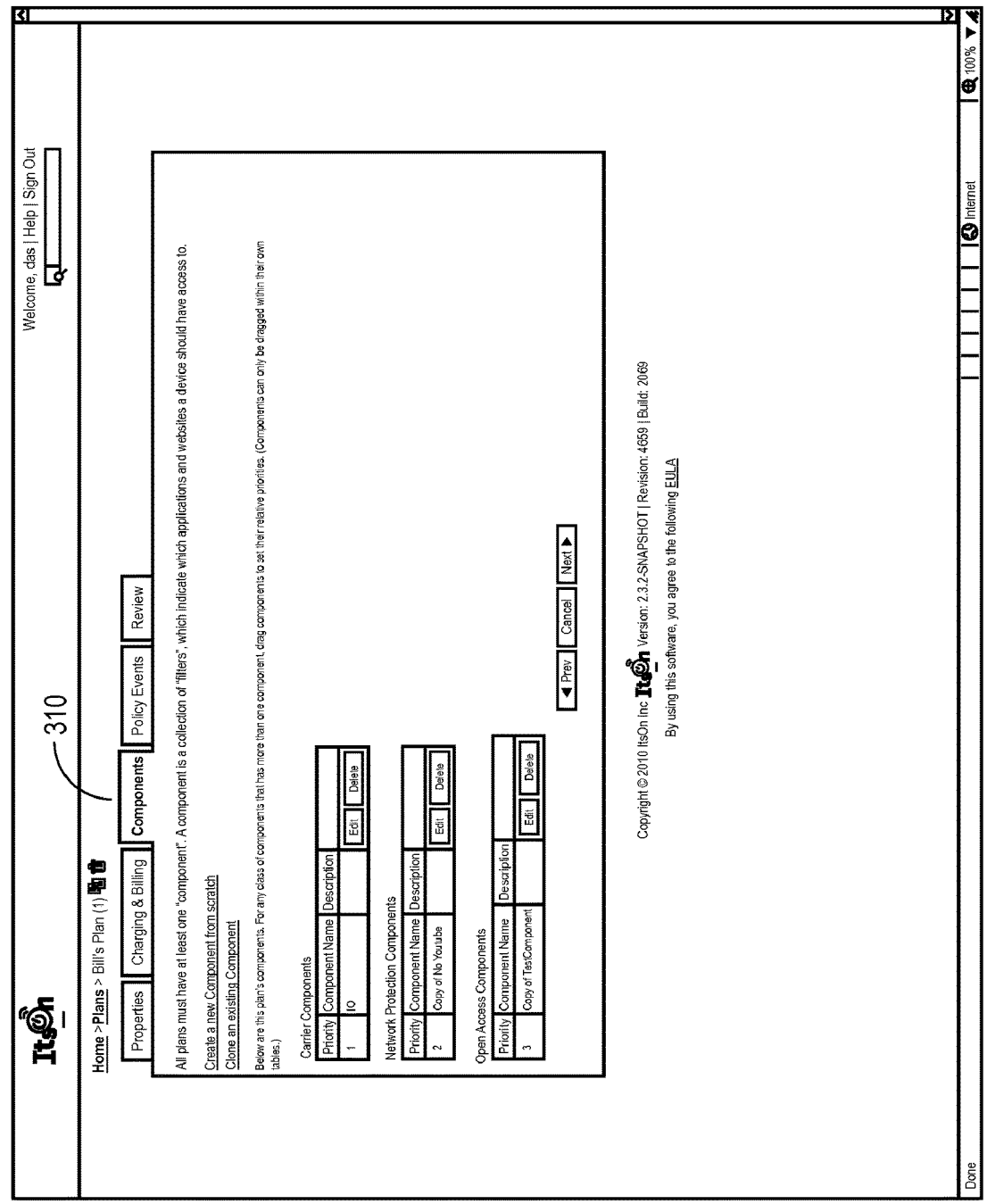

Selecting the plans button of the menu buttons field 306 and selecting a new plan brings a designer to screenshot 300I (FIG. 3I). In this specific implementation, the plan information includes a plan icon, a plan name, a plan short description, a plan description, a plan version, a plan type (e.g., sponsored, paid, or carrier), an "is default" checkbox, an "is repurchaseable" checkbox, a billing price, and a display price (in case the billing price is not the same as the billing price). A next screenshot 300J (FIG. 3J) enables entry of further information about the plan, including charging policy (e.g., based on data used or time spent, usage limits and overage allowances), billing policy (e.g., one-time or recurring, usage reporting, and pre- or post-billing). It is possible in this specific implementation to show a policy label on the device and include billing identifiers. A charging code can also be created or selected by the designer. A next screenshot 300K (FIG. 3K) includes an option to add components, either by creating a new component or cloning an existing component. In the example of FIG. 3K, three components have been added to the list of components for the plan, with explicit priorities 1, 2, and 3. Note that in this specific implementation, the number of tabs in the tab menu 310 increases as data is entered for the plan until the tab menu 310 includes a properties tab, a charging & billing tab, a components tab, a policy events tab, and a review tab.

Figure 3L:
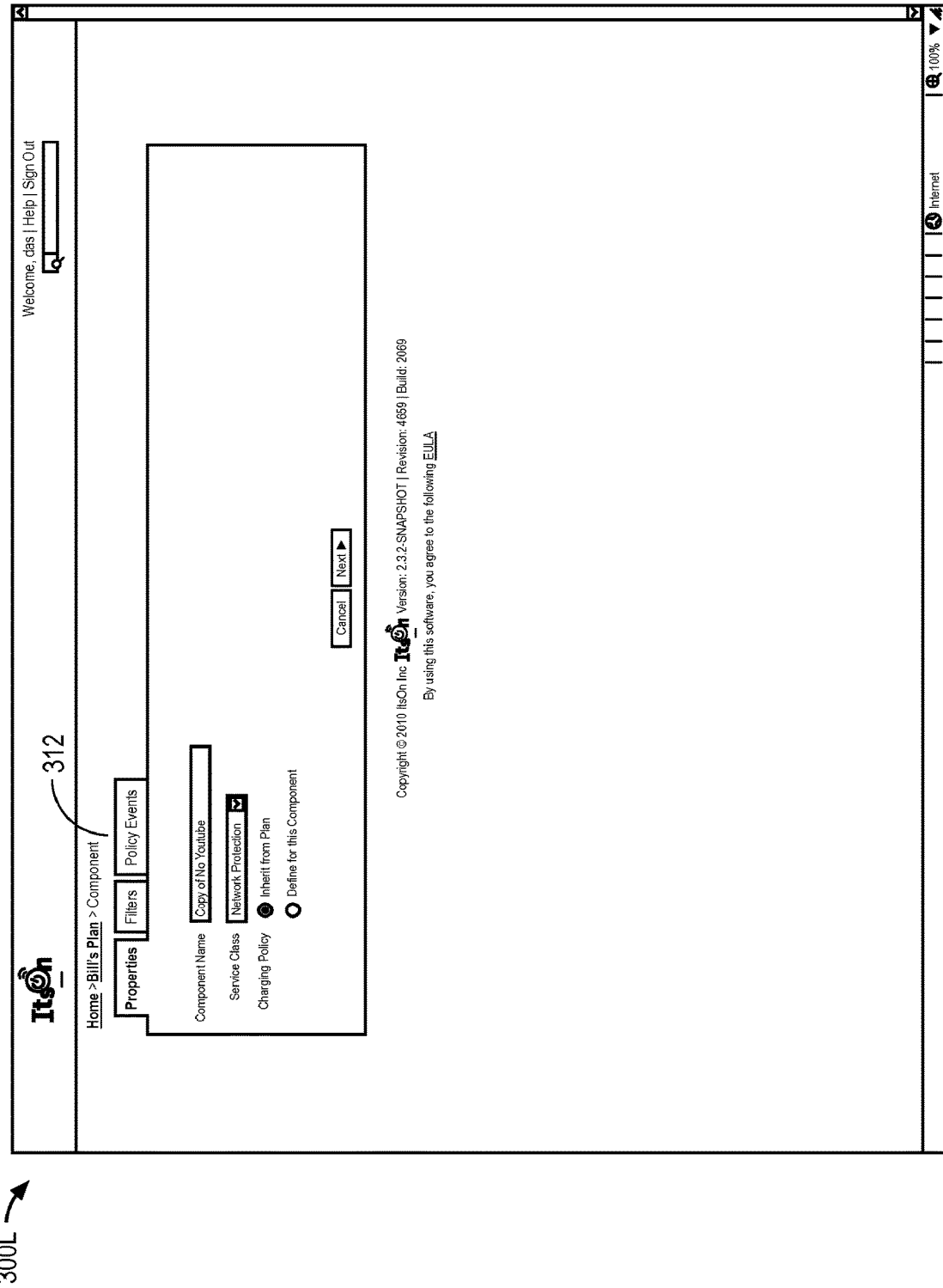

When the designer selects a component, such as the "Copy of No Youtube," a component screenshot 300L (FIG. 3L) is displayed, which includes a tab menu 312 that includes a properties tab, a filters tab, and a policy events tab. (The tab menu 312 can also include a charging policy tab if a charging policy is defined for the component.) Selecting the properties tab from the tab menu 312 enables the designer to edit the component name, service class (e.g., carrier, network protection, sponsored, specialized application, market interceptor, parental control, open access, and post-bulk), and whether the component has a charging policy explicitly defined or inherits the charging policy from the plan. It may be noted that the service class could be characterized to include an "end-of-life" service class for when a subscriber has no remaining service plan options, but in this specific implementation the end-of-life setting is not listed as a service class (described later).

Figure 3M:
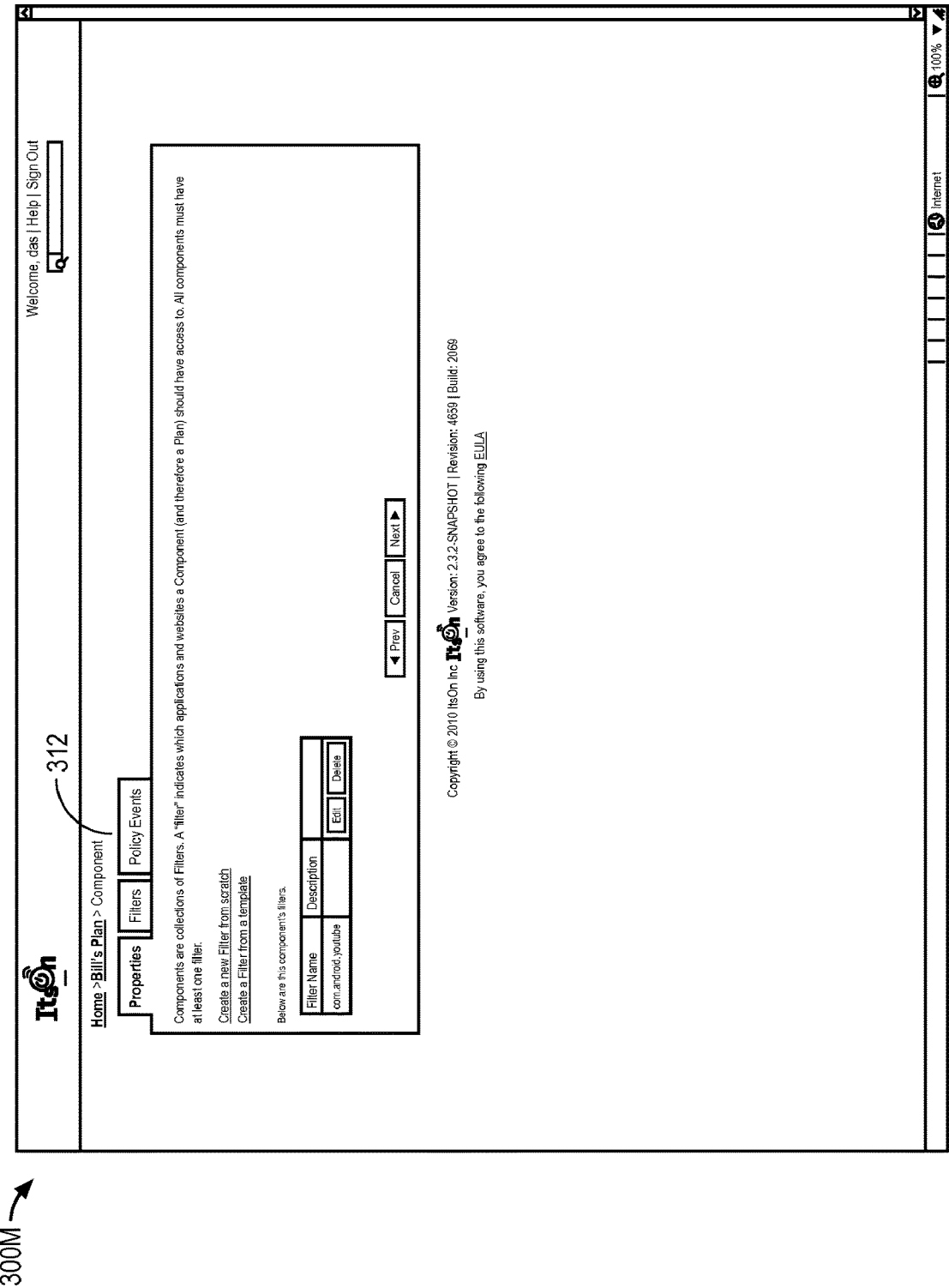
Figure 3N:
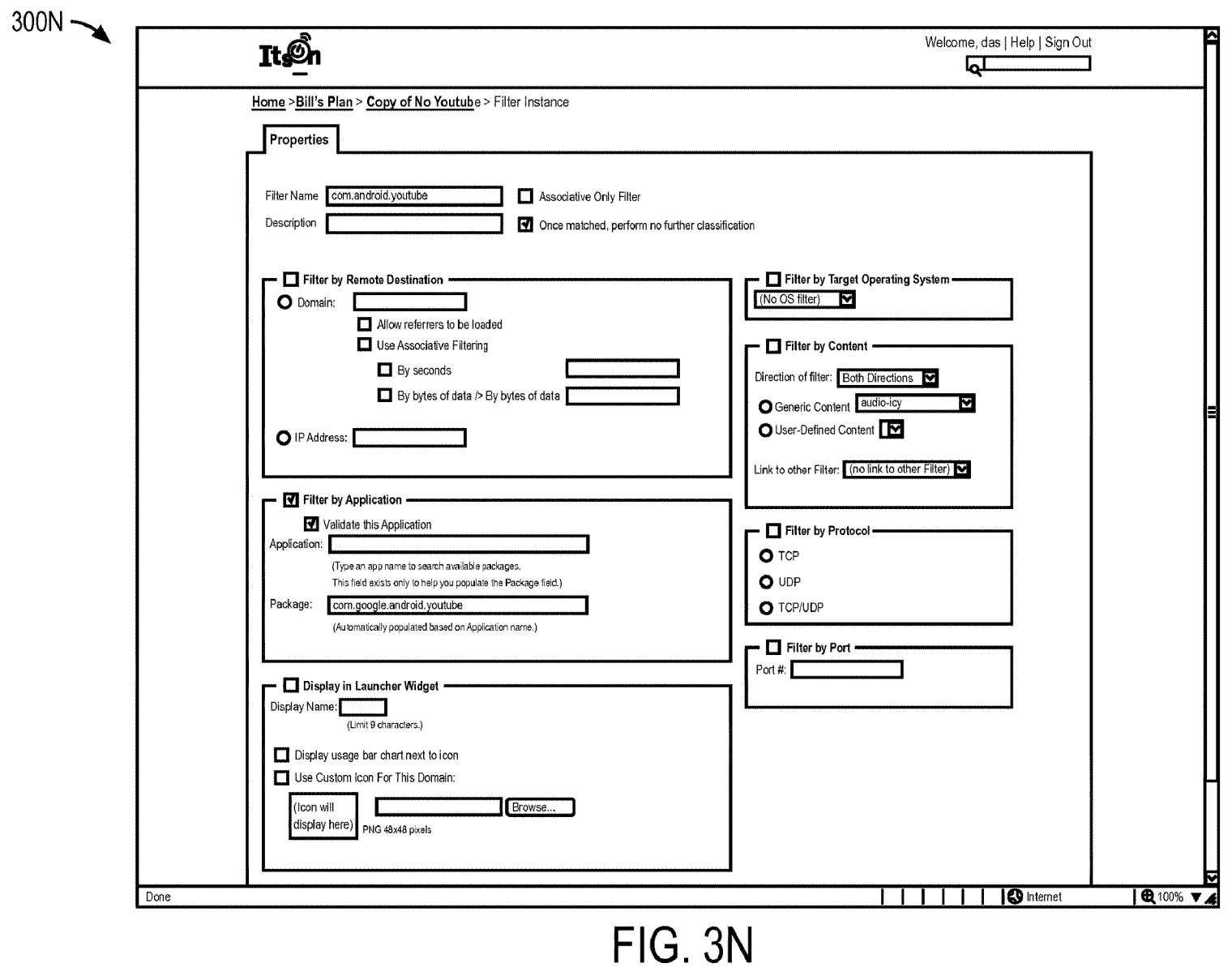
Figure 30:
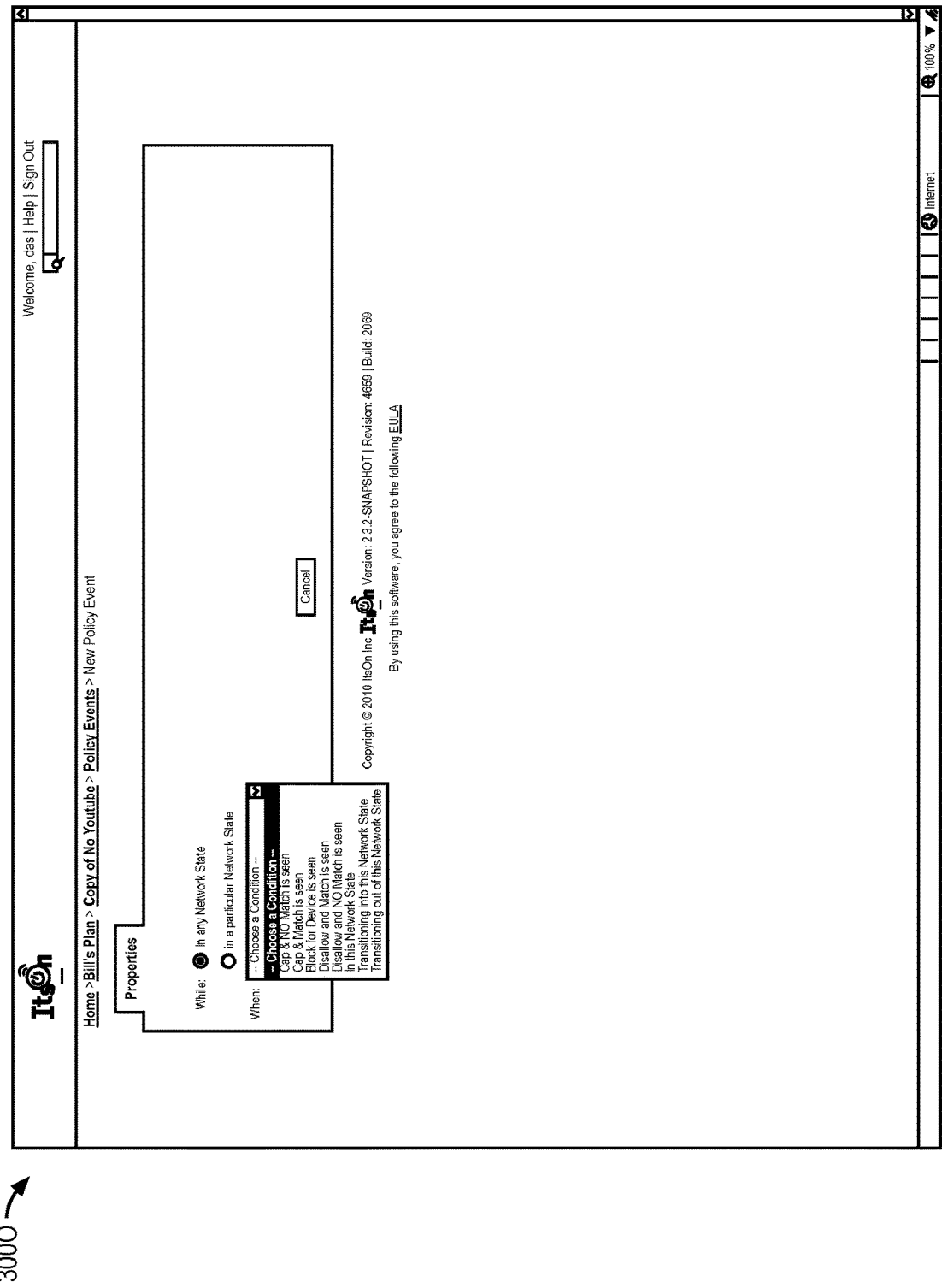

Selecting the filters tab from the tab menu 312 brings the designer to screenshot 300M (FIG. 3M), where filters can be chosen for a selected component (in this example, the "No Youtube" component). When the designer selects a filter to edit, the designer is brought to screenshot 300N (FIG. 3N), which facilitates editing of the filter name, description, whether the filter is associative only, whether the filter is "no-match," filtering parameters (e.g., filter by remote destination, filter by application, filter by target operating system, filter by content, filter by protocol, filter by port), and whether and how to display in a launcher widget.

Figure 3P:
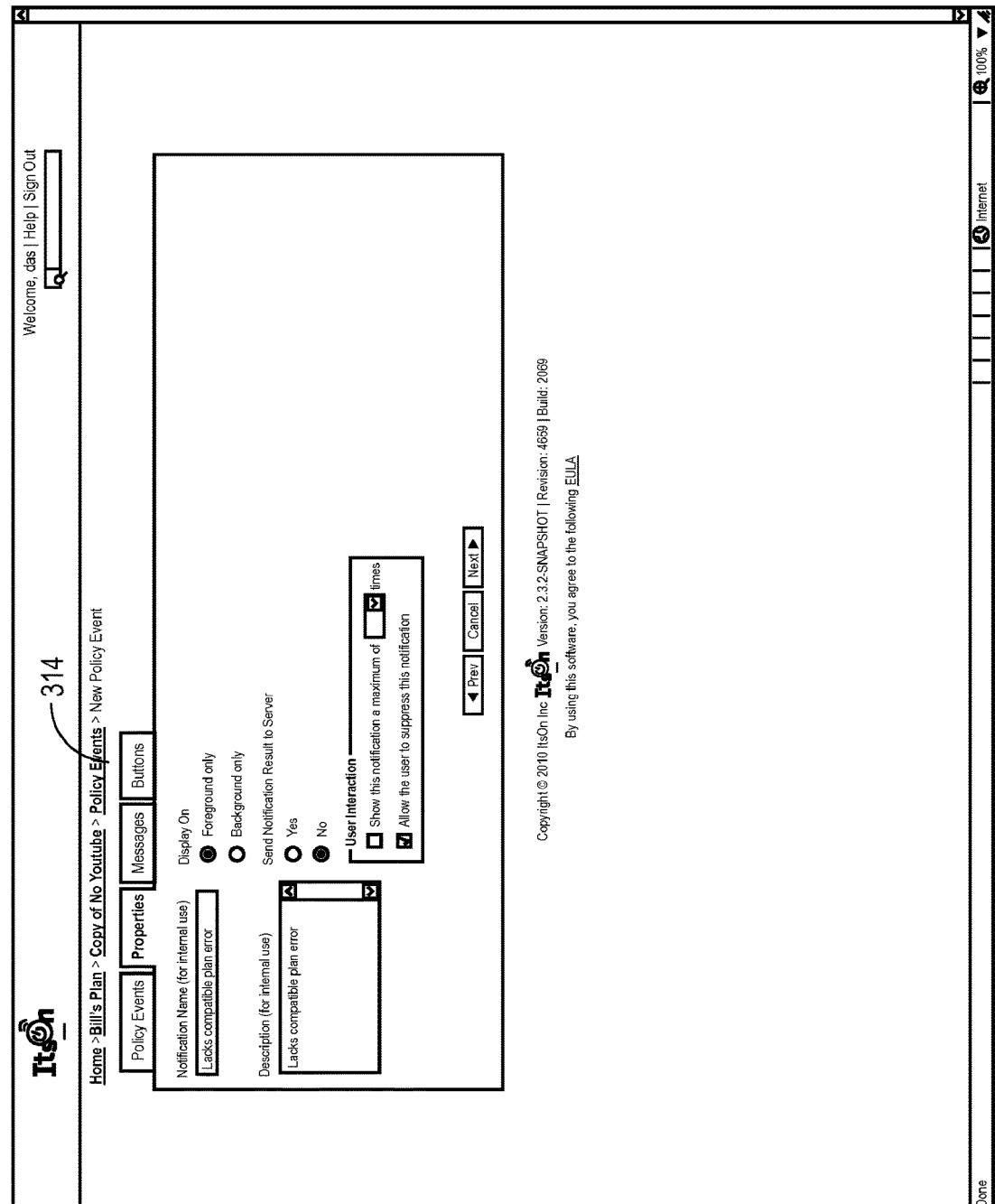

Selecting the policy events tab from the tab menu 312 and creating a new policy event brings the designer to screenshot 300O (FIG. 3O) where the designer can select policy events based upon network state when certain conditions (e.g., cap & no match, cap & match, block for a device, disallow and match, disallow and no match, in this network state, transitioning into this network state, and transitioning out of this network state) are met. Continuing to the next screenshot 300P (FIG. 3P), the designer enters event properties, such as the name of the policy event, a description, whether to display notifications associated with the event in foreground or background, whether to send notification results to service, maximum number of times to send the notification, and whether the user can suppress future notifications. Note that in this specific implementation, the number of tabs in the tab menu 314 increases as data is entered for the policy event until the tab menu 314 includes a policy event tab, a properties tab, a messages tab, and a buttons tab.

Figure 3Q:
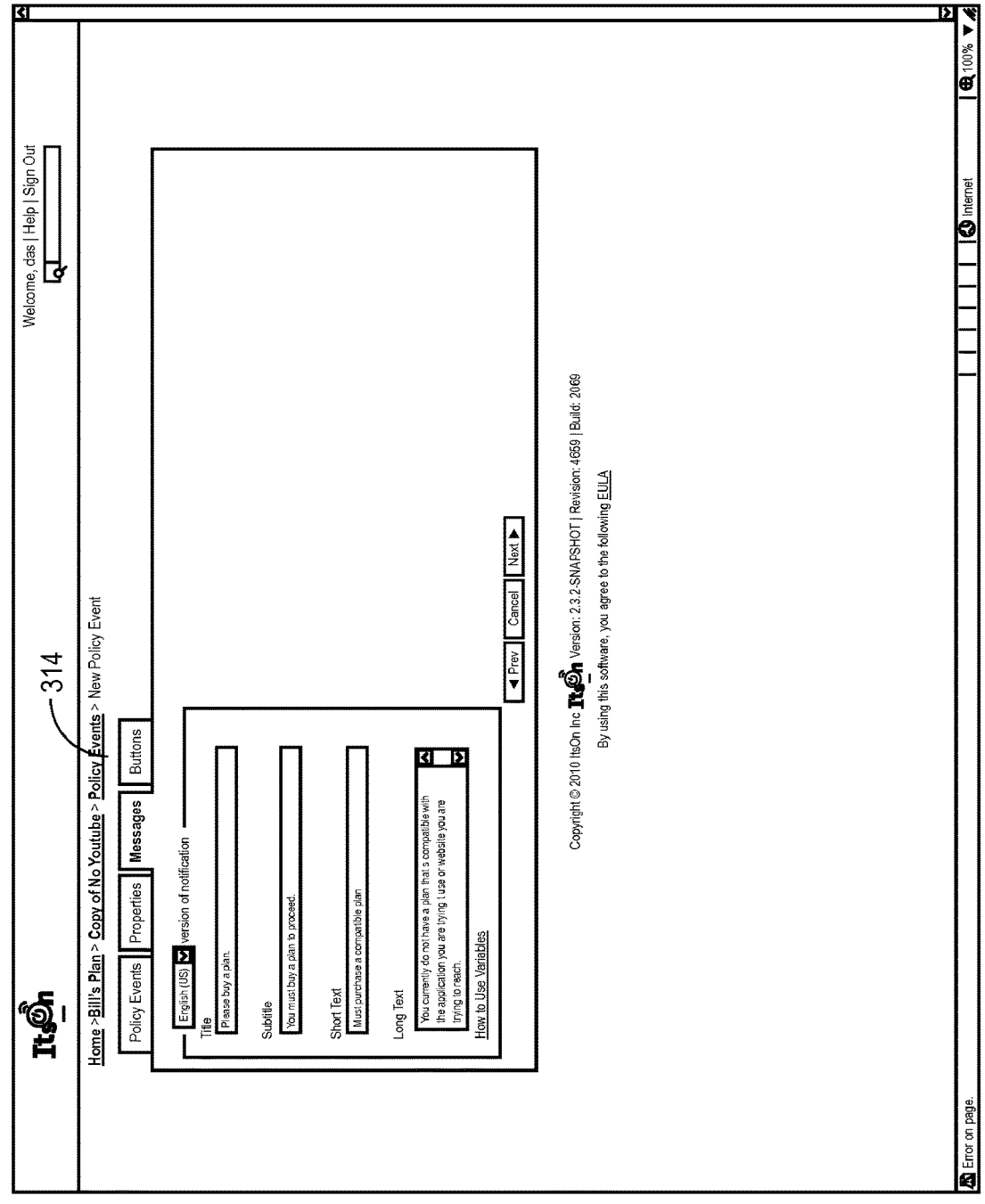

Continuing to the next screenshot 300Q (FIG. 3Q), the designer enters message details, such as title, subtitle, short text, and long text. Clicking on "how to use variables" instructs the designer regarding what variables can be added to notifications, such as name of service plan, charging code name, filter (e.g., blocked, throttled, etc.), percentage of plan utilization in bytes or time, application name, overage limit, current overage, throttle rate, date when cycle will refresh, duration of cycle, name of plan matched after current plan reached a cap, name of plan matched after disallow matched, current roaming state, current active network, or host or domain, to name several.

Figure 3R:
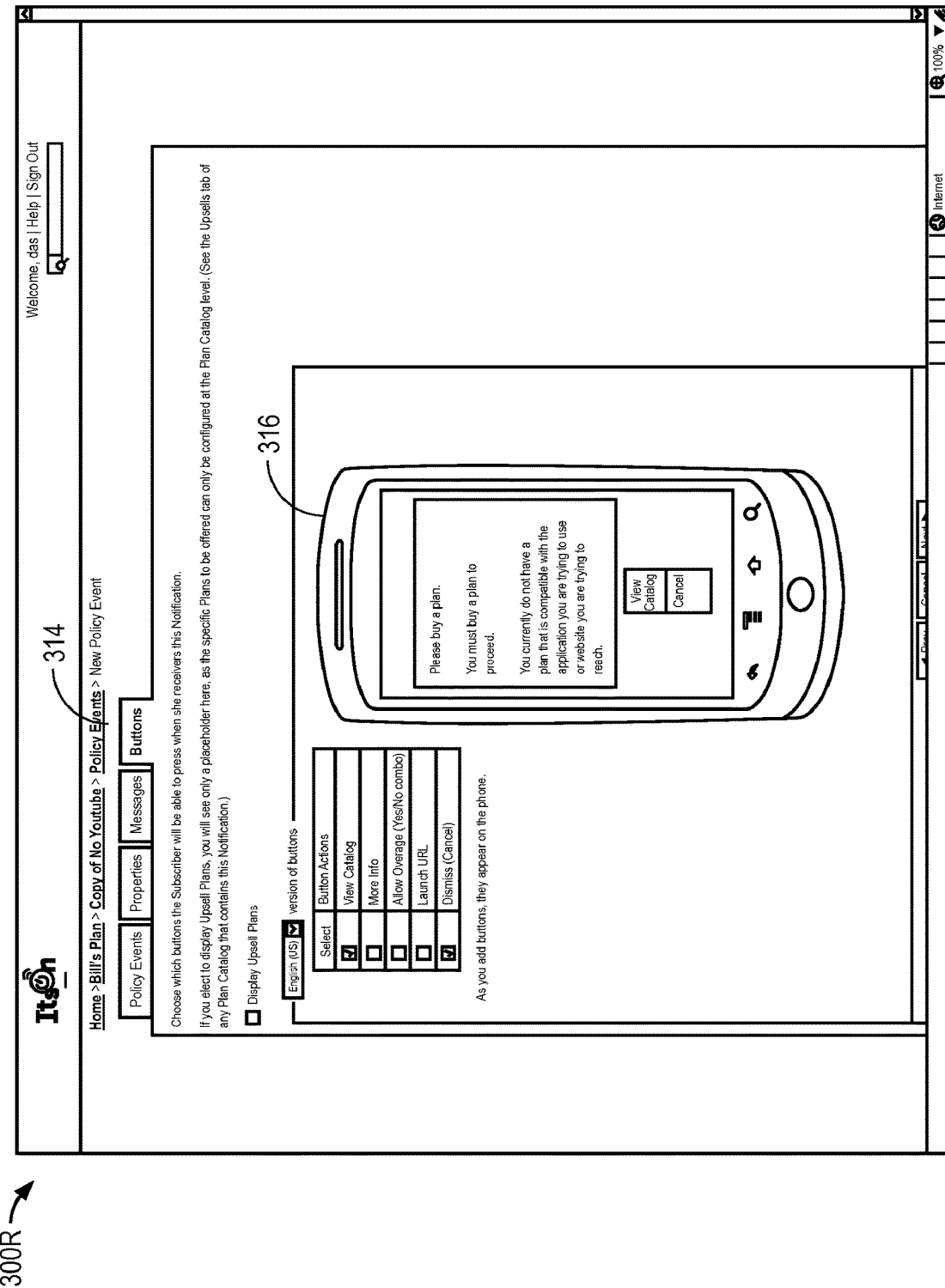

Continuing to the next screenshot 300R (FIG. 3R), the designer determines whether to display upsell plans and enters buttons to enable subscriber responses to the notification (in this example, the view catalog and cancel buttons are enabled). The phone image 316 is intended to illustrate how the message and buttons will appear within a device, though the image will not necessarily be a perfect representation.

Figure 3S:
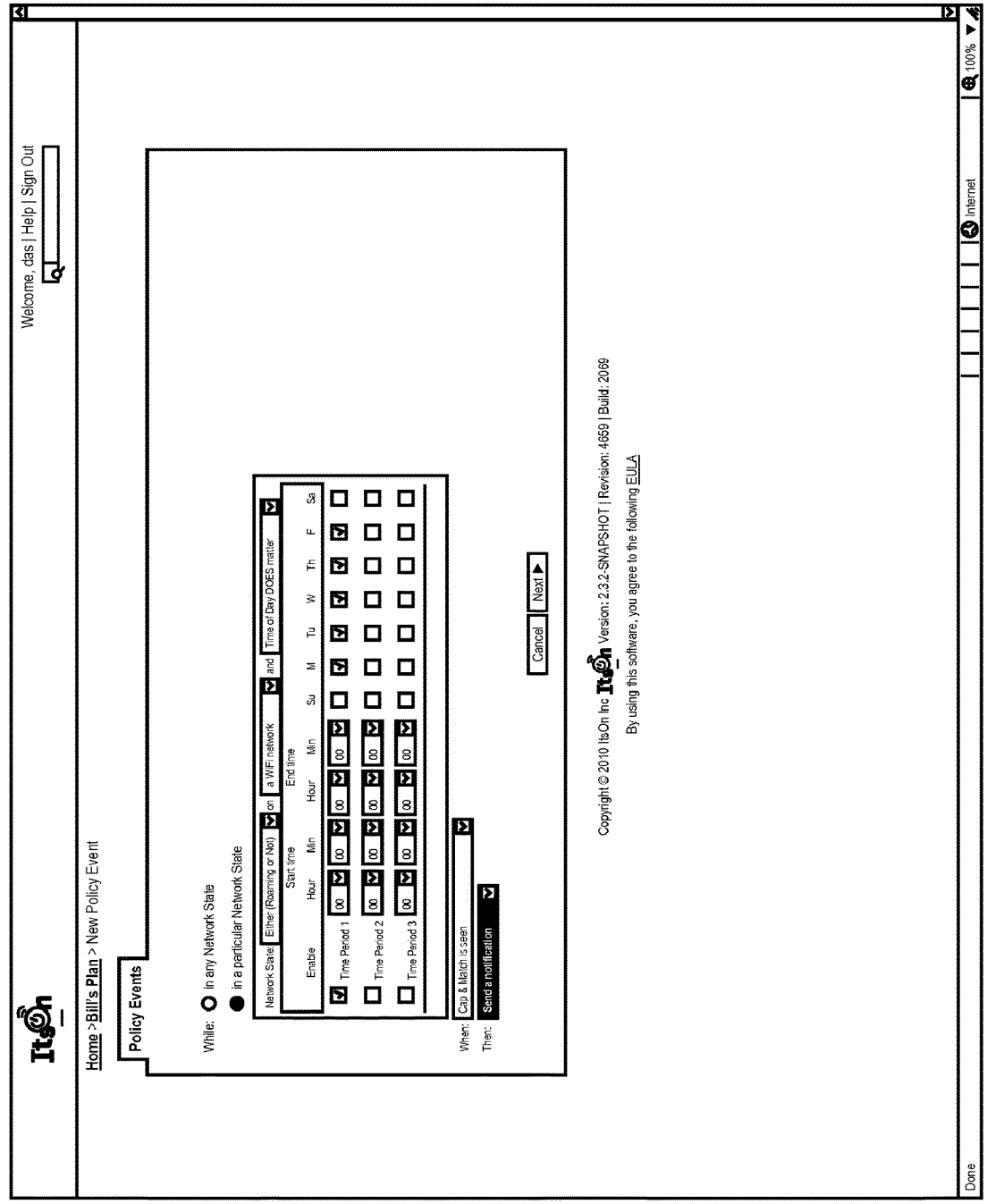

When returning to the plan level (see FIG. 3K), the designer can select the policy events tab from the tab menu 310 to display screenshot 300S (FIG. 3S) and enter policy events at the plan level. It may be noted that the policy events described with reference to the examples of FIGS. 3O to 3R were associated with an individual component. In the example of FIG. 3S, a policy event associated with the network state "on a WiFi network" and on a Monday through Friday causes a notification to be sent when a cap and match is seen. Other policy event parameters can be set in a manner similar to those described with reference to FIGS. 3P to 3R.

Figure 3T:

Upon completion of the plan described with reference to FIGS. 3I to 3S, the designer can select the review tab from the tab menu 310 (see, e.g., FIG. 3K) to display screenshot 300T (FIG. 3T). It may be noted that the review screen is "cut off," which prevents observation of policy events, but this is not necessary to understand the nature of the review screen. In this example, the plan, which is stored as a "draft" plan, can be published for beta testing (and submitted for approval).

Figure 3U:
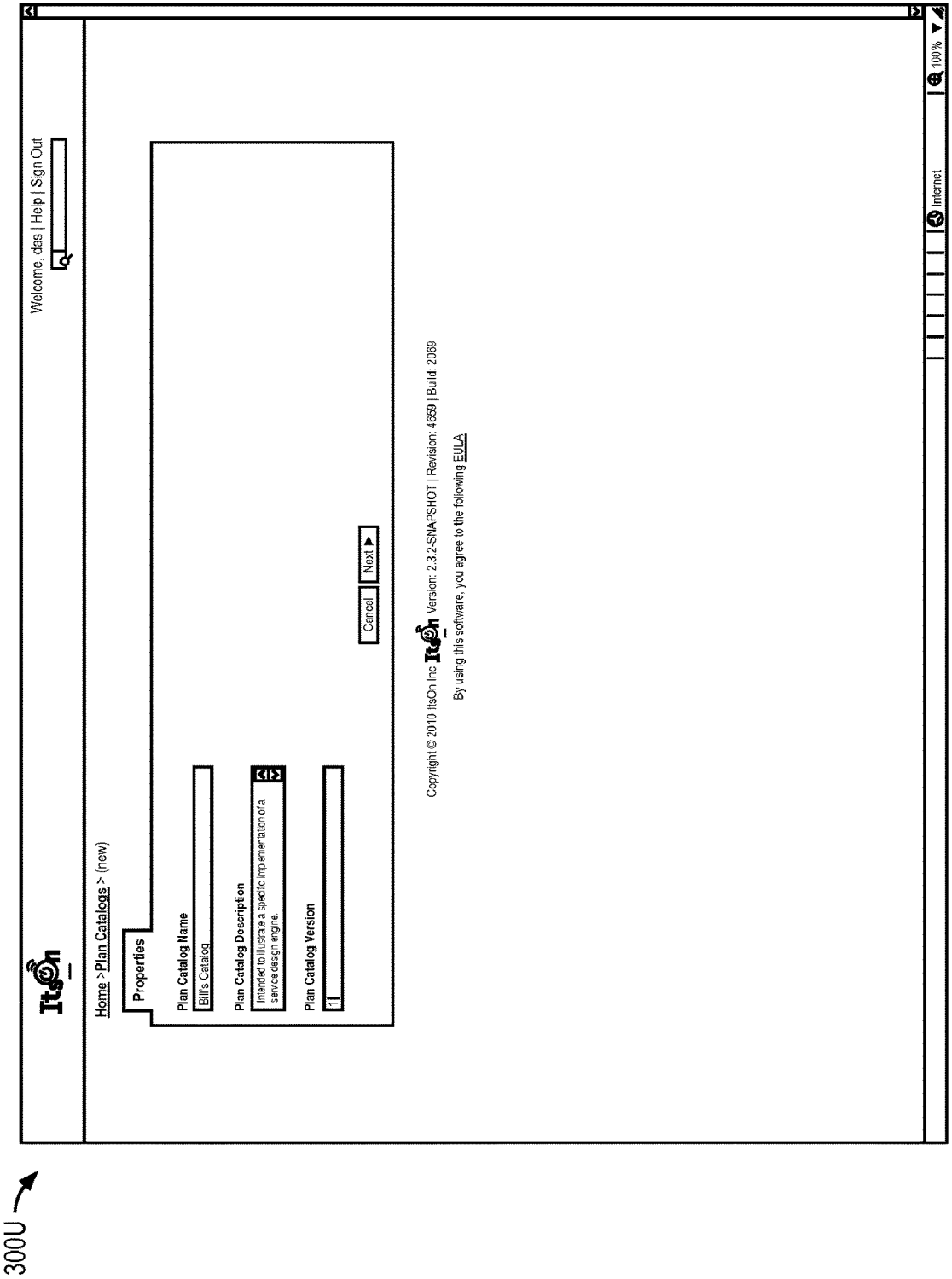
Figure 3V:
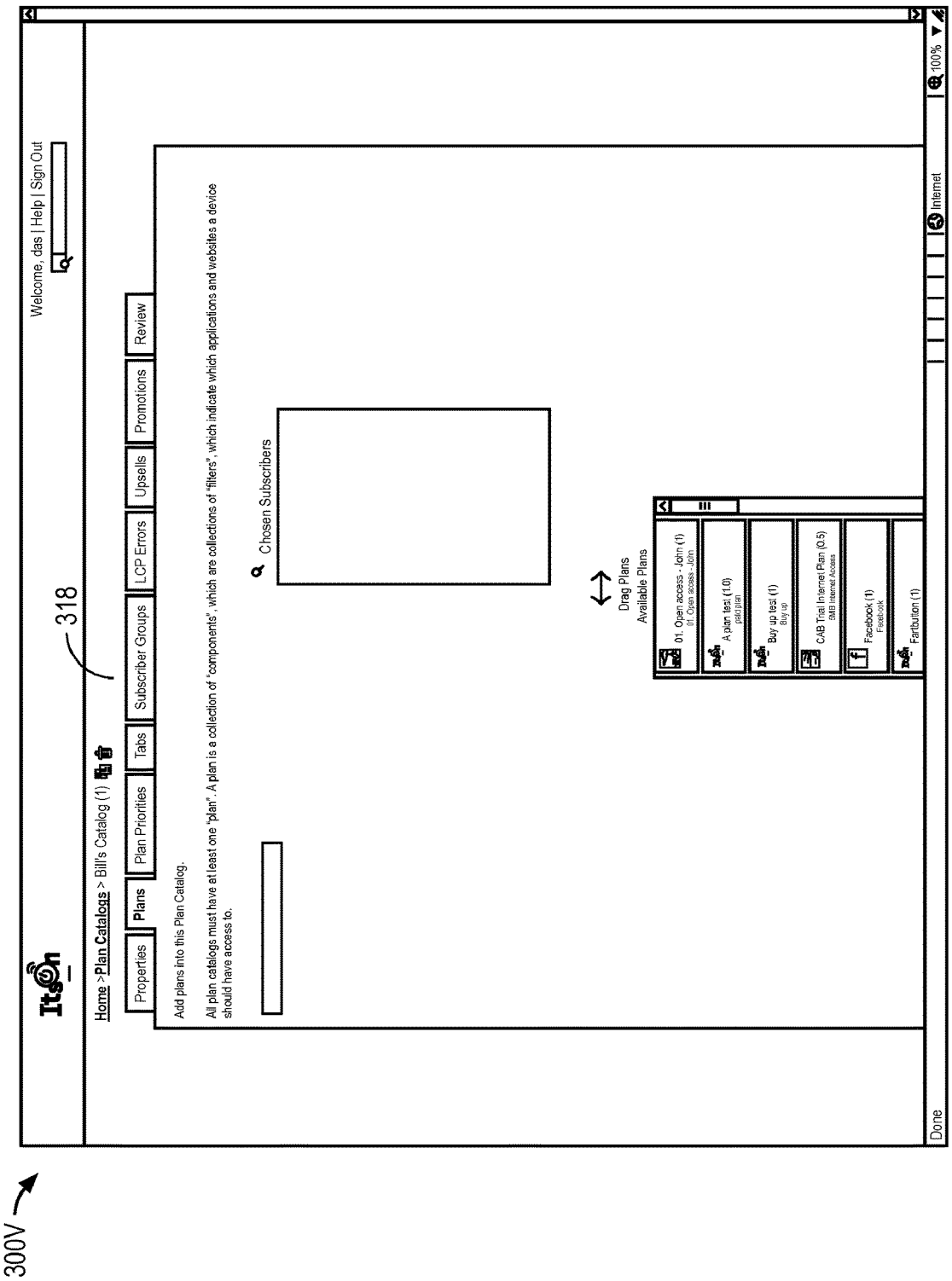

Referring back to the home page (see, e.g., FIG. 3A), selecting the plan catalogs button from the menu buttons field 306 brings a designer to screenshot 300U (FIG. 3U). There, the designer can enter a plan catalog name, a plan catalog description, and a plan catalog version (or select a plan catalog from plan catalogs in a plan catalogs datastore). When the designer clicks "next," the tab menu expands into a tab menu 318, which includes the properties tab, a plans tab, a plan priorities tab, a tabs tab, a subscriber groups tab, an LCP error tab, an upsells tab, a promotions tab, and a review tab, as is illustrated in the example of FIG. 3V. Under the plans tab, the designer can drag plans into a plan catalog.

Figure 3W:
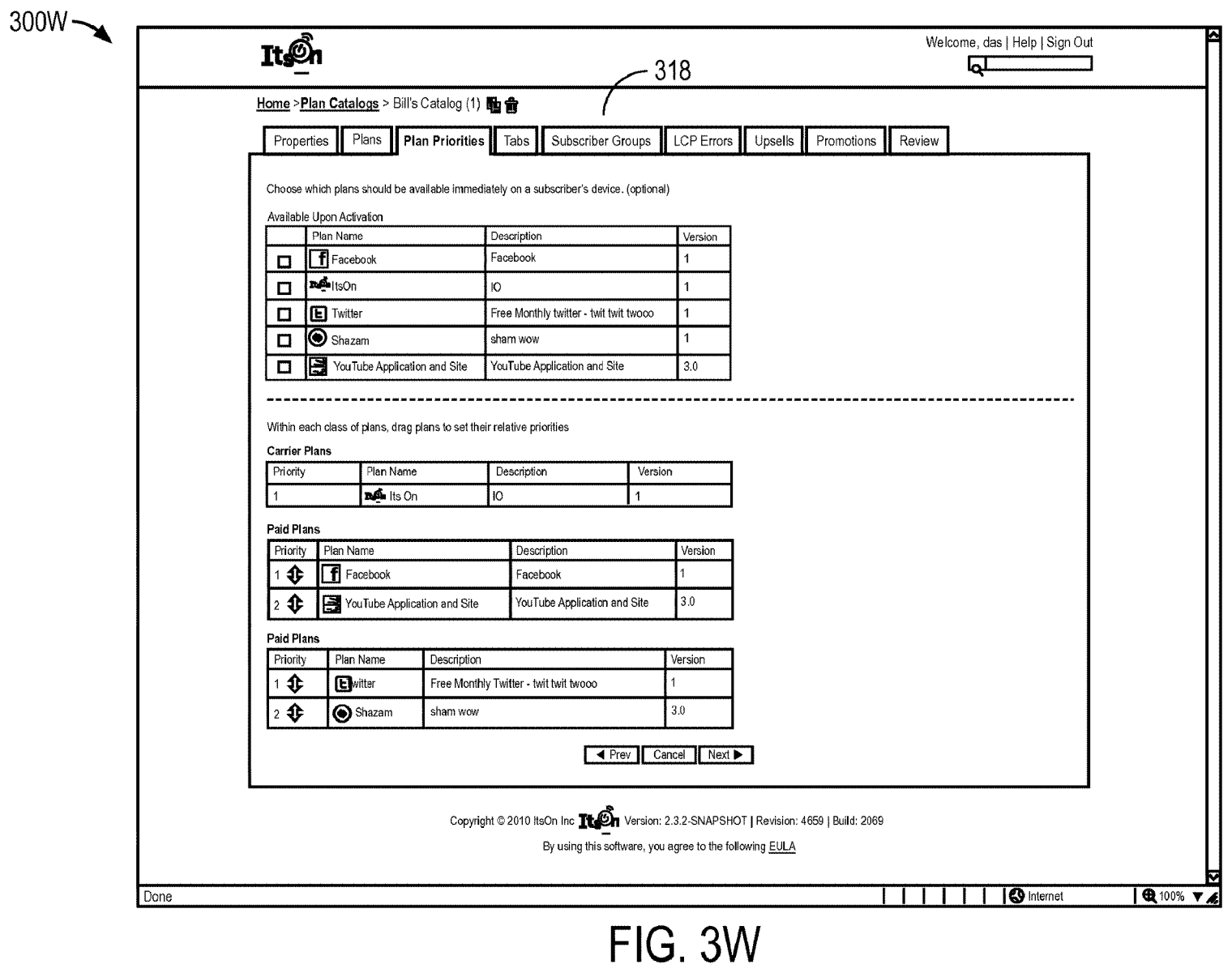

When the designer selects the plan priorities tab from the tab menu 318, the designer is brought to screenshot 300W (FIG. 3W), where the plans of the plan catalog can be prioritized. The plans are prioritized per plan type (e.g., carrier plan, paid plan), and if there are multiple plans within a plan type, the plans can be prioritized within the plan types, as well. Some or all of the plans can also be designated as available upon activation. With versioning, subscribers having a previous plan version can continue to use the previous version, while new subscribers can be offered the most recent version. If an old plan expires, a subscriber can be offered the most recent version, as well.

Figure 3X:
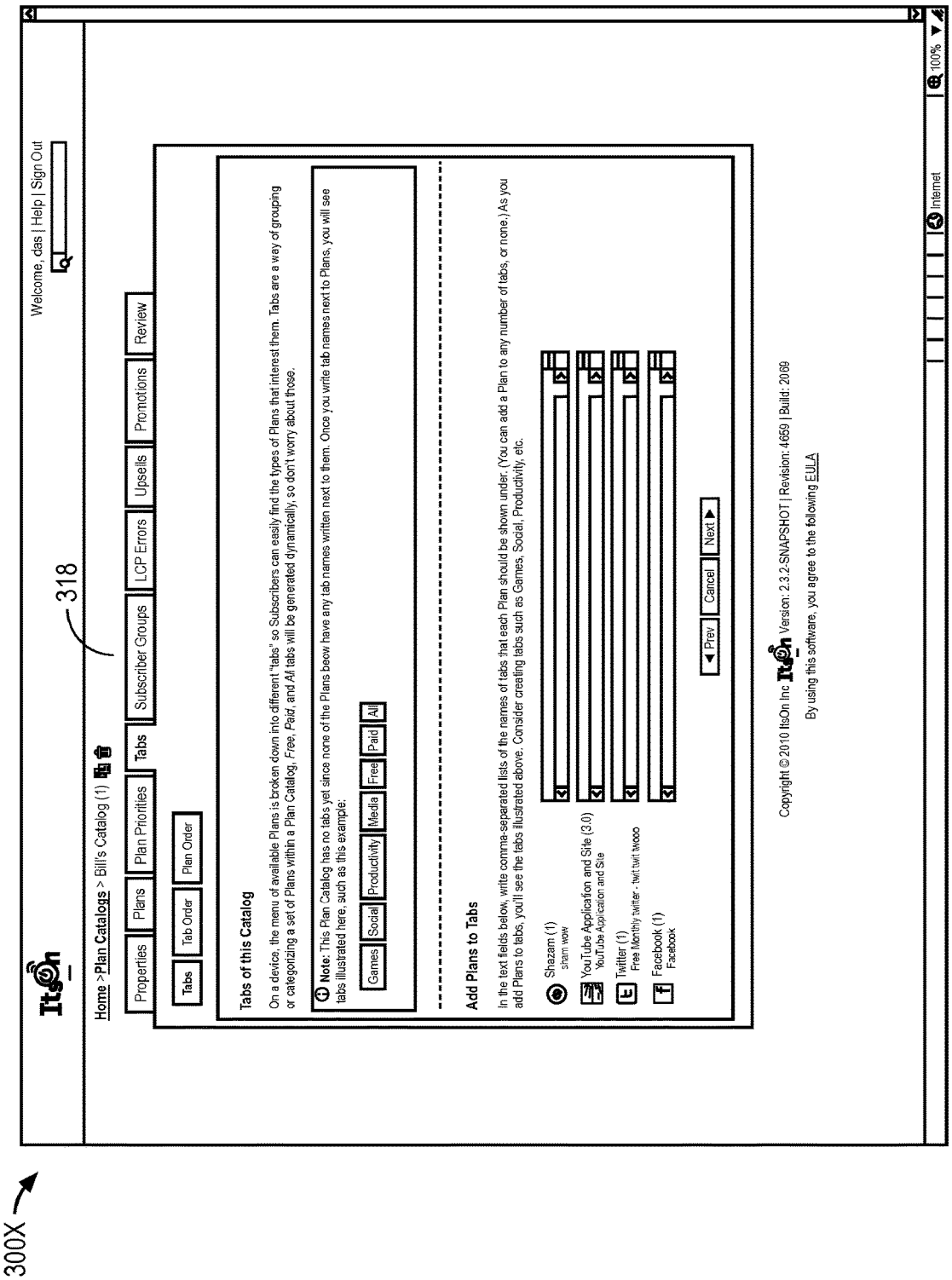

When the designer selects the tabs tab from the tab menu 318, the designer is brought to screenshot 300X (FIG. 3X), where the designer can organize tabs for display of plans. A subscriber's device can display, for example, one or more tabs such as games, social, productivity, media, free, paid, and all, and under the tabs the various plans can be listed in an order that is determinable by the designer.

Figure 3Y:
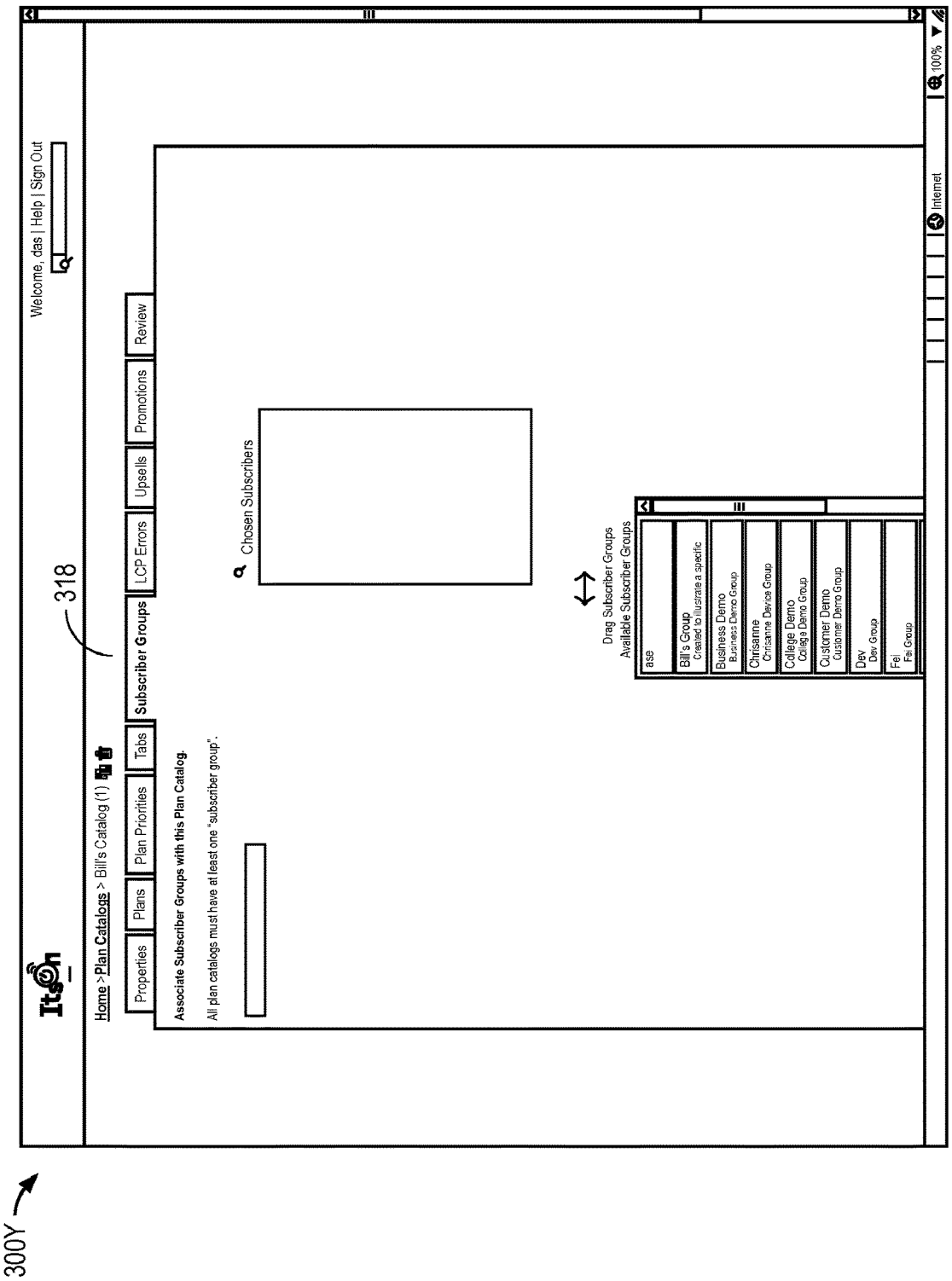

When the designer selects the subscriber groups tab from the tab menu 318, the designer is brought to screenshot 300Y (FIG. 3Y), where the designer can drag and drop subscriber groups.

A Lacks Compatible Plan (LCP) error occurs when a traffic event is received for which there is no active service plan. LCP errors can be treated as a particular kind of policy event. As when designating the parameters of policy events, when the designer selects the LCP errors tab from the menu 318, the designer has options similar to those described above with reference to FIGS. 3P to 3R. That is, the designer can choose applicable end-of-life properties, messages, and buttons.

Upsells occur when offered from a component, plan, or plan catalog, and can be responsive to traffic events (e.g., an upsell for cheaper network service when using Facebook applications can occur when a subscriber consumes more expensive network services to use Facebook applications) or other events. When the designer selects the upsells tab from the menu 318, the designer can edit upsell opportunities offered from, e.g., notifications within a plan catalog or any of its plans or components. Upsells can be edited much like policy events (e.g., properties, messages, and buttons).

Figure 3Z:
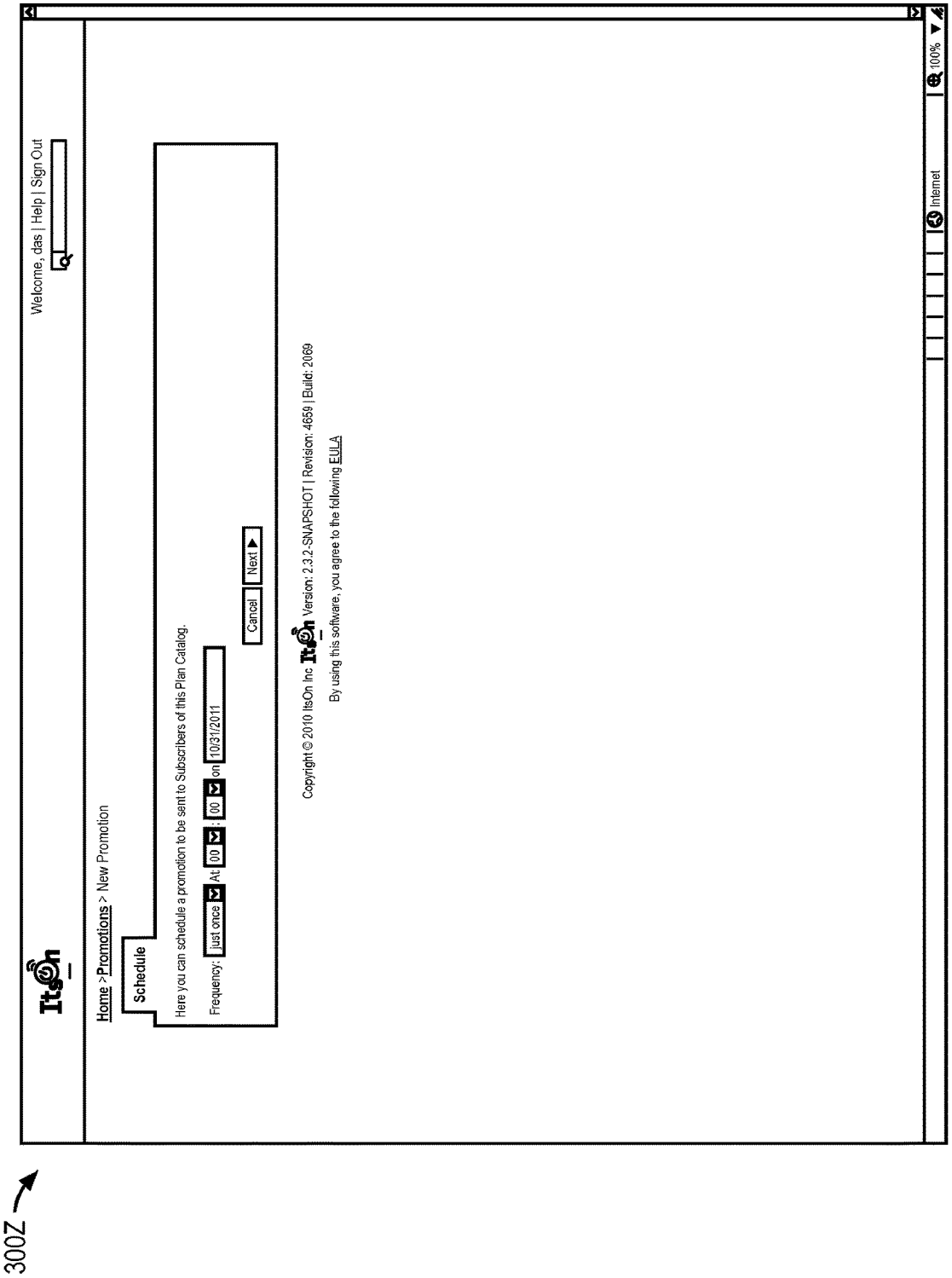
Figure 3A:
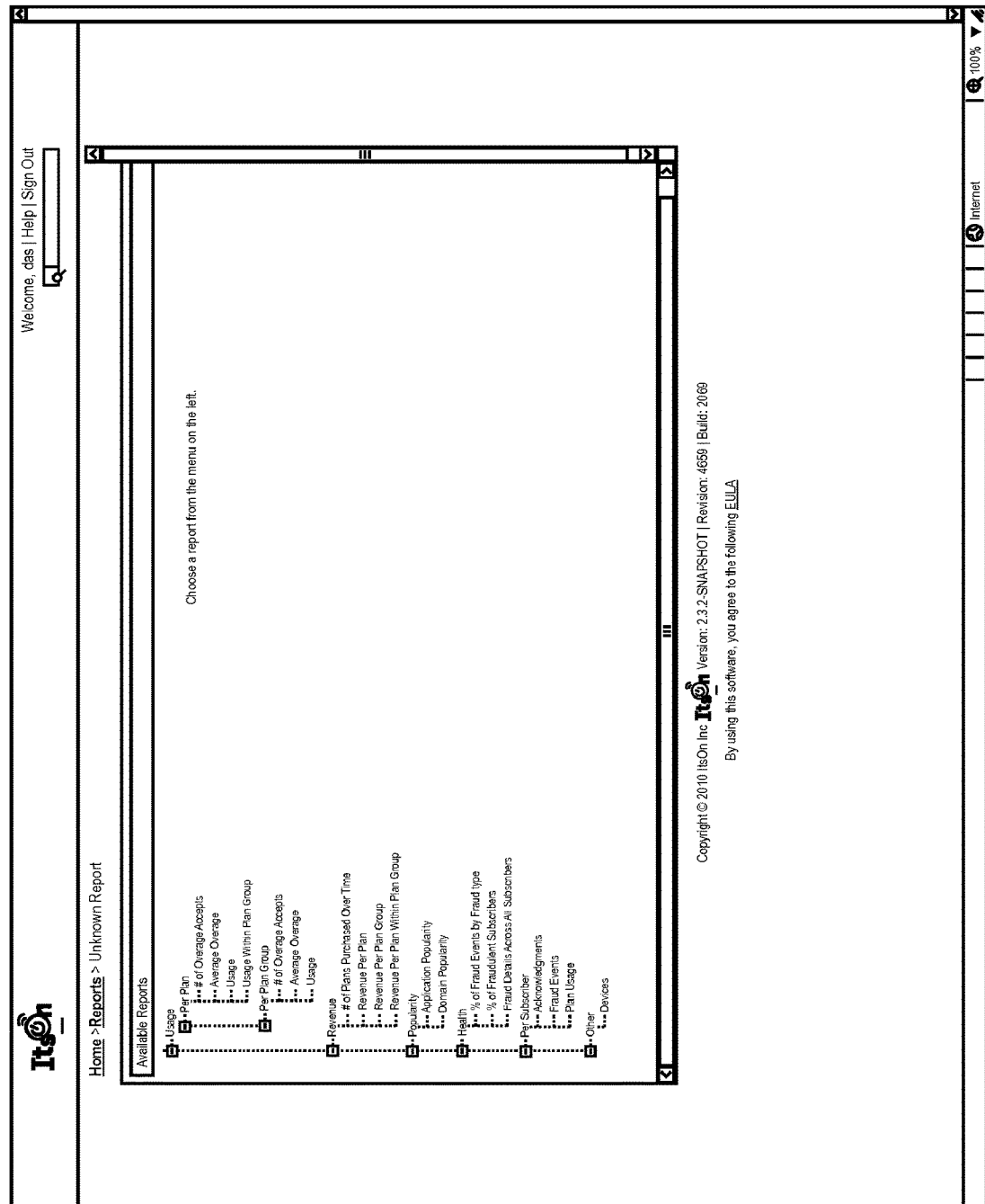

Promotions can be offered once or periodically. When the designer selects the promotions tab from the menu 318, the designer can edit a frequency of a promotion in screenshot 300Z (FIG. 3Z). Promotions can be edited much like policy events (e.g., properties, messages, and buttons).

When the designer selects the review tab from the menu 318, the designer can review the plan catalog as is illustrated in screenshot 300AA (FIG. 3AA).

Referring back to the home page (see, e.g., FIG. 3A), selecting the templates button from the menu buttons field 306 enables a designer to work on filter templates. Because components can have versions, it can be desirable to create templated filters that, when placed in a component, automatically create a copy of the templated filter. That way, when the filter is changed for one version, it is not changed for another. It is also possible to simply reuse a filter in components, in which case if the filter is changed, it is changed for all of the components into which it was reused.

Selecting the reports button from the menu buttons field 306 enables a designer to review reports. FIG. 3AB depicts a screenshot 300AB with reports that are broken into several categories including, usage, revenue, popularity, health (fraud), per subscriber, and other. Reports are generated using information that is available from datastores of the service design system, which can include data in notifications from subscriber devices or, more generally, access networks.

Figure 4:
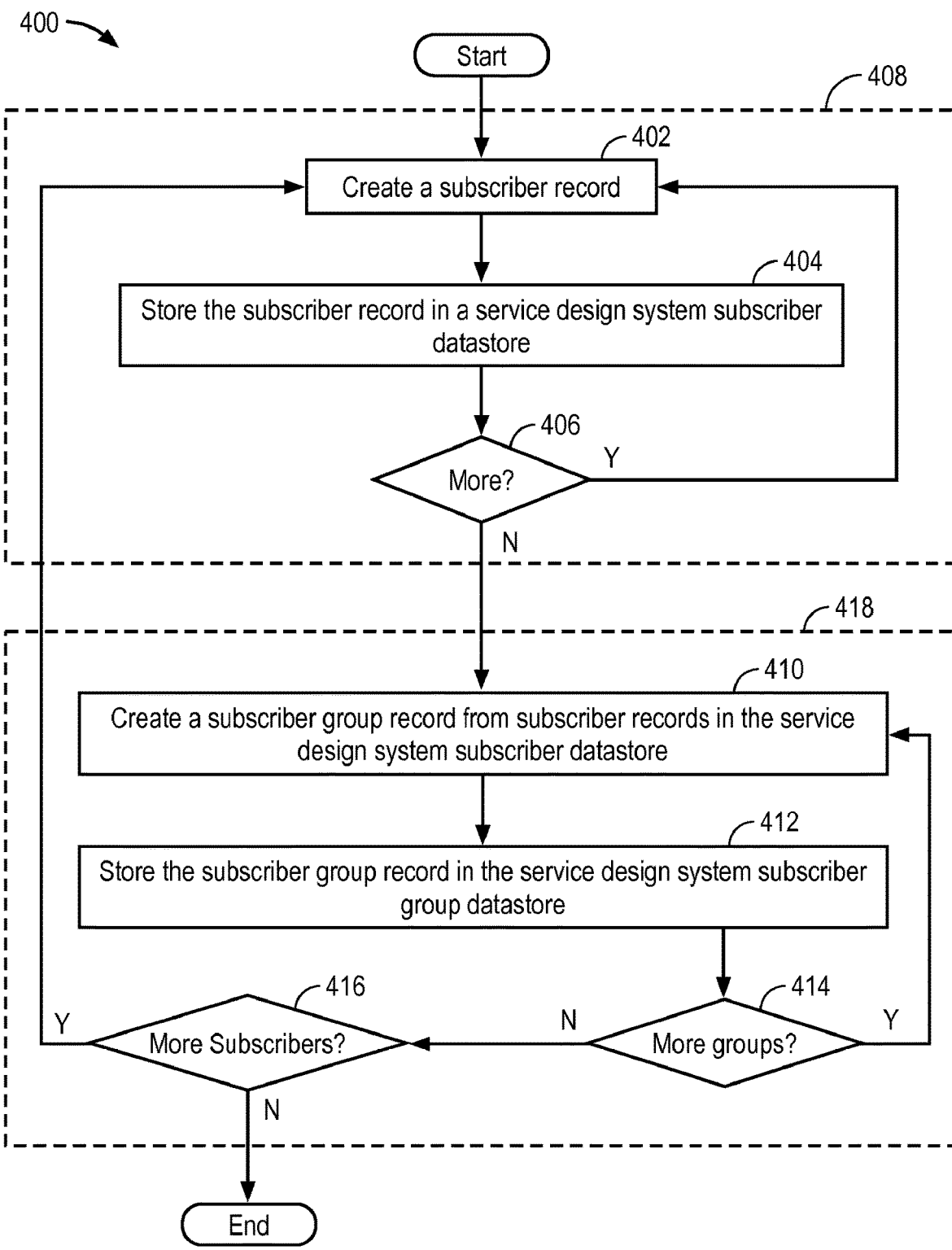
FIG. 4 depicts a flowchart of an example of a method for creating subscriber groups.

FIG. 4 depicts a flowchart 400 of an example of a method for creating subscriber groups. This flowchart and other flowcharts are depicted in the figures of this paper as serially arranged modules. However, modules of the flowcharts may be reordered or arranged for parallel execution as appropriate.

In the example of FIG. 4, the flowchart 400 starts at module 402 with creating a subscriber record. The term "record" as used in this paper can refer to a data structure of any applicable format saved in a data store. A subscriber record can include such information as device name, owner name, EID (e.g., IMSI or Country Code+Operator Code+MIN), device type, subscriber group, locale, phone number (e.g., MSISDN or MDN), operating system version, CDMA subscriber details (e.g., Device ID/MEID and/or MSID), and GSM/LTE subscriber details (e.g., IMSI and/or IMEI). Generally, more information will enable designers to group subscribers together in different ways (e.g., by demographic information), which can result in improved accept rates for targeted notifications.

In the example of FIG. 4, the flowchart 400 continues to module 404 with storing the subscriber record in a service design system subscriber datastore. Datastore is a general term that can be applied to almost any data storage receptacle. For the purpose of this example, however, a specific format is expected. It is possible, and even likely, that the service design system subscriber datastore (and the service design system subscriber group datastore, mentioned later) will have an implementation- and/or configuration-specific, though not necessarily proprietary, format. The subscriber record is expected to have such a format appropriate for storage in the expected format of the service design system subscriber datastore. In the event subscriber data is received in the service design system in a format other than the expected format, the subscriber record is created (402) in the expected format and populated with some or all of the received subscriber data, and potentially with additional data that is obtained by the service design system (e.g., from a datastore or through an admin or other input process).

In the example of FIG. 4, the flowchart 400 continues to decision point 406 where it is determined whether there is additional subscriber records to be created. If it is determined that there is additional subscriber records to be created (406—Y), then the flowchart 400 returns to module 402 and continues as described previously for the next subscriber record. A "while loop" 408 comprising the modules 402 and 404 and decision point 406 is encompassed in the example of FIG. 4 with a dotted box. The while loop 408 can be executed in batch-mode by importing subscriber data from a data source. The format of the subscriber data can be restricted to the format of the service design system subscriber datastore or formats that a service design engine is capable of converting into the appropriate format. Alternatively or in addition, the while loop 408 can be executed through an input process one subscriber at a time, either when receiving data from a potential or current subscriber, or from an artificial or human agent of the service design system.

If, on the other hand, it is determined that there are no additional subscriber records to be created (406—N), then the flowchart 400 continues to module 410 with creating a subscriber group record from subscriber records in the service design system subscriber datastore. A subscriber group record may or may not have a substantial amount of metadata. For example, a subscriber group record can be assigned a name and description to make it easier to use the subscriber group record when creating service plans for subscriber groups. An alternative field of the subscriber group record is common subscriber data, though this could also be considered part of the description.

In the example of FIG. 4, the flowchart 400 continues to module 412 with storing the subscriber group record in the service design system subscriber group datastore. The issues related to format of subscriber group records are similar to those described previously with reference to module 404.

In the example of FIG. 4, the flowchart 400 continues to decision point 414 where it is determined whether there is additional subscriber group records to be created. If it is determined that there is additional subscriber group records to be created (414—Y), then the flowchart 400 returns to module 410 and continues as described previously for the next subscriber group record. A "while loop" 418 comprising the modules 410 and 412 and decision points 414 and 416 is encompassed in the example of FIG. 4 with a dotted box. The while loop 416 can be executed in batch-mode by importing subscriber records from the subscribers datastore. Alternatively or in addition, the while loop 418 can be executed through an input process one subscriber at a time, either when receiving data from a potential or current subscriber, or from an artificial or human agent of the service design system. For example, an admin could drag and drop available subscribers into a subscriber group, and the service design engine can create a subscriber group record from available subscribers that were added to the subscriber group in this way.

In a specific implementation, a batch of subscriber data can be imported into the service design system and used to populate a subscriber group. It may be noted that the logical flow in the flowchart 400 is to create subscriber records (412) and store the subscriber records (404) repeatedly (406) and then create a subscriber group (410) from subscriber records in the service design system subscriber datastore. However, it is not necessary for the import procedure to create each subscriber record before creating the subscriber group.

In a specific implementation, when a subscriber record with a characteristic that identifies the subscriber record as part of an existing subscriber group record is created and stored in the service design system subscriber datastore, that subscriber may or may not automatically be added to the existing subscriber group record (or an update procedure could add any subscriber records having the relevant characteristics that were not previously added to the subscriber group record when initiated by a subscriber or agent of the service design system).

Referring once again to decision point 414, if it is determined that there are no additional subscriber group records to be created (414—N), then the flowchart 400 continues to decision point 416 where it is determined whether there are additional subscriber records to be created. If it is determined that additional subscriber records are to be created (416—Y), then the flowchart 400 returns to module 402 and continues as described previously. If, on the other hand, it is determined that no additional subscriber records are to be created (416—N), then the flowchart ends. It may be noted that in a typical implementation, the method could be restarted at module 402 or module 410 if there is an other subscriber record or another subscriber group record to be created. Therefore, the end is a logical end to the flowchart 400, but the process can continue as needed.

Figure 5:
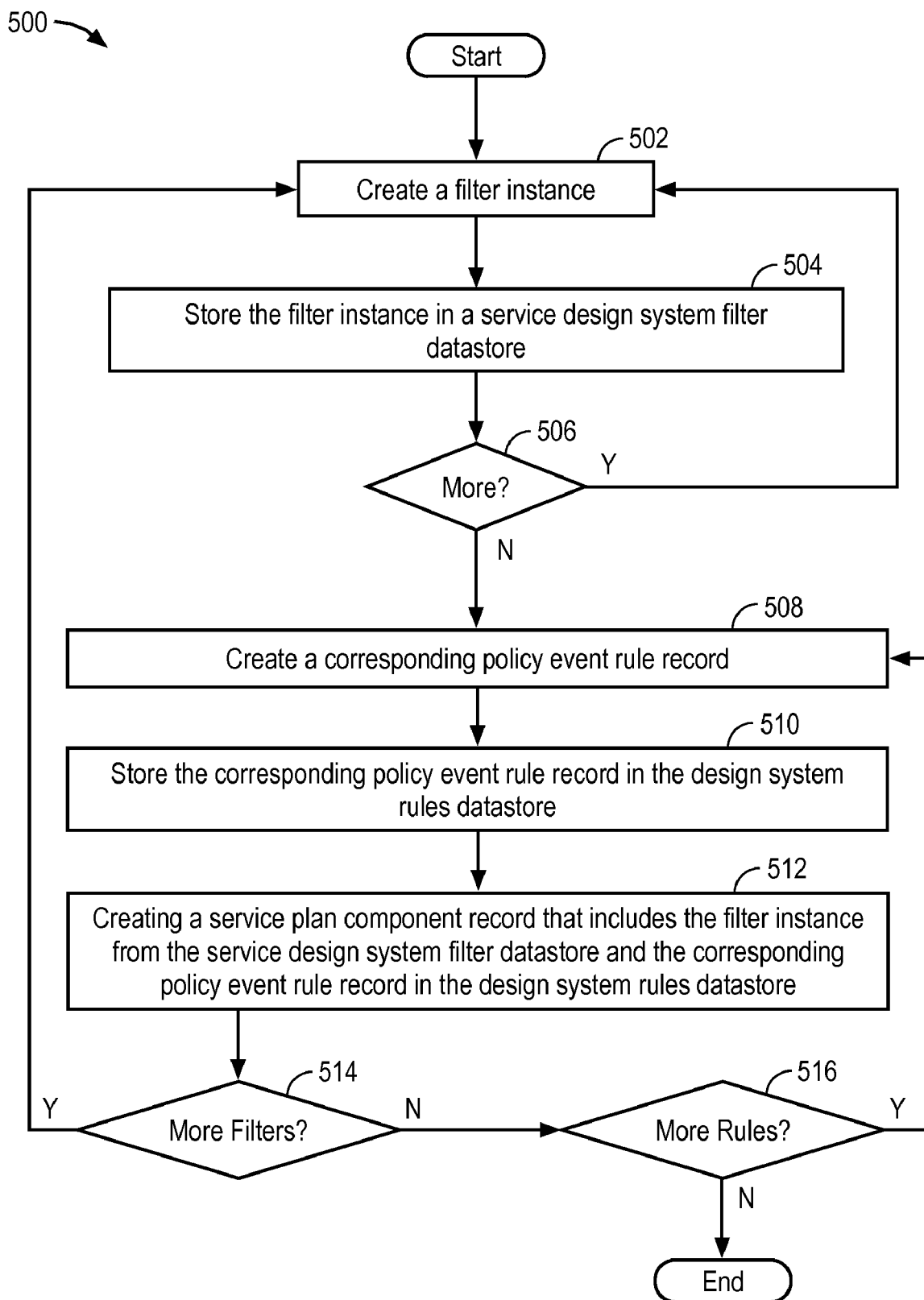
FIG. 5 depicts a flowchart of an example of a method for creating service plan components.

FIG. 5 depicts a flowchart of an example of a method for creating service plan components. In the example of FIG. 5, the flowchart 500 starts at module 502 with creating a filter instance. A filter record is created by this action, but the term "instance" is used because of the way in which a filter is used in the system. Specifically, a filter can have global characteristics in the sense that if two service plan components incorporate the filter instance and the filter instance is later changed, the changes are applied to both of the service plan components. Thus, there is a single filter instance that is used in multiple components. Alternatively, a filter instance can be created from a template in the sense that if two service plan components incorporate the filter instance and a change is made to one of the filter instances, the changes are not applied to the other filter instance. Thus, each application of the filter template is a separate filter instance. In a specific implementation, filter instances can be explicitly set to be either global or local. It is also possible to create a global filter template (such that changes to the global filter template are applied to all instances of the filter) as well as local filter instances that can be changed within service plan components without the changes cascading through they system.

In the example of FIG. 5, the flowchart 500 continues to module 504 with storing the filter instance in a service design system filter datastore. The service design system filter datastore may have explicit data structure requirements for the filter instance, but will at least include a traffic instance that matches the filter. In a specific implementation, the traffic instances can include traffic events that include a specified remote destination (e.g., a domain or IP address), a specified application (identified by, e.g., name, hash, certificate, signature, other secure ID, etc.), a specified operating system, specified content, a specified protocol (e.g., TCP, UDP, TCP/UDP), or a specified port number. Domain filters can be specified to allow references to be loaded and/or to use associative filtering (e.g., by seconds or by bytes of data). Application filters can be specified to validate applications. Each filter instance stored in the service design system filter datastore can include a filter name and description to make use of the filter easier for human agents.

In a specific implementation, filter instances can be specified to be match or no match filters. A "match" filter does not prevent attempts to match a traffic event to another filter. A "no match" filter prevents a network traffic inspection engine from attempting to match a traffic event to another filter. In a sense, this applies an action to a filter, and the match and no match aspect of a filter can be treated as a filter aspect or an associated action aspect, whichever is more applicable in a given context.

In the example of FIG. 5, the flowchart 500 continues to decision point 506 where it is determined whether there are more filter instances to create. If it is determined that there are more filter instances to create (506—Y) then the flowchart 500 returns to module 502 and continues as described previously for a next filter instance.

If, on the other hand, it is determined that there are no additional filter events to be created (506—N), then the flowchart 500 continues to module 508 with creating a corresponding policy event rule record. The policy event rule enables a service plan component to determine what network state (including any network state) is applicable to a policy event. It may be noted that in a specific implementation, the rules can be created without a corresponding filter (e.g., as a stand-alone rule). The policy event rule becomes applicable when a filter matches a traffic event in a way that is specified by the rule. For example, if a traffic event matches a filter instance such that a network state is detected (e.g., in a network state, transitioning into the network state, or transitioning out of the network state), then a rule that specifies these conditions is applicable. Other examples of specified conditions are when a traffic event is allowed, blocked, throttled, delayed, or deferred, each which could be specified to be match or no match.

Policy rules can also define caps, which are met when a count of, e.g., time or bytes, reaches the defined cap. (It may be noted that a count can be considered part of a notification policy.) When a capped policy event has a counter increment to its defined cap, the filter can change from, e.g., allow (when the cap has not been exceeded) to block, throttle, delay, or defer (when the cap has been exceeded). The capped policy event could similarly go from, e.g., throttle (when the cap has not been exceeded) to throttle more (when the cap has been exceeded) or some other combination of filtering activity before and after a cap has been exceeded.

In the example of FIG. 5, the flowchart 500 continues to module 510 with storing the corresponding policy event rule record in the design system rules datastore. Policy event rules records can include one or more of a traffic control policy, a notification policy, and a charging policy. Traffic control policy rules are associated with the type of filter to which the traffic control policy rule corresponds (e.g., allow, block, throttle, delay, defer, or take no action). The applicable traffic control can be function of network state, device state, service plan usage state, etc.

Notification policy rules are associated with sending information to a party, such as a subscriber, human or non-human agent of a service design system, a program, etc. In a specific implementation, a notification policy record can be given a name and description, and notification details such as whether the notification is in the foreground or background, the destination of the notification (e.g., to a subscriber, to a server, or to some other party), and interaction that is enabled in association with the notification (e.g., number of times the notification is displayed before it is no longer displayed to a user or an option that enables a user to suppress the notification in the future). Notifications to subscribers and human agents of the service design system will typically include human-readable content, such as a title, subtitle, short text, and/or long text description. Notifications to non-human agents may or may not include the same information, and can include instruction sets that make little or no sense when read by a human. In a specific implementation, notifications can include variables that insert data from datastores, about network state, or other data that can vary over time. A service design agent can include selection options (e.g., buttons) in a notification that enable the recipient to provide feedback or instructions. Useful selection options might include, for example, upsell plans, a service offerings catalog, a request for more information, an indication that overage is desired, launching a URL, and/or dismiss. In a specific implementation, a service design system agent can use a graphical user interface that displays a mobile device with the notification as it would be displayed (perhaps without some icons or other features of the mobile device) to make review of the notification convenient.

Charging policy rules are associated with determining how much to bill for usage (in time or bytes). In a specific implementation, a service plan component can inherit charging policy from a plan in which the component is integrated. So, strictly speaking, in such an implementation, a service plan component record need not have a charging policy rule, though when deployed it can have a charging policy rule due to inheritance. Where the charging policy is defined for a component, the charging policy can be based on data used or time, may or may not have an overage allowance (with an optional maximum overage usage), and will have a rate, which can be specified with a charging code.

In the example of FIG. 5, the flowchart 500 continues to module 512 with creating a service plan component record that includes the filter instance from the service design system filter datastore and the policy event rule record in the design system rules datastore. It may be observed that a service plan component will always have a filter and a policy event rule. Assuming the traffic control policy is defined to include "detect" (in addition to allow, block, throttle, delay, defer, to name several), the service plan component can be defined as always including a traffic control policy, where "detect" does nothing more than trigger the policy event when the filter and policy event rule matches a traffic event. Assuming the notification policy is defined to include "none," the service plan component can be defined as always including a notification policy. Assuming the charging policy is defined to include "inherit," the service plan component can be defined as always including a charging policy, which is determined when the component is integrated into a plan from which it can inherit the charging policy.

In the example of FIG. 5, the flowchart 500 continues to decision point 514 where it is determined whether more filter instances are to be created. If it is determined that more filter instances are to be created (514—Y), then the flowchart returns to module 502 and continues as described previously (though at module 512, instead of creating a service plan component record, the service plan component record can be modified). If, on the other hand, it is determined that no more filter instances are to be created (514—N), then the flowchart 500 continues to decision point 516 where it is determined whether more policy event rule records corresponding to a filter record are to be created.

If it is determined that more policy event rule records corresponding to a filter record are to be created (516—Y), then the flowchart 500 returns to module 508 and continues as described previously (though at module 512, instead of creating a service plan component record, the service plan component record can be modified). If, on the other hand, it is determined that no more policy event rule records corresponding to a filter record are to be created (516—N), then the flowchart 500 ends.

It may be noted that in a typical implementation, the method could be restarted at module 502, module 508, or module 512 if there is an other filter instance, policy event rule record, or service plan component record to be created. Therefore, the end is a logical end to the flowchart 500, but the process can continue as needed.

Figure 6:
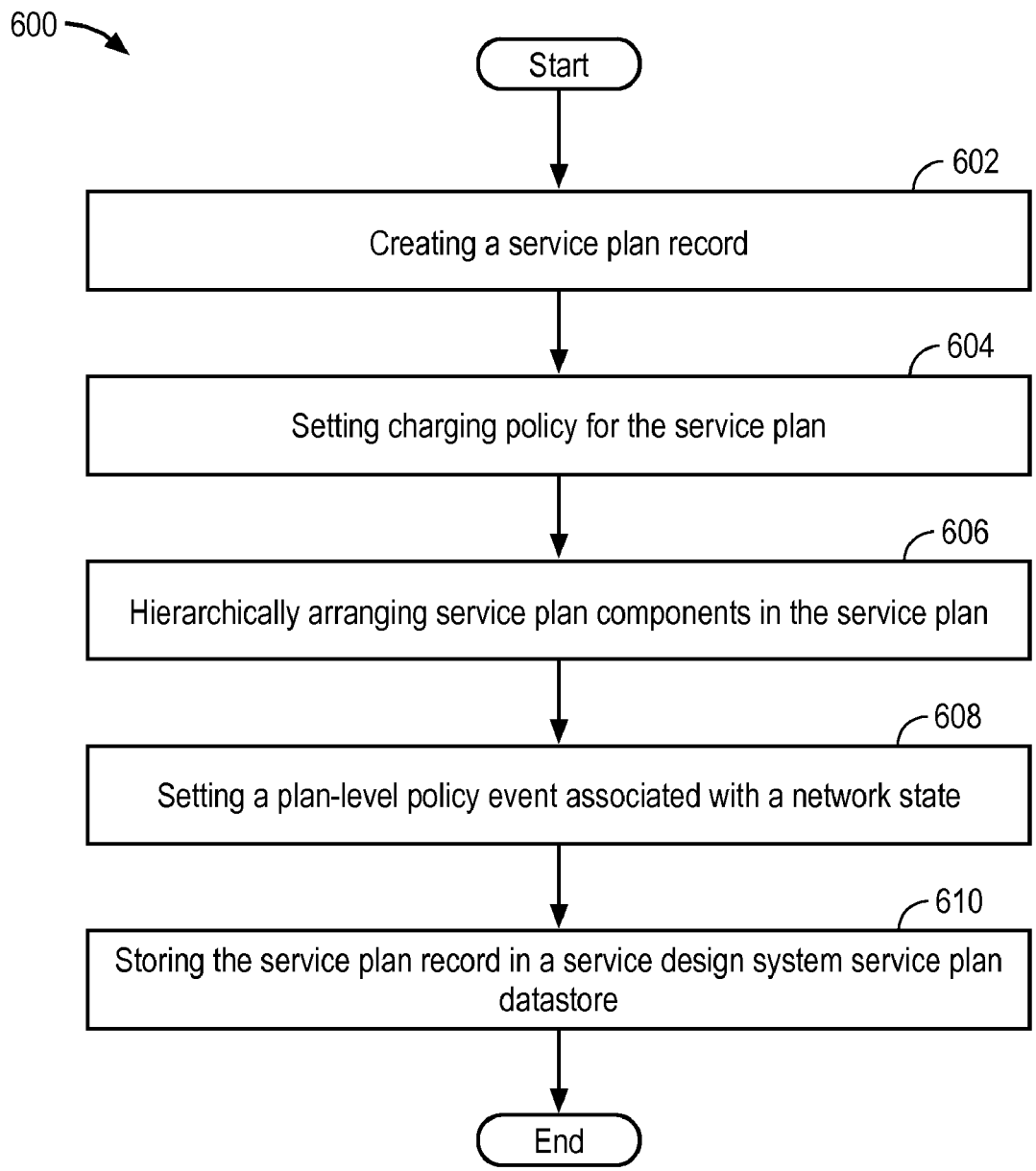
FIG. 6 depicts a flowchart of an example of a method for creating service plans from service plan components.

FIG. 6 depicts a flowchart 600 of an example of a method for creating service plans from service plan components. For illustrative purposes, it is assumed that filter instances, policy event rule records, and service plan component records that are going to be used in a service plan have already been created. It may be noted that none, some, or all of the filter instances, policy event rule records, and service plan component records could be created at any appropriate point (not depicted) in the flowchart 600. In a specific implementation, the filter instances and policy event rule records can be used at both the service plan component level (see, e.g., FIG. 5) and at the service plan level.

In the example of FIG. 6, the flowchart 600 continues to module 610 with creating a service plan record. The service plan record can include an icon for display on, e.g., subscriber devices, a plan name, a plan short description, a plan description, a plan version, a plan type (e.g., sponsored, paid, or carrier), whether the plan is a default plan, whether the plan is repurchaseable, a billing price, and a display price. Whether a policy label is displayed on a subscriber device can also be set. It may be noted that the service plan record could instead be created after all or a portion of the information associated with the following modules has been provided.

In the example of FIG. 6, the flowchart 600 continues to module 604 with setting charging policy for the service plan. The charging policy can be based on data or time usage and can have a usage limit, with or without overage of some amount, the billing policy cycle can be configured as appropriate (e.g., duration, frequency, report usage, pre- or postpaid billing, etc.). Whether billing identifiers are used (e.g., billing name, carrier service ID, etc.) can also be set. If charging codes are used, charging codes can also be identified and set to the default or not as is appropriate for the service plan. The charging policy can be inherited by service plan components of the plan that are configured to inherit the charging policy of the plan.

In the example of FIG. 6, the flowchart 600 continues to module 606 with hierarchically arranging service plan components in the service plan. The hierarchical arrangement can be explicit (e.g., by indicating priority in a field associated with a component) or implicit in the ordering of the components. In a specific implementation, the components also have service classes. For example, components could fall into the service classes carrier, network protection, sponsored, paid, parental control, marketing intercept, open access/bulk, post-bulk, and no applicable service plan/end-of-life. Thus, hierarchical arrangement of service plan components can refer to hierarchical arrangement of the service plan components relative to one another, to hierarchical arrangement of the service plan components within a service class relative to other service plan components in that service class, or to both.

Depending upon the implementation, service plan components can be designated to have a service class upon creation (or edit), or the component can be assigned to a service class when the component is added to the service plan. For example, a service plan component could be assigned to a "paid" service class, but could also function appropriately if assigned to a marketing intercept service class. Depending upon the implementation, the component could be designated "paid" upon creation and copied to create a similar "marketing intercept" component, or the component could be designated either paid or marketing intercept upon creation (or have no service class designation), and inserted into the relevant service class when arranged in a service plan. Thus, the hierarchical arrangement can be dynamic by service class (e.g., a designer can pick the class into which to arrange a component) or static by service class (e.g., the component is created within a service class). In a specific implementation, a service plan component with a static service class can be explicitly arranged by priority relative to other service plan components within the service class, a service plan component with a dynamically assigned service class can be explicitly arranged by priority relative to other service plan components within the service class, a service plan component with a static service class can be implicitly arranged by priority within the service class, and a service plan component with a dynamically assigned service class can be implicitly arranged by priority within the service class.

In the examples provided in this paper, the carrier service class is generally treated as the highest priority service class. Carrier plans will include basic network policy. In a specific implementation, carrier plans are automatically enforced on a subscriber device and are not offered in a plan catalog.

In the examples provided in this paper, the second highest priority service class, network protection, can be associated with policy designed to protect network resources (e.g., by detecting devices that are consuming too many network resources and throttling or blocking them). Network protection services can have variable billing policies that are selectable by a subscriber (e.g., to enable foreground processing as opposed to background processing, speed, etc.), but a subscriber may or may not have the ability to modify network protection policy, depending upon the implementation.

In the examples provided in this paper, the third highest priority service class, sponsored, can be associated with service plans that are sponsored in whole or in part by an entity other than the subscriber. Partially sponsored plans can be referred to as subsidized, though the term "sponsored" is intended to include subsidized plans unless otherwise indicated by context. Depending upon the implementation and/or configuration, sponsored plans may or may not be optional. For example, an employee of a company may have a sponsored service plan that is applicable when the employee accesses the company intranet, and the employee may or may not be able to decline the sponsorship. As another example, Facebook may subsidize network resource consumption when a subscriber accesses the Facebook website, and the subscriber may or may not be able to decline the subsidy.

In the examples provided in this paper, the fourth highest priority service class, paid, can be associated with service plans that a subscriber purchases. It is generally the case that a subscriber will be given the option to purchase a paid service plan through, e.g., an actionable service offer. (An actionable service offer is a notification that includes a feedback mechanism, such as an accept button, that a subscriber can select to accept the service offer.) Service offers can be triggered by predefined conditions, such as when a subscriber attempts to do something that a plan would help. (Service offers can also be triggered for sponsored services.)

In the examples provided in this paper, the fifth highest priority service class, parental control, can be associated with service plans that a subscriber purchases or modifies in accordance with an authentication process. Parental control plans can be associated with multi-(or single-) device plans for which a primary subscriber can set policy. Depending upon the implementation, different devices of a multi-device plan can also have different sponsored and paid plans.

In the examples provided in this paper, the sixth highest priority service class, market interceptor, can be associated with service plans that are offered to a subscriber before the subscriber drops to the bulk policy service class. Market interceptor plans can include service offers that are favorable to open access policy in some way.

In the examples provided in this paper, the seventh highest priority service class, open access or bulk, can be associated with a catch-all service plan.

In the examples provided in this paper, the eighth highest priority service class, post-bulk, can be associated with service plans that can be activated in the event no other service plan is applicable. In a specific implementation, post-bulk plans are designed to offer a subscriber a last chance to activate a service plan for something that the subscriber is trying to do, but is unable due to no service plan being available. If the subscriber responds appropriately to a notification, the subscriber may activate a service plan (e.g., a paid service plan) relevant to a present activity.

In the examples provided in this paper, the ninth highest priority service class, end-of-life, is typically associated with a notification that no service plan is available for a detected traffic event.

It is not necessary to utilize all service classes to take advantage of a service class hierarchy in specific implementations. It is also possible to move a class up or down relative to other classes in the hierarchy. For example, the network protection class could be given a priority below paid service class.

In the example of FIG. 6, the flowchart 600 continues to module 608 with setting a plan-level policy event associated with a network state. As was described previously, each service plan component can have a traffic control policy, a notification policy, and a charging policy. Policy events can also be set at the plan level. In a specific implementation, the filters and rules that were created when creating service plan components can be reused at the plan level, and if filters and rules are created when creating the service plan (not depicted), then those filters and rules can, be used at the service plan component level. In a specific implementation, the policy events can be associated with a network state. Network state can refer to current or historical parameters (e.g., congestion, previous number of failed attempts to authenticate on the network, time of day, geographic location, type of network, device is roaming, etc.) Policy events can also be set to be applicable for any (i.e., regardless of) network state.

In the example of FIG. 6, the flowchart 600 ends at module 612 with storing the service plan record in a service design system service plan datastore. Advantageously, the service plan can be used in multiple service plan catalogs without modification. Alternatively, the service plan record could be cloned for use in various service plan catalogs with or without modification. Where versioning is used, deployed service plans can either be automatically updated to new versions (with a possible grandfathering-in of subscribers to service plan components from prior versions), or the service plans can be wholly or partially templated such that new versions of the service plan do not impact deployed service plan offerings. Depending upon the implementation, a designer can go back to any module to edit parameters (e.g., after reviewing the service plan and determining that a parameter should be changed).

Figure 7:
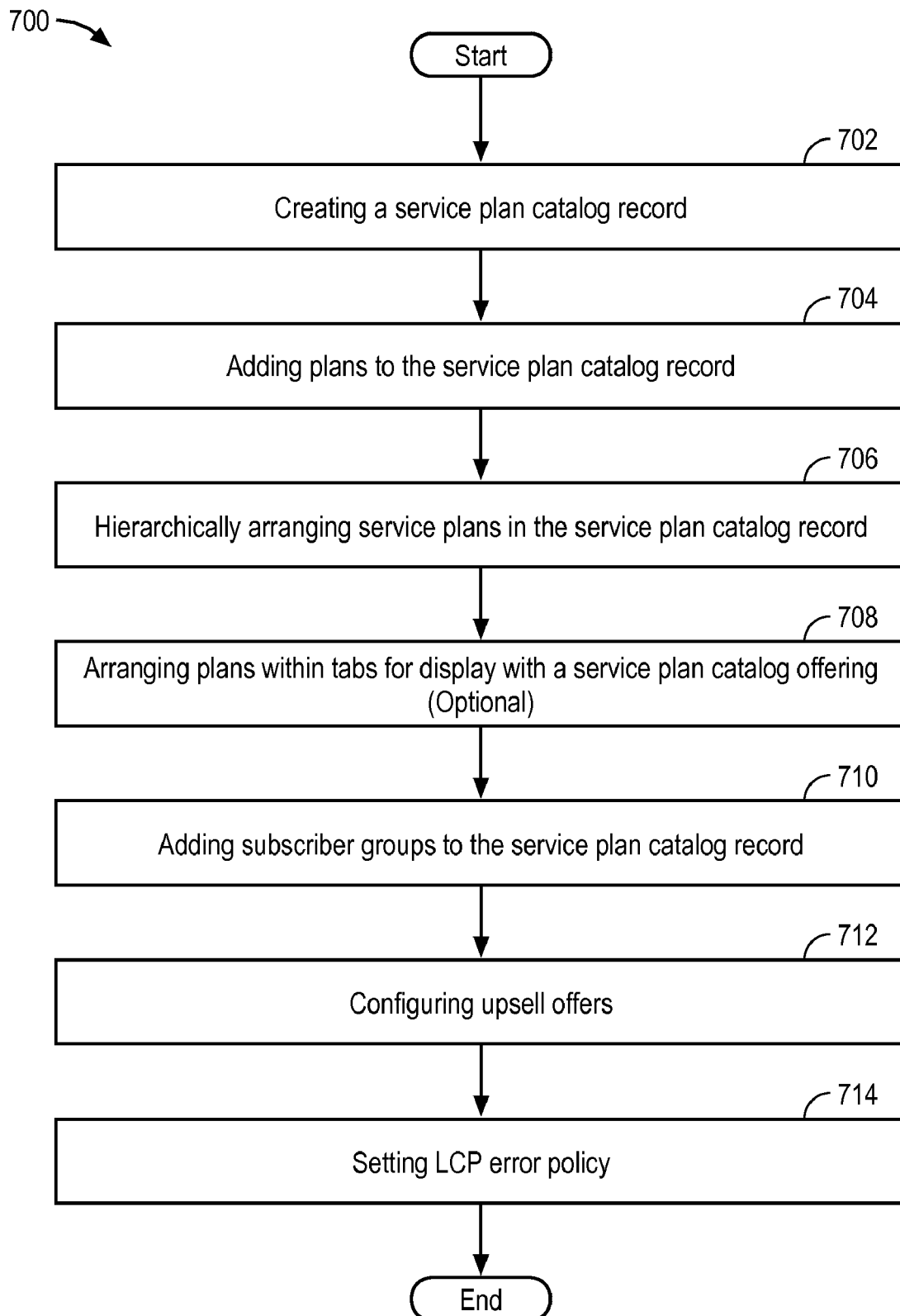
FIG. 7 depicts a flowchart of an example of a method for creating service plan catalogs from subscriber groups and service plans.

A service design engine can use a process, such as the example provided with reference to FIG. 4, to create subscriber groups. The service design engine can also use a process, such as the example provided with reference to FIG. 6, to create service plans. The subscriber groups and service plans can be implemented in service plan catalogs that are provided to access networks for automatic or selective implementation. FIG. 7 depicts a flowchart 700 of an example of a method for creating service plan catalogs from subscriber groups and service plans.

In the example of FIG. 7, the flowchart 700 starts at module 702 with creating a service plan catalog record. The service plan catalog record can include a plan catalog name, a plan catalog description, a plan catalog version, or the like. It may be noted that the service plan catalog record could instead be created after all or a portion of the information associated with the following modules has been provided.

In the example of FIG. 7, the flowchart 700 continues to module 704 with adding plans to the service plan catalog record. In a specific implementation, the plans are stored as records in a service design system service plans datastore. In a specific implementation, the plans are represented in a list, and a designer can drag plans from the list into a chosen plans list using a service design system UI. Plans can be designated as available upon activation (or not).

In the example of FIG. 7, the flowchart 700 continues to module 706 with hierarchically arranging the service plans in the service plan catalog record. The plans can be arranged by priority relative to one another, which results in a higher priority plan being displayed and/or used first. The plans can also be arranged within a service class relative to other plans in the service class. Service class can be statically assigned to the plans when they are created (or edited) or dynamically assigned during the creation of the service plan catalog. Priorities can be explicit based on a priority indicator, implicit based on a relative location of a plan in the list of plans, or indicated in some other manner. In a specific implementation, a service design system UI enables a designer to drag a plan up or down a list of plans within service classes to establish priority, which is indicated by a priority number that corresponds to the relative order of a plan within a service class.

In the example of FIG. 7, the flowchart 700 continues to module 708 with optionally arranging plans within tabs for display with a service plan catalog offering. Tabs can include categories such as games, social, productivity, media, free, paid, all, or the like. An association between a tab and a plan can be formed such that the plan will be displayed under the associated tab when the service plan catalog offering is displayed, e.g., on a subscriber device. A plan can be associated with multiple tabs, and displayed under the multiple tabs. The order of the tabs can be configured, as can the order of the plans within tabs. In this paper, the order of the plans within a tab is not related to the priority of a plan, e.g., within a service class, though such a correlation could be made in alternative implementations.

In the example of FIG. 7, the flowchart 700 continues to module 710 with adding subscriber groups to the service plan catalog record. In a specific implementation, the subscriber groups are represented in a list, and a designer can drag plans from the list into a chosen subscriber groups list using a service design system UI. Other methods of adding subscriber groups are anticipated, such as, e.g., by identifying subscriber groups in accordance with subscriber characteristics.

When a service plan catalog is published, the subscriber groups associated with service plans in the service plan catalog identify the subscribers, whether automatically or by selecting the plan, that will have the policies of the relevant service plan enforced on their devices. Depending upon the implementation, publication of a plan can be in beta, which generally means the subscribers to the plan can have the plan changed with or without notice, or deployed, which generally means that subscribers can expect changes to future versions of the plan will not impact them until they need to repurchase the (new version of) the plan.

In the example of FIG. 7, the flowchart 700 continues to module 712 with configuring upsell offers. Upsell offers have notification policy that is associated with network state, device state, or subscriber state. For example, if a subscriber uses a great deal of streaming media in a bulk plan, it may be desirable to offer a streaming media plan that, based upon their current or historical usage, will save the subscriber money. As another example, a subscriber who is in a city with a wireless Municipal Area Network (MAN) might receive upsell offers associated with a using the wireless MAN. As another example, a subscriber who frequently accesses Facebook can be offered a service plan that is sponsored by Facebook, thereby decreasing service costs as long as the access is associated with Facebook. As another example, a subscriber who frequently accesses a Facebook competitor could be offered a service plan that is sponsored by Facebook in an effort to draw the subscriber to Facebook (because it is cheaper). As another example, if a subscriber is indicated to have a language preference of Japanese, an upsell offer could target that demographic (e.g., by offering a sponsored service to access an application that is popular among Japanese speakers). As another example, a subscriber who has a particular device state (e.g., the subscriber record includes data that the subscriber uses an iPhone) can be targeted with an upsell offer that is popular with subscribers having such a device state.

Upsell offers can include a suite of all possible choices, or can be limited to offers that are more suitable to the specific historical usage of a particular subscriber. For example, if a subscriber typically consumes around 5 MB of data per unit of time, the system need not provide upsell offers for 10 MB, 100 MB, 1 GB, 10 GB, and 100 GB all at once (even though all might be offered), and instead send an upsell offer of 10 MB only (or, e.g., 10 MB and 100 MB). If usage for the subscriber increases, the subscriber can be notified regarding the larger-size service plans.

The upsell offer could alternatively be added to a service plan component, but in a specific implementation, it was deemed useful to modify upsell offers, even those that might be identified within a service plan component, at the service plan catalog level. In this way, standard upsell components of, e.g., a Facebook plan, can be modified with appropriate notification or other configurations for a given service plan catalog or for specific subscriber groups.

In the example of FIG. 7, the flowchart 700 ends at module 714 with setting LCP error policy. An LCP error occurs when a traffic event is not matched to an applicable service plan policy. Setting an LCP error for a service plan catalog enables the LCP error to be handled in an elegant fashion (e.g., by sending a notification to a subscriber that the traffic event can be handled in accordance with an inactive service plan, the notification including an option for the subscriber to activate the inactive service plan). The LCP error notification policy could alternatively be added to a service plan component, but in a specific implementation, it was deemed useful to enable LCP error policy settings at the service plan catalog level because the LCP error policy always comes at the end of attempts to match all active plans in a service plan catalog offering. This results in improved service plan design efficiency. Depending upon the implementation, a designer can go back to any module to edit parameters (e.g., after reviewing the service plan catalog and determining that a parameter should be changed).

Figure 8:
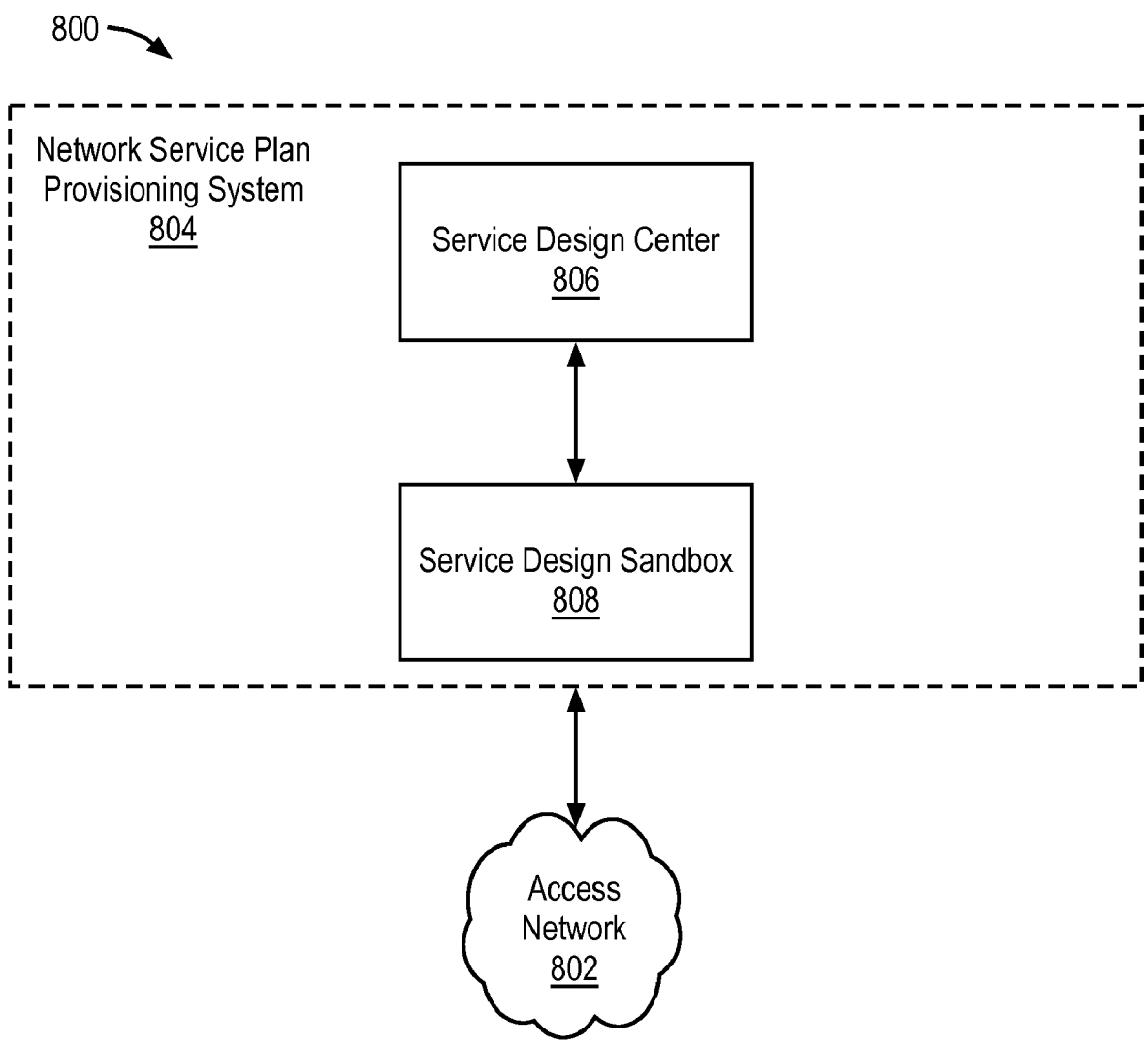
FIG. 8 depicts an example of system including an access network and a network service plan provisioning sandbox system.

FIG. 8 depicts an example of system 800 including an access network and a network service plan provisioning sandbox system. The system 800 includes an access network 802 and a network service plan provisioning system 804. The access network 802 is similar to that described with reference to FIG. 1.

In the example of FIG. 8, the network service plan provisioning system 804 includes a service design center 806 and a service design sandbox 808. Conceptually, the service design center 806 and the service design sandbox 808 share design and/or provisioning responsibilities. The service design center 806 and the service design sandbox 808 can be hierarchically organized. For example, the service design center 806 can delegate certain roles to the service design sandbox 808 and perhaps retains an oversight capability for agents of the service design center 806. For example, the service design sandbox 808 can be given the ability to impact policy control to a subset of subscriber groups of the network service plan provisioning system 804. The network service plan provisioning system 804 can be referred to as "distributed" in this example.

Some examples of entities that might desire to include the service design sandbox 808 in their networks include enterprises with employees that consume network services, MVNOs, application developers, gifters, and community-based organizations. In the case of enterprises with employees that consume network services, the service design sandbox 808 can enable fine-tuned control over traffic control and charging policy (as well as notification policy). Assume that XYZ company controls the service design sandbox 808. XYZ company can create a service plan specific to XYZ company network services on the XYZ company intranet, which will be referred to as the XYZ plan. Specifically, the XYZ company can sponsor the XYZ company network services on the XYZ company intranet for XYZ company employees. A paid plan offered by a carrier that controls the service design center 806, for example, can still be available for XYZ company employees that are using other network services (or XYZ company could partially sponsor a subset of the other network services). The XYZ plan could also include a component that prevents XYZ company employees from accessing certain restricted sites through the XYZ company intranet and has notification policy associated with the attempted access. Continuing the example, an agent (e.g., IT manager) of the XYZ company can define subscriber groups that comprise XYZ company members and assign different service plans (e.g., different traffic control, notification, or charging policies) to the different XYZ company subscriber groups. For example, employees could get limited usage, managers might get access to more usage and additional services (e.g., email), members of the sales team might get better roaming services, and a CEO might get everything in the carrier's service plan offering, perhaps with XYZ company as a sponsor for all services. Advantageously, split-billing is possible using these techniques, such that XYZ company can pay for sponsored services and XYZ employees can pay for unsponsored services (or for a portion of subsidized services).

In the case of MVNOs, an MVNO can purchase bulk data from a carrier and offer plans based on the bulk. Advantageously for MVNOs, the service design sandbox 808 enables control over subscribers based on, e.g., network state. Indeed, for all subscribers "owned" by the MVNO, a great deal of policy control can be applied (dependent upon the amount of control a carrier is willing to give to the MVNO). Other providers that can benefit from the sandbox model include mobile virtual network enablers (MVNEs), mobile shared spectrum enablers (MSSEs), and service providers (SPs).

In the case of application developers, the service design sandbox 808 can specify applications that can be covered by a service plan. The service design center 806 may or may not be responsible for creating the underlying control mechanism. For example, a company like amazon.com can be given some control over sponsorship settings for applications associated with amazon.com.

In the case of gifters, the service design sandbox 808 can enable specification of a sponsorship amount that is donated to some other organization, such as a non-profit organization. In the case of community-based organizations, the service design sandbox 808 can specify free access for a particular network service. For example, the San Francisco Giants organization could have a plan group for fans that grants free access to the official site of the San Francisco Giants. As another example, AAA could sponsor access to services for AAA members.

Agents of the network service plan provisioning system can be given roles that grant access to certain aspects of service design and/or provisioning. For example, agents at the service design center 806 can have a role system administrator, super user, or the like, while agents of the service design sandbox 808 can have roles such as enterprise IT manager, MVNO administrator, or the like. Agents of the service design sandbox 808 can subdivide roles further, if applicable, depending upon implementation.

Figure 9:
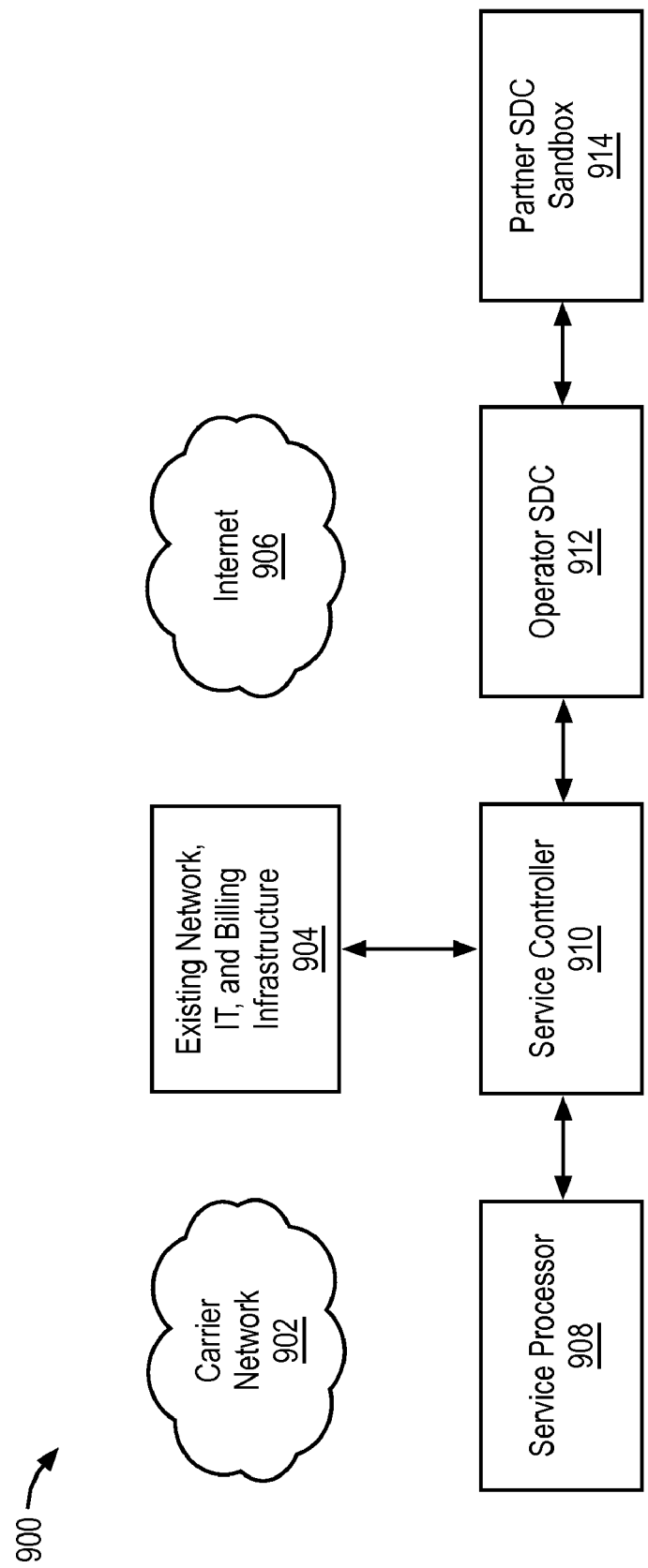
FIG. 9 depicts a conceptual diagram of an example of a service design system sandbox implementation.

FIG. 9 depicts a conceptual diagram 900 of an example of a service design system sandbox implementation. The conceptual diagram 900 includes a carrier network 902, existing network, IT, and billing infrastructure 904 (referred to as infrastructure 904), the Internet 906, a service processor 908, a service controller 910, an operator service design center (SDC) 912, and a partner SDC sandbox 914. In the example of FIG. 9, the carrier network is coupled to the Internet 906 via the infrastructure 904.

The service processor 908 can be implemented on a client device on the carrier network 902. In a specific implementation, the service processor 908 includes a service control device link. For example, as device based service control techniques involving supervision across a network become more sophisticated, it becomes increasingly important to have an efficient and flexible control plane communication link between the device agents and the network elements communicating with, controlling, monitoring, or verifying service policy. In some embodiments, the service control device link provides the device side of a system for transmission and reception of service agent to/from network element functions. In some embodiments, the traffic efficiency of this link is enhanced by buffering and framing multiple agent messages in the transmissions. In some embodiments, the traffic efficiency is further improved by controlling the transmission frequency or linking the transmission frequency to the rate of service usage or traffic usage. In some embodiments, one or more levels of security or encryption are used to make the link robust to discovery, eavesdropping or compromise. In some embodiments, the service control device link also provides the communications link and heartbeat timing for the agent heartbeat function. The service control device link can provide an efficient and secure solution for transmitting and receiving service policy implementation, control, monitoring and verification information with other network elements.

In a specific implementation, a client dashboard is presented in a display device by the service processor 908. The client dashboard can include the following menus: services (purchased, data usage), statistics (applications consuming data, data used in absolute terms or as a %), buy (navigates subscriber through activation, enrollment, plan selection, and purchase workflows), help, and settings (preferences, e.g., language).

The service controller 910 can be implemented, e.g., in the cloud, and is coupled to the infrastructure 904.

The operator SDC 912 is on the Internet, and is coupled to the service controller. The operator SDC 912 can set up boundaries for "sandboxed" service and allow customizations for partner sets; lock in master tariffs based on negotiated rates for a given partner set or individual partner; create custom log-ins for different partner sets or individual partners; and carry out any applicable techniques appropriate for a service design system. The operator SDC 912 allows authorized agents to manage service plan components and subscribers. The agents can manage groups (collections of subscribers, SIMs, or devices) to create groups and group directories, assign an identity hierarchy for the operator, associated identifiers with groups, etc. The agents can manage service plans (including one or more components) including plan name and description, groups using the plan, service plan components, service activities, network busy states and connection types, charging policies (including usage limits, thresholds, frequency, time, and payment type), notifications (e.g., for plan usage thresholds, plan cap, expiration, block, overage, no capable plan, etc.), and events (e.g., for plan usage thresholds, plan cap, expiration, block, overage, etc.). The agents can manage service components (logical grouping of one or more filters and rules), including component name and description, plans using the component, network busy states and connection types, charging policies (including usage limits, thresholds, frequency, time and payment type), notifications (e.g., for plan usage thresholds, plan cap, expiration, block, overage, no capable plan, etc.), and events (e.g., for plan usage thresholds, plan cap, expiration, block, overage, etc.). The agents can manage service activities (e.g., activity name, plans using the activity, components using the activity, filter name and description, and filter type details (e.g., operating system, application, remote, port, protocol, etc.). The agents can manage service group plans including assign and publish plan group, create activation workflow screens, create buy workflow screens. The agents can receive, manage, customize, or generate reports for, for example, usage reports by destination for a subscriber over a period of time, usage reports by destination for a range of subscribers over a period of time (top destinations).

The partner SDC sandbox 914 is coupled to the operator SDC 912 in an applicable convenient fashion. The partner SDC sandbox 914 can provide a secure login environment in which a subset of SDC service management controls can be designed and/or used; enable selection from bounded service customization options for one or more device groups under management; customize device UI branding; access real time analytics for service usage, application usage, location, etc.; set up service usage alerts, fraud alerts, theft alerts, etc.; and carry out any applicable techniques appropriate for a service design system that have been delegated to the sandboxed environment.

The service controller 910 includes a service control server link. In some a specific implementation, device based service control techniques involving supervision across a network (e.g., on the control plane) are more sophisticated, and for such it is increasingly important to have an efficient and flexible control plane communication link between the device agents (e.g., of the service processor 908) and the network elements (e.g., of the service controller 910) communicating with, controlling, monitoring, or verifying service policy. For example, the communication link between the service control server link of service controller 910 and the service control device link of the service processor 910 can provide an efficient and flexible control plane communication link, a service control link; in some embodiments, this control plane communication link provides for a secure (e.g., encrypted) communications link for providing secure, bidirectional communications between the service processor 908 and the service controller 910. In some embodiments, the service control server link provides the network side of a system for transmission and reception of service agent to/from network element functions. In some embodiments, the traffic efficiency of this link is enhanced by buffering and framing multiple agent messages in the transmissions (e.g., thereby reducing network chatter). In some embodiments, the traffic efficiency is further improved by controlling the transmission frequency and/or linking the transmission frequency to the rate of service usage or traffic usage. In some embodiments, one or more levels of security and/or encryption are used to secure the link against potential discovery, eavesdropping or compromise of communications on the link. In some embodiments, the service control server link also provides the communications link and heartbeat timing for the agent heartbeat function. In some embodiments, the service control server link provides for securing, signing, encrypting and/or otherwise protecting the communications before sending such communications over the service control link. For example, the service control server link can send to the transport layer or directly to the link layer for transmission. In another example, the service control server link further secures the communications with transport layer encryption, such as TCP TLS or another secure transport layer protocol. As another example, the service control server link can encrypt at the link layer, such as using IPSEC, various possible VPN services, other forms of IP layer encryption and/or another link layer encryption technique.

In a specific implementation, the service controller 910 can include an access control integrity server (e.g., service policy security server). In some embodiments, the access control integrity server collects device information on service policy, service usage, agent configuration, and/or agent behavior. For example, the access control integrity server can cross check this information to identify integrity breaches in the service policy implementation and control system. In another example, the access control integrity server can initiate action when a service policy violation (e.g., QoS policy violation and/or a network capacity controlled services policy violation) or a system integrity breach is suspected.

In a specific implementation, an agent of the service controller 910 (and/or some other agent of the access control integrity server) acts on access control integrity agent (e.g., service policy security agent) reports and error conditions. Many of the access control integrity agent checks can be accomplished by the server. For example, the access control integrity agent checks include one or more of the following: service usage measure against usage range consistent with policies (e.g., usage measure from the network and/or from the device); configuration of agents; operation of the agents; and/or dynamic agent download.

In a specific implementation, an agent of the service controller 910 (and/or some other agent of the access control integrity server) verifies device service policy implementations by comparing various service usage measures (e.g., based on network monitored information, such as by using IPDRs or CDRs, and/or local service usage monitoring information) against expected service usage behavior given the policies that are intended to be in place (e.g., a QoS policy and/or a network capacity controlled services policy). For example, device service policy implementations can include measuring total QoS data passed, QoS data passed in a period of time, IP addresses, data per IP address, and/or other measures such as location, downloads, email accessed, URLs, and comparing such measures expected service usage behavior given the policies that are intended to be in place.

In a specific implementation, an agent of the service controller 910 (and/or some other agent of the access control integrity server) verifies device service policy, and the verification error conditions that can indicate a mismatch in QoS service measure and QoS service policy include one or more of the following: unauthorized network access (e.g., access beyond ambient service policy limits); unauthorized network speed (e.g., average speed beyond service policy limit); network data amount does not match QoS policy limit (e.g., device not stop at limit without re-up/revising service policy); unauthorized network address; unauthorized service usage (e.g., VOIP, email, and/or web browsing); unauthorized application usage (e.g., email, VOIP, email, and/or web); service usage rate too high for plan, and policy controller not controlling/throttling it down; and/or any other mismatch in service measure and service policy. Accordingly, in some embodiments, an agent of the service controller 910 (and/or some other agent of the access control integrity server) provides a policy/service control integrity service to continually (e.g., periodically and/or based on trigger events) verify that the service control of the device has not been compromised and/or is not behaving out of policy (e.g., a QoS policy and/or a network capacity controlled services policy).

In a specific implementation, the service controller 910 includes a service history server (e.g., charging server). In some embodiments, the service history server collects and records service usage or service activity reports from, e.g., an access network AAA server and/or a service monitor agent of the service controller 910. For example, although service usage history from the network elements can in certain embodiments be less detailed than service history from the device, the service history from the network can provide a valuable source for verification of device service policy implementation, because, for example, it is extremely difficult for a device error or compromise event on the device to compromise the network based equipment and software. For example, service history reports from the device can include various service tracking information, as similarly described above. In some embodiments, the service history server provides the service history on request to other agents of the service controller 910, other servers, and/or one or more other agents. In some embodiments, the service history server provides the service usage history to the device service history (e.g., CDR feed and CDR mediation). In some embodiments, for purposes of facilitating the activation tracking service functions (described below), the service history server maintains a history of which networks the device has connected to. For example, this network activity summary can include a summary of the networks accessed, activity versus time per connection, and/or traffic versus time per connection. As another example, this activity summary can further be analyzed or reported to estimate the type of service plan associated with the traffic activity for the purpose of bill sharing reconciliation.

In a specific implementation, the service controller 910 includes a policy management server (e.g., policy decision point (PDP) server) for managing service usage policies, such as QoS policies and/or a network capacity controlled services policies. In some embodiments, the policy management server transmits policies to the service processor 908 via the service control link. In some embodiments, the policy management server manages policy settings on the device (e.g., various policy settings as described herein with respect to various embodiments) in accordance with a device service profile. In some embodiments, the policy management server sets instantaneous policies on policy implementation agents (e.g., policy implementation agent). For example, the policy management server can issue policy settings, monitor service usage and, if necessary, modify policy settings. For example, in the case of a user who prefers for the network to manage their service usage costs, or in the case of any adaptive policy management needs, the policy management server can maintain a relatively high frequency of communication with the device to collect traffic and/or service measures and issue new policy settings. In this example, device monitored service measures and any user service policy preference changes are reported, periodically and/or based on various triggers/events/requests, to the policy management server. In this example, user privacy settings generally require secure communication with the network (e.g., a secure service control link), such as with the policy management server, to ensure that various aspects of user privacy are properly maintained during such configuration requests/policy settings transmitted over the network. For example, information can be compartmentalized to service policy management and not communicated to other databases used for CRM for maintaining user privacy.

In some embodiments, the policy management server provides adaptive policy management on the device. For example, the policy management server can issue policy settings and objectives and rely on the device based policy management (e.g., service processor 908) for some or all of the policy adaptation. This approach can require less interaction with the device thereby reducing network chatter on the service control link for purposes of device policy management (e.g., network chatter is reduced relative to various server/network based policy management approaches described above). This approach can also provide robust user privacy embodiments by allowing the user to configure the device policy for user privacy preferences/settings so that, for example, sensitive information (e.g., geo-location data, website history, and/or other sensitive information) is not communicated to the network without the user's approval. In some embodiments, the policy management server adjusts service policy based on time of day. In some embodiments, the policy management server receives, requests, and/or otherwise obtains a measure of network availability/capacity and adjusts traffic shaping policy and/or other policy settings based on available network availability/capacity (e.g., a network busy state).

In a specific implementation, the service controller 910 includes a network traffic analysis server. In some embodiments, the network traffic analysis server collects/receives service usage history for devices and/or groups of devices and analyzes the service usage. In some embodiments, the network traffic analysis server presents service usage statistics in various formats to identify improvements in network service quality and/or service profitability. In some embodiments, the network traffic analysis server estimates the service quality and/or service usage for the network under variable settings on potential service policies. In some embodiments, the network traffic analysis server identifies actual or potential service behaviors by one or more devices that are causing problems for overall network service quality or service cost. In some embodiments, the network traffic analysis server estimates the network availability/capacity for the network under variable settings on potential service policies. In some embodiments, the network traffic analysis server identifies actual or potential service behaviors by one or more devices that are impacting and/or causing problems for overall network availability/capacity.

In a specific implementation, the service controller 910 includes a beta test server (e.g., policy creation point and beta test server). In some embodiments, the beta test server publishes candidate service plan policy settings to one or more devices. In some embodiments, the beta test server provides summary reports of network service usage or user feedback information for one or more candidate service plan policy settings. In some embodiments, the beta test server provides a mechanism to compare the beta test results for different candidate service plan policy settings or select the optimum candidates for further policy settings optimization, such as for protecting network capacity.

In a specific implementation, the service controller 910 includes a service download control server (e.g., a service software download control server). In some embodiments, the service download control server provides a download function to install and/or update service software elements (e.g., the service processor 908 and/or agents/components of the service processor 908) on the device, as described herein.

In a specific implementation, the service controller 910 includes a billing event server (e.g., micro-CDR server). In some embodiments, the billing event server collects billing events, provides service plan information to the service processor 908, provides service usage updates to the service processor 908, serves as interface between device and central billing server, and/or provides trusted third party function for certain ecommerce billing transactions.

In a specific implementation, the service processor 908 provides an additional layer of access control. For example, an access network AAA server can provide necessary access network AAA services (e.g., access control and authorization functions for the device access layer) to allow the devices onto the central provider access network and the service provider network. In some embodiments, another layer of access control is required for the device to gain access to other networks, such as the Internet, a corporate network and/or a machine to machine network. In some embodiments, the Access Network AAA server also provides the ability to suspend service for a device and resume service for a device based on communications received from the service controller 910. In some embodiments, the Access Network AAA server also provides the ability to direct routing for device traffic to a quarantine network or to restrict or limit network access when a device quarantine condition is invoked. In some embodiments, the Access Network AAA server also records and reports device network service usage.

In some embodiments, different profiles are selected based on the selected network connection (e.g., different service profiles/policies for WWAN, WLAN, WPAN, Ethernet and/or DSL network connections), which can be referred to as multimode profile setting. For example, service profile settings can be based on the actual access network (e.g., home DSL/cable or work network) behind the Wi-Fi not the fact that it is Wi-Fi (e.g., or any other network, such as DSL/cable, satellite, or T-1), which is viewed as different than accessing a Wi-Fi network at the coffee shop. For example, in a Wi-Fi hotspot situation in which there are a significant number of users on a DSL or T-1 backhaul, the service controller can sit in a service provider cloud or an MVNO cloud, the service controls can be provided by a VSP capability offered by the service provider or the service controller 910 can be owned by the hotspot service provider that uses the service controller 910 on their own without any association with an access network service provider. For example, the service processor 908 can be controlled by the service controller 910 to divide up the available bandwidth at the hotspot according to QoS or user sharing rules (e.g., with some users having higher differentiated priority (e.g., potentially for higher service payments) than other users). As another example, ambient services (e.g., as similarly described herein) can be provided for the hotspot for verified service processors.

In some embodiments, the service processor 908 and service controller 910 are capable of assigning multiple service profiles associated with multiple service plans that the user chooses individually or in combination as a package. For example, a device starts with ambient services that include free transaction services wherein the user pays for transactions or events rather than the basic service (e.g., a news service, eReader, PND service, pay as you go session Internet) in which each service is supported with a bill by account capability to correctly account for any subsidized partner billing to provide the transaction services (e.g., Barnes and Noble may pay for the eReader service and offer a revenue share to the service provider for any book or magazine transactions purchased from the device). In some embodiments, the bill by account service can also track the transactions and, in some embodiments, advertisements for the purpose of revenue sharing, all using the service monitoring capabilities disclosed herein. After initiating services with the free ambient service discussed above, the user may later choose a post-pay monthly Internet, email, and SMS service. In this case, the service controller 910 would obtain from the billing system in the case of network based billing (e.g., or the service controller 910 billing event server in the case of device based billing) the billing plan code for the new Internet, email and SMS service. In some embodiments, this code is cross referenced in a database (e.g., the policy management server) to find the appropriate service profile for the new service in combination with the initial ambient service. The new superset service profile is then applied so that the user maintains free access to the ambient services, and the billing partners continue to subsidize those services, the user also gets access to Internet services and may choose the service control profile (e.g., from one of the embodiments disclosed herein). The superset profile is the profile that provides the combined capabilities of two or more service profiles when the profiles are applied to the same device service processor. In some embodiments, the service processor 908 can determine the superset profile rather than the service controller 910 when more than one "stackable" service is selected by the user or otherwise applied to the device. The flexibility of the service processor 908 and service controller 910 embodiments described herein allow for a large variety of service profiles to be defined and applied individually or as a superset to achieve the desired device service features.

In some embodiments, device assisted services (DAS) techniques for providing an activity map for classifying or categorizing service usage activities to associate various monitored activities (e.g., by URL, by network domain, by website, by network traffic type, by application or application type, and/or any other service usage activity categorization/classification) with associated IP addresses are provided. In some embodiments, a policy control agent, service monitor agent (e.g., charging agent), or another agent or function (or combinations thereof) of the service processor 908 provides a DAS activity map. In some embodiments, a policy control agent, service monitor agent, or another agent or function (or combinations thereof) of the service processor provides an activity map for classifying or categorizing service usage activities to associate various monitored activities (e.g., by Uniform Resource Locator (URL), by network domain, by website, by network traffic type, by socket (such as by IP address, protocol, and/or port), by socket id (such as port address/number), by port number, by content type, by application or application type, and/or any other service usage activity classification/categorization) with associated IP addresses and/or other criteria/measures. In some embodiments, a policy control agent, service monitor agent, or another agent or function (or combinations thereof) of the service processor determines the associated IP addresses for monitored service usage activities using various techniques to snoop the DNS request(s) (e.g., by performing such snooping techniques on the device 100 the associated IP addresses can be determined without the need for a network request for a reverse DNS lookup). In some embodiments, a policy control agent, service monitor agent, or another agent or function (or combinations thereof) of the service processor records and reports IP addresses or includes a DNS lookup function to report IP addresses or IP addresses and associated URLs for monitored service usage activities. For example, a policy control agent, service monitor agent, or another agent or function (or combinations thereof) of the service processor can determine the associated IP addresses for monitored service usage activities using various techniques to perform a DNS lookup function (e.g., using a local DNS cache on the monitored device). In some embodiments, one or more of these techniques are used to dynamically build and maintain a DAS activity map that maps, for example, URLs to IP addresses, applications to IP addresses, content types to IP addresses, and/or any other categorization/classification to IP addresses as applicable. In some embodiments, the DAS activity map is used for various DAS traffic control and/or throttling techniques as described herein with respect to various embodiments for providing QoS for DAS and/or for providing DAS for protecting network capacity. In some embodiments, the DAS activity map is used to provide the user various UI related information and notification techniques related to service usage as described herein with respect to various embodiments. In some embodiments, the DAS activity map is used to provide service usage monitoring, prediction/estimation of future service usage, service usage billing (e.g., bill by account and/or any other service usage/billing categorization techniques), DAS techniques for ambient services usage monitoring, DAS techniques for generating micro-CDRs, and/or any of the various other DAS related techniques as described herein with respect to various embodiments.

Figure 10:
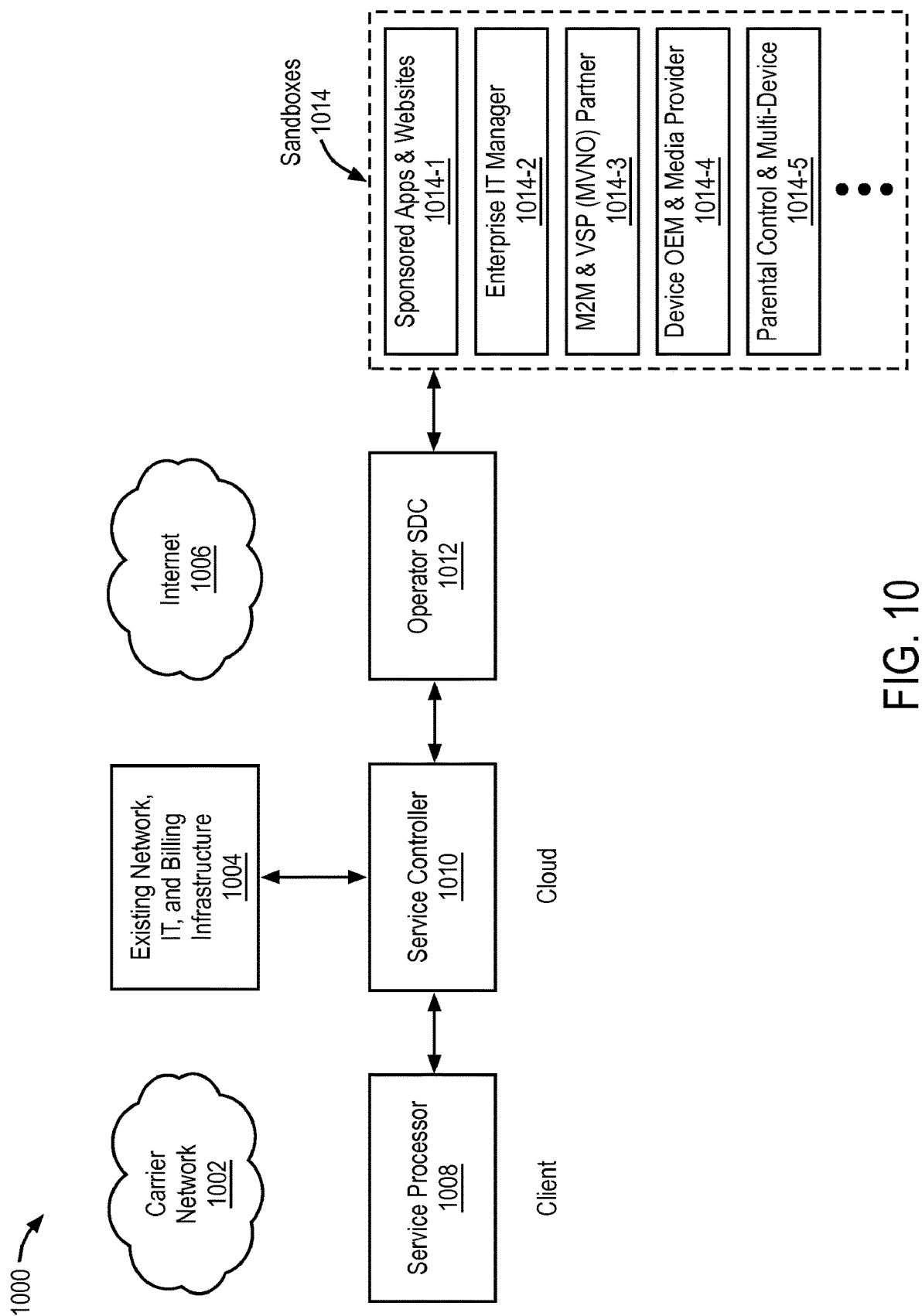
FIG. 10 depicts a conceptual diagram of an example of a service design system sandbox implementation.

FIG. 10 depicts a conceptual diagram 1000 of an example of a service design system sandbox implementation. The components of FIG. 10 are similar to those depicted in FIG. 9. FIG. 10 is intended to illustrate that various sandboxes can be created for a variety of purposes. In the example of FIG. 10, the sandboxes 1014 include sponsored apps & websites sandboxes 1014-1, enterprise IT manager sandboxes 1014-2, machine-to-machine (M2M) & virtual service provider (VSP) (MVNO) partner sandboxes 1014-3, device OEM & media provider sandboxes 1014-4, parental control & multi-device sandboxes 1014-5, etc. A common service controller cloud service software implemented at the service controller

1010 and server processor device client software implemented at the service processor 1008 allows operators and partners to scale customized user experiences and service plan policies.

In some embodiments, a network service usage control policy is dynamic based on one or more of the following: a network busy state, a time of day, which network the service activity is connected to, which base station or communication channel the service activity is connected to, a user input, a user preference selection, an associated service plan, a service plan change, an application behavior, a messaging layer behavior, random back off, a power state of device, a device usage state, a time based criteria (e.g., time/day/week/month, hold/delay/defer for future time slot, hold/delay/defer for scheduled time slot, and/or hold/delay/defer until a busy state/availability state/QoS state is achieved), monitoring of user interaction with the service activity, monitoring of user interaction with the device, the state of UI priority for the service activity, monitoring the power consumption behavior of the service activity, modem power cycling or power control state changes, modem communication session set up or tear down, and/or a policy update/modification/change from the network. In some embodiments, the network service usage control policy is based on updated service usage behavior analysis of the network service usage activity. In some embodiments, the network service usage control policy is based on updated activity behavior response to a network capacity controlled service classification. In some embodiments, the network service usage control policy is based on updated user input/preferences (e.g., related to policies/controls for network capacity controlled services). In some embodiments, the network service usage control policy is based on updates to service plan status. In some embodiments, the network service usage control policy is based on updates to service plan policies. In some embodiments, the network service usage control policy is based on availability of alternative networks. In some embodiments, the network service usage control policy is based on policy rules for selecting alternative networks. In some embodiments, the network service usage control policy is based on network busy state or availability state for alternative networks. In some embodiments, the network service usage control policy is based on specific network selection or preference policies for a given network service activity or set of network service activities.

In some embodiments, associating the network service usage activity with a network service usage control policy or a network service usage notification policy, includes dynamically associating based on one or more of the following: a network busy state, a time of day, a user input/preference, an associated service plan (e.g., 25 MB data plan, 5G data plan, or an unlimited data plan or other data/service usage plan), an application behavior, a messaging layer behavior, a power state of device, a device usage state, a time based criteria, availability of alternative networks, and a set of policy rules for selecting and/or controlling traffic on one or more of the alternative networks.

In some embodiments, a network service usage control policy (e.g., a network capacity controlled services policy) includes defining the network service usage control policy for one or more service plans, defining network access policy rules for one or more devices or groups of devices in a single or multi-user scenarios such as family and enterprise plans, defining network access policy rules for one or more users or groups of users, allowing or disallowing network access events or attempts, modulating the number of network access events or attempts, aggregating network access events or attempts into a group of access events or attempts, time windowing network access events or attempts, time windowing network access events or attempts based on the application or function being served by the network access events or attempts, time windowing network access events or attempts to pre-determined time windows, time windowing network access events or attempts to time windows where a measure of network busy state is within a range, assigning the allowable types of access events or attempts, assigning the allowable functions or applications that are allowed network access events or attempts, assigning the priority of one or more network access events or attempts, defining the allowable duration of network access events or attempts, defining the allowable speed of network access events or attempts, defining the allowable network destinations for network access events or attempts, defining the allowable applications for network access events or attempts, defining the QoS rules for one or more network access events or attempts, defining or setting access policy rules for one or more applications, defining or setting access policy rules for one or more network destinations, defining or setting access policy rules for one or more devices, defining or setting access policy rules for one or more network services, defining or setting access policy rules for one or more traffic types, defining or setting access policy rules for one or more QoS classes, and defining or setting access policy rules based on any combination of device, application, network destination, network service, traffic type, QoS class, and/or other criteria/measures.

In some embodiments, a network service usage control policy (e.g., a network capacity controlled services policy) includes a traffic control policy. In some embodiments, the traffic control policy includes a traffic control setting. In some embodiments, the traffic control policy includes a traffic control/tier, and the traffic control/tier includes the traffic control setting. In some embodiments, the traffic control policy includes one or more of the following: block/allow settings, throttle settings, adaptive throttle settings, QoS class settings including packet error rate, jitter and delay settings, queue settings, and tag settings (e.g., for packet tagging certain traffic flows). In some embodiments, QoS class settings, include one or more of the following: throttle level, priority queuing relative to other device traffic, time window parameters, and hold or delay while accumulating or aggregating traffic into a larger stream/burst/packet/group of packets. In some embodiments, the traffic control policy includes filters implemented as indexes into different lists of policy settings (e.g., using cascade filtering techniques), in which the policy filters include one or more of the following: a network, a service plan, an application, a time of day, and a network busy state. For example, a two dimensional traffic control implementation scheme can be provided using a network busy state and/or a time of day as an index into a traffic control setting (e.g., a certain application's priority level can be increased or decreased based on a network busy state and/or time of day). In some embodiments, the traffic control policy is used for selecting the network from a list of available networks, blocking or reducing access until a connection is made to an alternative network, and/or modifying or replacing a network stack interface of the device to provide for intercept or discontinuance of network socket interface messages to applications or OS functions.

In some embodiments, a traffic control setting is selected based on the network service usage control policy. In some embodiments, the traffic control setting is implemented on the device based on the network service usage control policy. In some embodiments, the implemented traffic control setting controls traffic/traffic flows of a network capacity controlled service. In some embodiments, the traffic control setting is selected based on one or more of the following: a time of day, a day of week, a special time/date (e.g., a holiday or a network maintenance time/date), a network busy state, a priority level associated with the network service usage activity, a QoS class associated with the network service usage activity (e.g., emergency traffic), which network the network service activity is gaining access from, which networks are available, which network the network service activity is connected to, which base station or communication channel the network service activity is connected to, and a network dependent set of traffic control policies that can vary depending on which network the service activity is gaining access from (e.g., and/or various other criteria/measures as described herein). In some embodiments, the traffic control setting includes one or more of the following: allow/block, delay, throttle, QoS class implementation, queue, tag, generate a user notification, random back off, clear to send received from a network element, hold for scheduled transmission time slot, selecting the network from the available networks, and blocking or reducing access until a connection is made to an alternative network. In some embodiments, the traffic control setting is selected based on a network capacity controlled services priority state of the network service usage activity and a network busy state. In some embodiments, the traffic control setting is selected based on a network capacity controlled services priority state of the network service usage activity and a network busy state and is global (e.g., the same) for all network capacity controlled services activities or varies based on a network service usage activity priority, user preferences or option selection, an application, a time based criteria, a service plan, a network the device or service activity is gaining access from, a redetermination of a network congestion state after adapting to a previously determined network busy state, and/or other criteria/measures as described herein.

In some embodiments, network capacity controlled services traffic (e.g., traffic flows) is differentially controlled for protecting network capacity. For example, various software updates for an OS and one or more applications on the device can be differentially controlled using the various techniques described herein. As another example, security/antimalware software (e.g., antivirus, firewall, content protection, intrusion detection/prevention, and/or other security/antimalware software) can be differentially controlled using the various techniques described herein. As yet another example, network backups/imaging, content downloads (e.g., exceeding a threshold individually and/or in aggregate, such as for image, music, video, eBook content, email attachments, content/media subscriptions, RSS/news feeds, text/image/video chat, software updates, and/or other content downloads) can be differentially controlled using the various techniques described herein.

For example, using the DAS for protecting network capacity techniques described herein an adaptive policy control for protecting network capacity can be provided. A network capacity controlled services list can be generated, updated, reported, and/or received by the device and stored on the device (e.g., the list can be based on adapted to the service plan associated with the device). If a monitored network service usage activity is not on the list, then the device can report the monitored network service usage activity to a network element (e.g., for a monitored network service usage activity that also exceeds a certain threshold, based on a network busy state, based on a time based criteria, and/or other criteria/measure). As an example, monitored network service usage activity can be reported if/when the monitored network service usage activity exceeds a data usage threshold (e.g., 50 MB total data usage per day, a socket opening frequency/rate, velocity of data usage at an instant in time, or more complicated thresholds over time, over peak periods, by content and time, by various other parameters/thresholds). As another example, the monitored network service usage activity can be reported based on testing of the network service usage behavior and/or application developer characterization input. The report can include information that identifies the network service usage activity and various network service usage parameters.

In some embodiments, a notification setting is selected based on a service usage notification policy. In some embodiments, a notification setting includes a user notification setting (e.g., various user notifications settings as described above with respect to FIG. 18).

In some embodiments, classifying the network service usage activity further includes classifying the network service usage activity (e.g., using a usage threshold filter and/or cascading filter techniques) into one or more of a plurality of classification categories for differential network access control for protecting network capacity. In some embodiments, classifying the network service usage activity, further includes classifying the network service usage activity into one or more network capacity controlled services in which the network capacity controlled services include one or more of the following: applications requiring data network access, application software updates, applications requiring network information, applications requiring GPS or physical location, operating system software updates, security software updates, network based backups, email downloads, and a set of activities configured as network capacity controlled service activities based on a service profile and/or user input (e.g., and/or various other types of network service usage activities as described herein and as will now be apparent to one of ordinary skill in the art). For example, network capacity controlled services can include software updates for OS and applications, OS background network accesses, cloud synchronization services, RSS feeds & other background information feeds, browser/application/device behavior reporting, background email downloads, content subscription service updates and downloads (e.g., music/video downloads, news feeds), text/voice/video chat clients, security updates (e.g., antimalware updates), peer to peer networking application updates, inefficient network access sequences during frequent power cycling or power save state cycling, large downloads or other high bandwidth accesses, and greedy application programs that constantly/repeatedly access the network with small transmissions or requests for information. In some embodiments, a network capacity controlled services list is static, adaptive, generated using a service processor, received from a network element (e.g., service controller or service cloud), received from a network element (e.g., service controller or service cloud) and based at least in part on device activity reports received from the service processor, based on criteria set by pre-testing, report of behavior characterization performed by the application developer, and/or based at least in part on user input. In some embodiments, the network capacity controlled services list includes one or more network service activity background (QoS) classes.

In some embodiments, classifying the network service usage activity further includes classifying the network service usage activity based on one or more of the following: application or widget (e.g., Outlook, Skype, iTunes, Android email, weather channel weather widget, iCal, Firefox Browser, etc), application type (e.g., user application, system application/utility/function/process, OS application/utility/function/process, email, browser, widget, malware (such as a virus or suspicious process), RSS feed, device synchronization service, download application, network backup/imaging application, voice/video chat, peer to peer content application or other peer to peer application, streaming media feed or broadcast reception/transmission application, network meeting application, chat application or session, and/or any other application or process identification and categorization), OS/system function (e.g., any system application/utility/function/process and/or OS application/utility/function/process, such as a OS update and/or OS error reporting), modem function, network communication function (e.g., network discovery or signaling, EtherType messages, connection flow/stream/session set up or tear down, network authentication or authorization sequences, IP address acquisition, and DNS services), URL and/or domain, destination/source IP address, protocol, traffic type, socket (e.g., IP address, protocol, and/or port), socket address/label/identifier (e.g., port address/port number), content type (e.g., email downloads, email text, video, music, eBooks, widget update streams, and download streams), port (e.g., port number), QoS classification level, time of day, on peak or off peak, network time, network busy state, access network selected, service plan selected, user preferences, device credentials, user credentials, and/or status, modem power cycling or power state changes, modem authentication processes, modem link set up or tear down, modem management communications, modem software or firmware updates, modem power management information, device power state, and modem power state. In some embodiments, classifying the network service usage activity further includes associating the classified network service usage activity with an ID (e.g., an application ID, which can be, for example, a unique number, name, and/or signature). In some embodiments, classifying the network service usage activity further includes classifying the network service usage activity using a plurality of classification parameters, including one or more of the following: application ID, remote IP (e.g., URL, domain, and/or IP address), remote port, protocol, content type, a filter action class (e.g., network busy state class, QoS class, time of day, network busy state, and/or other criteria/measures), and access network selected. In some embodiments, classifying the network service usage activity further includes using a combination of parameters as discussed above to determine the classification of the network service usage activity.

In some embodiments, classifying the network service usage activity further includes classifying the network service usage activity as a network capacity controlled service, a non-network capacity controlled service, a blocked or disallowed service, and/or a not yet classified/identified service (e.g., unknown/yet to be determined classification or pending classification). In some embodiments, an application connection, OS connection, and/or other service activity is classified as a network capacity controlled service activity when the device has been inactive (e.g., or in a power save state) for a period of time (e.g., when the user has not interacted with it for a period of time, when it has not displayed user notification policy, and/or a user input has not been received for a period of time, and/or when a power save state is entered). In some embodiments, an application connection, OS connection, and/or other service activity is classified as a network capacity controlled service activity when the monitored network service usage activity exceeds a data usage threshold for more than one application connection, OS connection, and/or other service activity (e.g., aggregated data usage exceeds the data usage threshold); or for a specific application connection. In some embodiments, an application connection, OS connection, and/or other service activity is classified as a network capacity controlled service activity when the monitored network service usage activity exceeds a data usage threshold based on a predetermined list of one or more data usage limits, based on a list received from a network element, usage time limit (e.g., based on a period of time exceeding a usage limit), and/or based on some other usage related criteria/measures. In some embodiments, classifying the network service usage activity further includes classifying the network service usage activity as a network capacity controlled service based on a network peak time, a network busy state, or a network connection to the device falls below a certain performance level (e.g., higher/lower priorities assigned based on various such criteria/other input/factors).

In some embodiments, one or more of the network capacity controlled services are associated with a different network access policy set for one or more networks and/or one or more alternative networks. In some embodiments, one or more of the network capacity controlled services are associated with a different notification policy set for one or more networks and/or one or more alternative networks. In some embodiments, the network capacity controlled services list is stored on the device. In some embodiments, the network capacity controlled services list is received/periodically updated from a network element and stored on the device. In some embodiments, the network capacity controlled services list includes network capacity controlled services, non-network capacity controlled services (e.g., foreground services or services based on various possibly dynamic criteria are not classified as network capacity controlled services), and an unclassified set of services (e.g., grey list including one or more network service activities pending classification based on further analysis and/or input, such as from a network element, service provider, and/or user). In some embodiments, the network capacity controlled services list is based on one or more of the following: predefined/predesignated (e.g., network, service plan, pretest and/or characterized by an application developer) criteria; device assisted/based monitoring (e.g., using a service processor); network based monitoring (e.g., using a DPI gateway); network assisted analysis (e.g., based on device reports of DAS activity analysis). For example, the device can report device monitored network service usage activities (e.g., all monitored network service usage activities or a subset based on configuration, threshold, service plan, network, and/or user input) to the network element. As another example, the network element can update the network capacity controlled services list and send the updated list to the device. As yet another example, the network element can perform a statistical analysis of network service activities across a plurality of devices based on the device based and/or network based network service usage activity monitoring/reporting. In some embodiments, a network service usage activity is determined to be an active application or process (e.g., based on a user interaction with the device and/or network service usage activity, such as a pop-up and/or other criteria/measures).

In some embodiments, implementing traffic control for network capacity controlled services is provided using various techniques. In some embodiments, the device includes a service processor agent or function to intercept, block, modify, remove or replace UI messages, notifications or other UI communications generated by a network service activity that whose network service usage is being controlled or managed (e.g., using various measurement points). For example, this technique can be used to provide for an improved user experience (e.g., to prevent an application that is being controlled for protecting network capacity from generating repeated and/or confusing messages/alerts to the user). In some embodiments, a network stack interface of the device is replaced or modified to provide for intercept or discontinuance of network socket interface messages to applications or OS functions or other functions/software.

In some embodiments, implementing traffic control for network capacity controlled services using DAS techniques is provided using various techniques in which the network service usage activity is unaware of network capacity control (e.g., does not support an API or other interface for implementing network capacity control). For example, network service application messaging interface based techniques can be used to implement traffic control. Example network service application messaging interfaces include the following: network stack API, network communication stream/flow interface, network stack API messages, EtherType messages, ARP messages, and/or other messaging or other or similar techniques as will now be apparent to one of ordinary skill in the art in view of the various embodiments described herein. In some embodiments, network service usage activity control policies or network service activity messages are selected based on the set of traffic control policies or service activity messages that result in reduced or modified user notification by the service activity due to network capacity controlled service policies applied to the network service activity. In some embodiments, network service usage activity control policies or network service activity messages are selected based on the set of traffic control policies or service activity messages that result in reduced disruption of device operation due to network capacity controlled service activity policies applied to the network service activity. In some embodiments, network service usage activity control policies or network service activity messages are selected based on the set of traffic control policies or service activity messages that result in reduced disruption of network service activity operation due to network capacity controlled service activity policies applied to the network service activity. In some embodiments, implementing traffic control for network capacity controlled services is provided by intercepting opens/connects/writes. In some embodiments, implementing traffic control for network capacity controlled services is provided by intercepting stack API level or application messaging layer requests (e.g., socket open/send requests). For example, an intercepted request can be copied (e.g., to memory) and queued (e.g., delayed or throttled) or dropped (e.g., blocked). As another example, an intercepted request can be copied into memory and then a portion of the transmission can be retrieved from memory and reinjected (e.g., throttled). As yet another example, intercepting messaging transmissions can be parsed inline and allowed to transmit (e.g., allowed), and the transmission or a portion of the transmission can be copied to memory for classifying the traffic flow. In some embodiments, implementing traffic control for network capacity controlled services is provided by intercepting or controlling or modulating UI notifications. In some embodiments, implementing traffic control for network capacity controlled services is provided by killing or suspending the network service activity. In some embodiments, implementing traffic control for network capacity controlled services is provided by deprioritizing the process(es) associated with the service activity (e.g., CPU scheduling deprioritization).

In some embodiments, implementing traffic control for network capacity controlled services using DAS techniques for network service usage activities that are unaware of network capacity control is provided by emulating network API messaging (e.g., effectively providing a spoofed or emulated network API). For example, an emulated network API can intercept, modify, block, remove, and/or replace network socket application interface messages and/or EtherType messages (e.g., EWOULDBLOCK, ENETDOWN, ENETUNREACH, EHOSTDOWN, EHOSTUNREACH, EALRADY, EINPROGRESS, ECONNREFUSED, EINPROGRESS, ETIMEDOUT, and/or other such messages). As another example, an emulated network API can modify, swap, and/or inject network socket application interface messages (socket( ), connect( ), read( ), write( ), close( ), and other such messages) that provide for control or management of network service activity service usage behavior. As yet another example, before a connection is allowed to be opened (e.g., before a socket is opened), transmission, or a flow/stream is initiated, it is blocked and a message is sent back to the application (e.g., a reset message in response to a sync request or another message that the application will understand and can interpret to indicate that the network access attempt was not allowed/blocked, that the network is not available, and/or to try again later for the requested network access). As yet another example, the socket can be allowed to open but after some point in time (e.g., based on network service usage, network busy state, time based criteria, and/or some other criteria/measure), the stream is blocked or the socket is terminated. As yet another example, time window based traffic control techniques can be implemented (e.g., during non-peak, not network busy state times), such as by allowing network access for a period of time, blocking for a period of time, and then repeating to thereby effectively spread the network access out either randomly or deterministically. Using these techniques, an application that is unaware of network capacity control based traffic control can send and receive standard messaging, and the device can implement traffic controls based on the network capacity control policy using messaging that the network service usage activity (e.g., application or OS or software function) can understand and will respond to in a typically predictable manner as would now be apparent to one of ordinary skill in the art.

In some embodiments, implementing traffic control for network capacity controlled services using DAS techniques is provided using various techniques in which the network service usage activity is aware of network capacity control (e.g., the network service usage activity supports an API or other interface for implementing network capacity control). For example, a network access API as described herein can be used to implement traffic control for network capacity controlled services. In some embodiments, the API facilitates communication of one or more of the following: network access conditions, network busy state or network availability state of one or more networks or alternative networks, one or more network capacity controlled service policies (e.g., the network service can be of a current network access setting, such as allow/block, throttle, queue, scheduled time/time slot, and/or defer, which can be based on, for example, a current network, a current network busy state, a time based criteria, a service plan, a network service classification, and/or other criteria/measures), a network access request from a network service activity, a query/polled request to a network service activity, a network access grant to a network service activity (e.g., including a priority setting and/or network capacity controlled service classification, a scheduled time/time slot, an alternative network, and/or other criteria/measures), a network busy state or a network availability state or a network QoS state.

In some embodiments, implementing traffic control for network capacity controlled services using network assisted/based techniques is provided using various techniques in which the network service usage activity is unaware of network capacity control (e.g., does not support an API or other interface for implementing network capacity control). In some embodiments, DPI based techniques are used to control network capacity controlled services (e.g., to block or throttle network capacity controlled services at a DPI gateway).

In some embodiments, implementing traffic control for network capacity controlled services using network assisted/based techniques is provided using various techniques in which the network service usage activity is aware of network capacity control (e.g., does support an API or other interface for implementing network capacity control). In some embodiments, the application/messaging layer (e.g., a network API as described herein) is used to communicate with a network service activity to provide associated network capacity controlled service classifications and/or priorities, network busy state information or network availability of one or more networks or alternative networks, a network access request and response, and/other criteria/measures as similarly described herein.

In some embodiments, DAS for protecting network capacity includes implementing a service plan for differential charging based on network service usage activities (e.g., including network capacity controlled services). In some embodiments, the service plan includes differential charging for network capacity controlled services. In some embodiments, the service plan includes a cap network service usage for network capacity controlled services. In some embodiments, the service plan includes a notification when the cap is exceeded. In some embodiments, the service plan includes overage charges when the cap is exceeded. In some embodiments, the service plan includes modifying charging based on user input (e.g., user override selection as described herein, in which for example, overage charges are different for network capacity controlled services and/or based on priority levels and/or based on the current access network). In some embodiments, the service plan includes time based criteria restrictions for network capacity controlled services (e.g., time of day restrictions with or without override options). In some embodiments, the service plan includes network busy state based criteria restrictions for network capacity controlled services (e.g., with or without override options). In some embodiments, the service plan provides for network service activity controls to be overridden (e.g., one time, time window, usage amount, or permanent) (e.g., differentially charge for override, differentially cap for override, override with action based UI notification option, and/or override with UI setting). In some embodiments, the service plan includes family plan or multi-user plan (e.g., different network capacity controlled service settings for different users). In some embodiments, the service plan includes multi-device plan (e.g., different network capacity controlled service settings for different devices, such as smart phone v. laptop v. net book v. eBook). In some embodiments, the service plan includes free network capacity controlled service usage for certain times of day, network busy state(s), and/or other criteria/measures. In some embodiments, the service plan includes network dependent charging for network capacity controlled services. In some embodiments, the service plan includes network preference/prioritization for network capacity controlled services. In some embodiments, the service plan includes arbitration billing to bill a carrier partner or sponsored service partner for the access provided to a destination, application, or other network capacity controlled service. In some embodiments, the service plan includes arbitration billing to bill an application developer for the access provided to a destination, application or other network capacity controlled service.

In some application scenarios, excess network capacity demand can be caused by modem power state changes on the device. For example, when an application or OS function attempts to connect to the network for any reason when the modem is in a power save state wherein the modem is not connected to the network, it can cause the modem to change power save state, reconnect to the network, and then initiate the application network connection. In some cases, this can also cause the network to re-initiate a modem connection session (e.g., PPP session) which in addition to the network capacity consumed by the basic modem connection also consumes network resources for establishing the PPP session. Accordingly, in some embodiments, network service usage activity control policies are implemented that limit or control the ability of applications, OS functions, and/or other network service usage activities (e.g., network capacity controlled services) from changing the modem power control state or network connection state. In some embodiments, a service usage activity is prevented or limited from awakening the modem, changing the power state of the modem, or causing the modem to connect to the network until a given time window is reached. In some embodiments, the frequency a service usage activity is allowed to awakening the modem, changing the power state of the modem, or causing the modem is limited. In some embodiments, a network service usage activity is prevented from awakening the modem, changing the power state of the modem, or causing the modem until a time delay has passed. In some embodiments, a network service usage activity is prevented from awakening the modem, changing the power state of the modem, or causing the modem until multiple network service usage activities require such changes in modem state, or until network service usage activity is aggregated to increase network capacity and/or network resource utilization efficiency. In some embodiments, limiting the ability of a network service usage activity to change the power state of a modem includes not allowing the activity to power the modem off, place the modem in sleep mode, or disconnect the modem from the network. In some embodiments, these limitations on network service usage activity to awaken the modem, change the power state of the modem, or cause the modem to connect to a network are set by a central network function (e.g., a service controller or other network element/function) policy communication to the modem. In some embodiments, these power control state policies are updated by the central network function.

Figure 11:
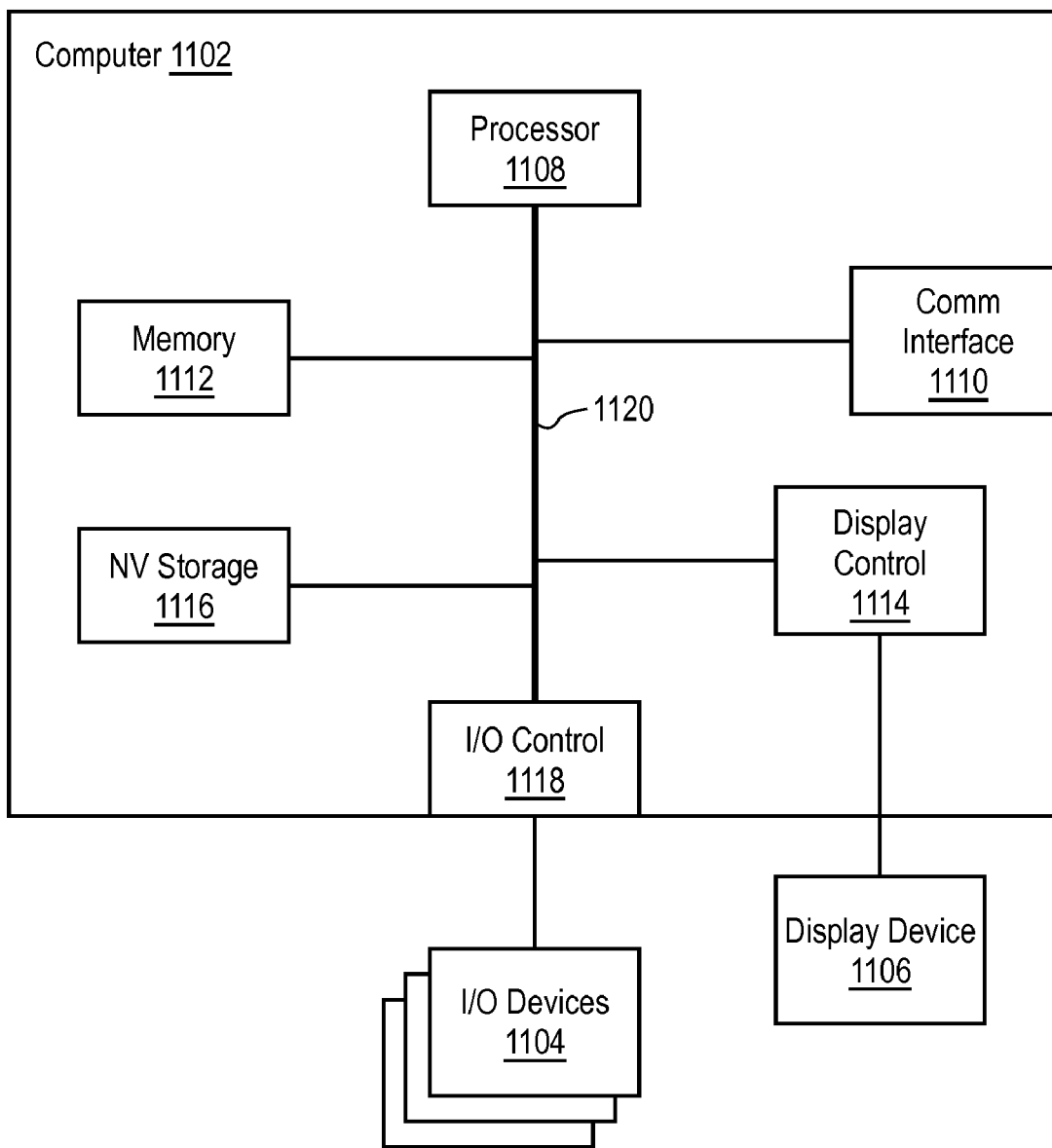
FIG. 11 depicts an example of a computer system on which techniques described in this paper can be implemented.

FIG. 11 depicts an example of a computer system 1100 on which techniques described in this paper can be implemented. The computer system 1100 may be a conventional computer system that can be used as a client computer system, such as a wireless client or a workstation, or a server computer system. The computer system 1100 includes a computer 1102, I/O devices 1104, and a display device 1106. The computer 1102 includes a processor 1108, a communications interface 1110, memory 1112, display controller 1114, non-volatile storage 1116, and I/O controller 1118. The computer 1102 may be coupled to or include the I/O devices 1104 and display device 1106.

The computer 1102 interfaces to external systems through the communications interface 1110, which may include a modem or network interface. It will be appreciated that the communications interface 1110 can be considered to be part of the computer system 1100 or a part of the computer 1102. The communications interface 1110 can be an analog modem, ISDN modem, cable modem, token ring interface, satellite transmission interface (e.g. "direct PC"), or other interfaces for coupling a computer system to other computer systems.

The processor 1108 may be, for example, a conventional microprocessor such as an Intel Pentium microprocessor or Motorola power PC microprocessor. The memory 1112 is coupled to the processor 1108 by a bus 1170. The memory 1112 can be Dynamic Random Access Memory (DRAM) and can also include Static RAM (SRAM). The bus 1170 couples the processor 1108 to the memory 1112, also to the non-volatile storage 1116, to the display controller 1114, and to the I/O controller 1118.

The I/O devices 1104 can include a keyboard, disk drives, printers, a scanner, and other input and output devices, including a mouse or other pointing device. The display controller 1114 may control in the conventional manner a display on the display device 1106, which can be, for example, a cathode ray tube (CRT) or liquid crystal display (LCD). The display controller 1114 and the I/O controller 1118 can be implemented with conventional well known technology.

The non-volatile storage 1116 is often a magnetic hard disk, an optical disk, or another form of storage for large amounts of data. Some of this data is often written, by a direct memory access process, into memory 1112 during execution of software in the computer 1102. One of skill in the art will immediately recognize that the terms "machine-readable medium" or "computer-readable medium" includes any type of storage device that is accessible by the processor 1108 and also encompasses a carrier wave that encodes a data signal.

The computer system 1100 is one example of many possible computer systems which have different architectures. For example, personal computers based on an Intel microprocessor often have multiple buses, one of which can be an I/O bus for the peripherals and one that directly connects the processor 1108 and the memory 1112 (often referred to as a memory bus). The buses are connected together through bridge components that perform any necessary translation due to differing bus protocols.

Network computers are another type of computer system that can be used in conjunction with the teachings provided herein. Network computers do not usually include a hard disk or other mass storage, and the executable programs are loaded from a network connection into the memory 1112 for execution by the processor 1108. A Web TV system, which is known in the art, is also considered to be a computer system, but it may lack some of the features shown in FIG. 11, such as certain input or output devices. A typical computer system will usually include at least a processor, memory, and a bus coupling the memory to the processor.

In addition, the computer system 1100 is controlled by operating system software which includes a file management system, such as a disk operating system, which is part of the operating system software. One example of operating system software with its associated file management system software is the family of operating systems known as Windows® from Microsoft Corporation of Redmond, Wash., and their associated file management systems. Another example of operating system software with its associated file management system software is the Linux operating system and its associated file management system. The file management system is typically stored in the non-volatile storage 1116 and causes the processor 1108 to execute the various acts required by the operating system to input and output data and to store data in memory, including storing files on the non-volatile storage 1116.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention, in some embodiments, also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, read-only memories (ROMs), random access memories (RAMs), EPROMs, EEPROMs, magnetic or optical cards, any type of disk including floppy disks, optical disks, CD-ROMs, and magnetic-optical disks, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language, and various embodiments may thus be implemented using a variety of programming languages.

Although the foregoing embodiments have been described in some detail for purposes of clarity of understanding, the invention is not limited to the details provided. There are many alternative ways of implementing the invention. The disclosed embodiments are illustrative and not restrictive.

INCORPORATION BY REFERENCE

The following U.S. applications are hereby incorporated by reference for all purposes: application Ser. No. 13/248,025, filed Sep. 28, 2011, entitled SERVICE DESIGN CENTER FOR DEVICE ASSISTED SERVICES, now U.S. Pat. No. 8,924,543 (issued Dec. 30, 2014); application Ser. No. 13/134,028, filed May 25, 2011, entitled DEVICE-ASSISTED SERVICES FOR PROTECTING NETWORK CAPACITY, now U.S. Pat. No. 8,589,541 (issued Nov. 19, 2013); application Ser. No. 13/134,005, filed May 25, 2011, entitled SYSTEM AND METHOD FOR WIRELESS NETWORK OFFLOADING, now U.S. Pat. No. 8,635,335 (issued Jan. 21, 2014); application Ser. No. 12/695,021, filed Jan. 27, 2010, entitled QUALITY OF SERVICE FOR DEVICE ASSISTED SERVICES, now U.S. Pat. No. 8,346,225 (issued Jan. 1, 2013); application Ser. No. 12/380,780, entitled AUTOMATED DEVICE PROVISIONING AND ACTIVATION, filed Mar. 2, 2009, now U.S. Pat. No. 8,839,388 (issued Sep. 16, 2014); application Ser. No. 12/380,778, filed Mar. 2, 2009, entitled VERIFIABLE DEVICE ASSISTED SERVICE USAGE BILLING WITH INTEGRATED ACCOUNTING, MEDIATION ACCOUNTING, AND MULTI-ACCOUNT, now U.S. Pat. No. 8,321,526 (issued Nov. 27, 2012); Provisional Application No. 61/206,354, entitled SERVICES POLICY COMMUNICATION SYSTEM AND METHOD, filed Jan. 28, 2009; Provisional Application No. 61/206,944, entitled SERVICES POLICY COMMUNICATION SYSTEM AND METHOD, filed Feb. 4, 2009; Provisional Application No. 61/207,393, entitled SERVICES POLICY COMMUNICATION SYSTEM AND METHOD filed Feb. 10, 2009; Provisional Application No. 61/207,739, entitled SERVICES POLICY COMMUNICATION SYSTEM AND METHOD filed Feb. 13, 2009; Provisional Application No. 61/252,151, filed Oct. 15, 2009, entitled SECURITY TECHNIQUES FOR DEVICE ASSISTED SERVICES; Provisional Application No. 61/252,153, filed Oct. 15, 2009, entitled DEVICE GROUP PARTITIONS AND SETTLEMENT PLATFORM; Provisional Application No. 61/348,022, filed May 25, 2010, entitled DEVICE ASSISTED SERVICES FOR PROTECTING NETWORK CAPACITY; Provisional Application No. 61/381,159, filed Sep. 9, 2010, entitled DEVICE ASSISTED SERVICES FOR PROTECTING NETWORK CAPACITY; Provisional Application No. 61/407,358, filed Oct. 27, 2010, entitled SERVICE CONTROLLER AND SERVICE PROCESSOR ARCHITECTURE; Provisional Application No. 61/422,572, filed Dec. 13, 2010, entitled SYSTEM INTERFACES AND WORKFLOWS FOR DEVICE ASSISTED SERVICES; Provisional Application No. 61/422,574, filed Dec. 13, 2010, entitled SECURITY AND FRAUD DETECTION FOR DEVICE ASSISTED SERVICES; Provisional Application No. 61/435,564, filed Jan. 24, 2011, entitled FRAMEWORK FOR DEVICE ASSISTED SERVICES; Provisional Application No. 61/472,606, filed Apr. 6, 2011, entitled MANAGING SERVICE USER DISCOVERY AND SERVICE LAUNCH OBJECT PLACEMENT ON A DEVICE; and Provisional Application No. 61/422,565, filed Dec. 13, 2010, entitled SERVICE DESIGN CENTER FOR DEVICE ASSISTED SERVICES.

We claim:

1. A system comprising:
a network service plan provisioning system configured to communicate with an access network, the network service plan provisioning including a memory and a processor;
the memory storing a first traffic classification filter of a first service plan component and a second traffic classification filter of a second service plan component, the first traffic classification filter being configured to filter a traffic event and the second traffic classification filter being configured to filter the traffic event;
the processor configured to:
determine a superposition of the first traffic classification filter over the second traffic classification filter;
create network provisioning instructions, using the first service plan component and the second service plan component, in response to determining the superposition, wherein the network provisioning instructions include traffic inspection provisioning instructions for filtering the traffic event; and
provide the network provisioning instructions to the access network to enable filtering the traffic event.

2. The system of claim 1, further comprising:
the access network configured to:
receive the network provisioning instructions from the network service plan provisioning system; and
provide the network provisioning instructions to one or more devices on the access network to filter the traffic event when detected.

3. The system of claim 2, wherein the network provisioning instructions are created such that after providing the network provisioning instructions to the one or more devices, the one or more devices are enabled to perform traffic inspection comparison operations such that the traffic inspection provisioning instructions determine whether a given network traffic event matches the first traffic classification filter before determining whether the given network traffic event matches the second traffic classification filter.

4. The system of claim 1, wherein:
the memory further stores a first network policy enforcement action of the first service plan component, the first network policy enforcement action configured to be triggered in response to the traffic event matching the first classification filter, and a second network policy enforcement action of the second service plan component, the second network policy enforcement action configured to be triggered in response to the traffic event matching the second classification filter; and
the network provisioning instructions further include policy enforcement provisioning instructions for triggering the filtering of the traffic event.

5. The system of claim 1, wherein the processor is further configured to:
obtain the first service plan component and second service plan component from a user operating a graphical user interface of the network service plan provisioning system.

6. The system of claim 1, wherein the network provisioning instructions are created such that after providing the network provisioning instructions to the one or more devices, the one or more devices are enabled to perform traffic inspection comparison operations such that the traffic inspection provisioning instructions determine whether a given network traffic event matches the second traffic classification filter only after determining that the network traffic event does not match the first traffic classification filter.

7. The system of claim 1, wherein the network provisioning instructions are created such that after providing the network provisioning instructions to the one or more devices, the one or more devices are enabled to perform traffic inspection comparison operations such that the traffic inspection provisioning instructions determine whether a given network traffic event matches the second traffic classification filter, after determining that the given network traffic event matches the first traffic classification filter.

8. The system of claim 1, wherein the processor is further configured to:
receive a user selection to superposition the first traffic classification filter over the second traffic classification filter.

9. The system of claim 1, wherein a policy enforcement priority rule includes a priority order for the first traffic classification filter and the second traffic classification filter.

10. The system of claim 1, wherein information specifying the first traffic classification filter comprises an inspection criterion including at least one of a specific device application, a specific network destination, a specific network source, a specific traffic type, a specific content type, or a specific traffic protocol.

11. A method for use by a system comprising a network service plan provisioning system configured to communicate with an access network, the network service plan provisioning system including a processor and a memory storing a first traffic classification filter of a first service plan component and a second traffic classification filter of a second service plan component, the first traffic classification filter being configured to filter a traffic event and the second traffic classification filter being configured to filter the traffic event, the method comprising:
determining, by the processor, a superposition of the first traffic classification filter over the second traffic classification filter;
creating, by the processor, network provisioning instructions, using the first service plan component and the second service plan component, in response to determining the superposition, wherein the network provisioning instructions include traffic inspection provisioning instructions for filtering the traffic event; and
providing, by the processor, the network provisioning instructions to the access network to enable filtering the traffic event.

12. The method of claim 11, wherein the system further comprises the access network, and where in the method further comprises:
receiving, by the access network, the network provisioning instructions from the network service plan provisioning system; and
providing, by the access network, the network provisioning instructions to one or more devices on the access network to filter the traffic event when detected.

13. The method of claim 12, wherein the network provisioning instructions are created such that after providing the network provisioning instructions to the one or more devices, the one or more devices are enabled to perform traffic inspection comparison operations such that the traffic inspection provisioning instructions determine whether a given network traffic event matches the first traffic classification filter before determining whether the given network traffic event matches the second traffic classification filter.

14. The method of claim 11, wherein the memory further stores a first network policy enforcement action of the first service plan component, the first network policy enforcement action configured to be triggered in response to the traffic event matching the first classification filter, and a second network policy enforcement action of the second service plan component, the second network policy enforcement action configured to be triggered in response to the traffic event matching the second classification filter, and wherein the network provisioning instructions further includes policy enforcement provisioning instructions for triggering the filtering of the traffic event.

15. The method of claim 11, further comprising:
obtaining the first service plan component and second service plan component from a user operating a graphical user interface of the network service plan provisioning system.

16. The method of claim 11, wherein the network provisioning instructions are created such that after providing the network provisioning instructions to the one or more devices, the one or more devices are enabled to perform traffic inspection comparison operations such that the traffic inspection provisioning instructions determine whether a given network traffic event matches the second traffic classification filter only after determining that the network traffic event does not match the first traffic classification filter.

17. The method of claim 11, wherein the network provisioning instructions are created such that after providing the network provisioning instructions to the one or more devices, the one or more devices are enabled to perform traffic inspection comparison operations such that the traffic inspection provisioning instructions determine whether a given network traffic event matches the second traffic classification filter, after determining that the given network traffic event matches the first traffic classification filter.

18. The method of claim 11, further comprising:
receiving a user selection to superposition the first traffic classification filter over the second traffic classification filter.

19. The method of claim 11, wherein a policy enforcement priority rule includes a priority order for the first traffic classification filter and the second traffic classification filter.

20. The method of claim 11, wherein information specifying the first traffic classification filter comprises an inspection criterion including at least one of a specific device application, a specific network destination, a specific network source, a specific traffic type, a specific content type, or a specific traffic protocol.

* * * * *